United States Patent [19]

Ohno

[11] Patent Number: 5,777,960
[45] Date of Patent: Jul. 7, 1998

[54] OPTICAL HEAD DEVICE INCLUDING FIXED AND MOVABLE DEFLECTION MEANS

[75] Inventor: Takehide Ohno, Yokohama, Japan

[73] Assignee: Ricoh Company, Ltd., Tokyo, Japan

[21] Appl. No.: 642,474

[22] Filed: May 3, 1996

[30] Foreign Application Priority Data

| May 9, 1995 | [JP] | Japan | 7-109864 |
| Oct. 26, 1995 | [JP] | Japan | 7-279305 |
| Oct. 31, 1995 | [JP] | Japan | 7-283028 |
| Nov. 27, 1995 | [JP] | Japan | 7-307101 |
| Jan. 30, 1996 | [JP] | Japan | 8-014434 |
| Jan. 30, 1996 | [JP] | Japan | 8-014435 |
| Jan. 30, 1996 | [JP] | Japan | 8-014436 |

[51] Int. Cl.$^6$ .................................................. G11B 7/08
[52] U.S. Cl. ........................... 369/44.14; 369/44.22; 369/44.32; 369/44.37
[58] Field of Search .................. 369/44.14, 44.17, 369/44.18, 44.19, 44.21, 44.22, 112, 44.32, 44.37; 359/812, 813, 823, 824, 814

[56] References Cited

U.S. PATENT DOCUMENTS

| 5,140,572 | 8/1992 | Kibune et al. | 369/44.14 |
| 5,465,242 | 11/1995 | Terashima et al. | 369/44.19 |

FOREIGN PATENT DOCUMENTS

| 61-94246 | of 1986 | Japan . |
| 4-14628 | of 1992 | Japan . |
| 7-93764 | of 1995 | Japan . |

*Primary Examiner*—Thang V. Tran
*Attorney, Agent, or Firm*—Dickstein Shapiro Morin & Oshinsky, LLP

[57] ABSTRACT

An optical head device supports an objective lens which faces an optical disc movable in a tracking direction. Light is caused to be emitted from a fixed optical system to be converged through the objective lens and to be incident on the optical disc. The light reflected by the optical disc is incident on the fixed optical system via the objective lens. The head also controls a position of the objective lens in the tracking direction using a tracking error detected by the fixed optical system. A movable deflection member deflects a bundle of rays incident thereon in the tracking direction from the fixed optical system in a direction perpendicular to a focusing direction and also to the tracking direction. A fixed deflection member deflects the bundle of rays incident thereon from the movable deflection member in the focusing direction and causes the bundle of rays to be incident on the optical disc via the objective lens. A co-moving mechanism causes the movable deflection member to move integrally with the objective lens.

24 Claims, 34 Drawing Sheets

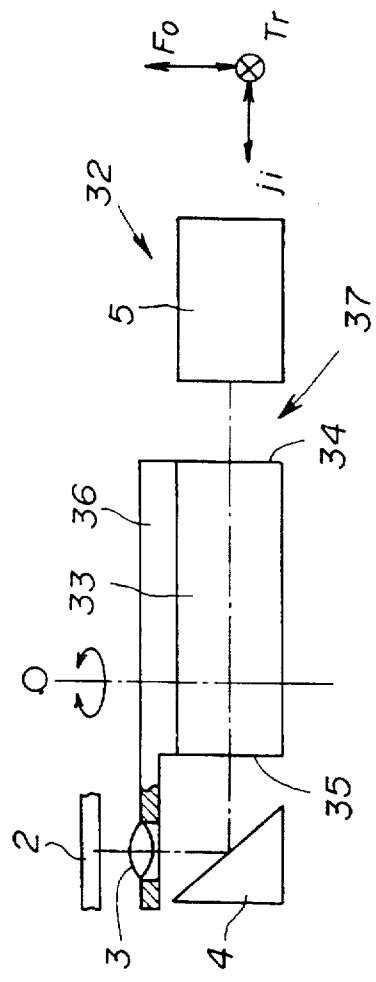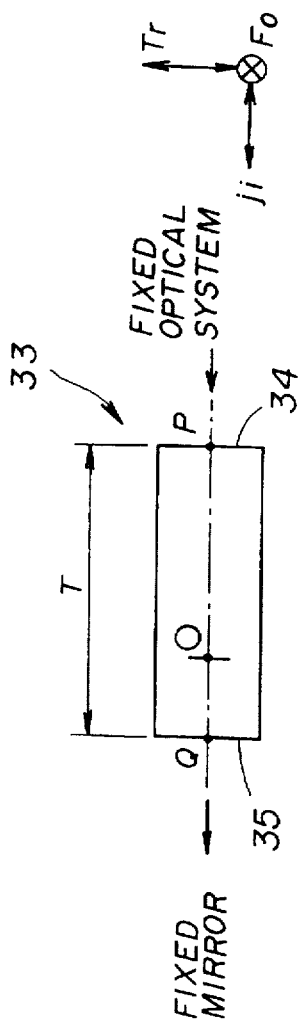

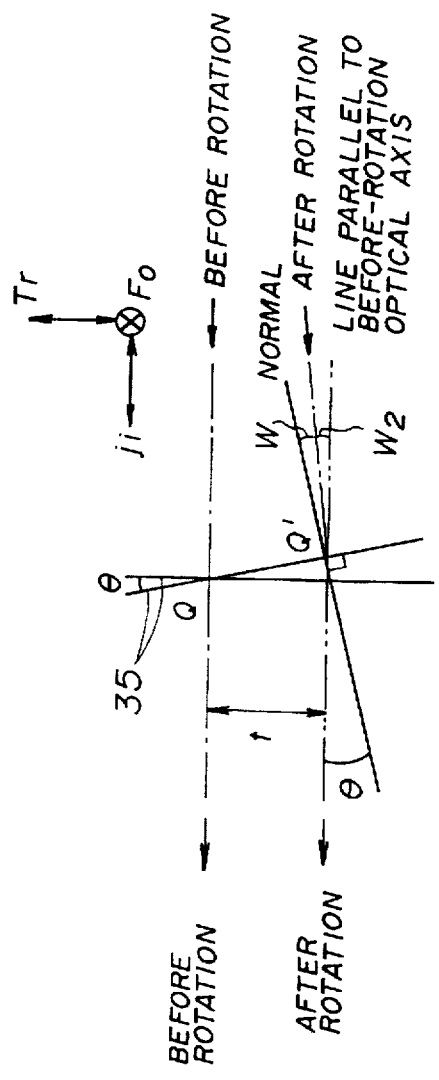
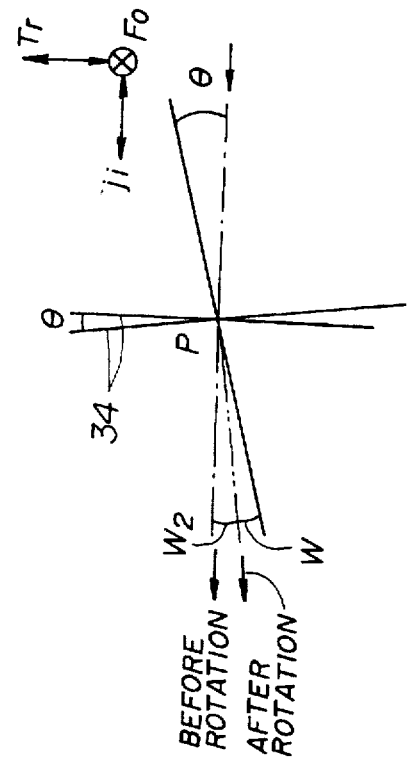
FIG.30A
FIG.30B 5,777,960

OPTICAL HEAD DEVICE INCLUDING FIXED AND MOVABLE DEFLECTION MEANS

BACKGROUND OF THE INVENTION

1. Field of the Invention

The present invention relates to an optical head device in which a position of an objective lens is controlled in a tracking direction.

2. Description of the Related Art

An optical disc player optically reads information recorded on a rotating optical disc. In order to read the recorded information in a desired condition, an optical head device is used for controlling the position of an objective lens in a tracking direction.

An optical head device 1 in the related art will now be described with reference to FIG. 1. In the figure, a focusing direction is referred to as Fo and a tracking direction is referred to as Tr. Further, a direction perpendicular to the focusing direction and also perpendicular to the tracking direction will be referred to as a jitter direction, and indicated by Ji in the figure.

In a position so as to face an optical disc 2 in the focusing direction Fo, an objective lens 3 and a fixed mirror 4 are arranged in this order. The objective lens 3 is movably supported, to be movable in the tracking direction, on a head body (not shown in the figure). The fixed mirror 4 is fixed on the head body and acts as a fixed deflection means. A fixed optical system 5 is fixed on the head body and is arranged in a position so as to face the fixed mirror in the jitter direction. As a result of each being fixed on the head body as mentioned above, the spatial relationship between the fixed optical system 5 and the fixed mirror 4 is also fixed.

The fixed optical system 5 has a semiconductor laser 6 which is a light-emitting element. Along an optical axis of the semiconductor laser 6, a collimator lens 7, a polarization beam splitter 8 and a quarter-wave plate 9 are arranged in the stated order. The quarter-wave plate 9 faces the fixed mirror 4. A image-formation lens 10 and a light-receiving element 11 are arranged in the order along a reflection light path of the polarization beam splitter 8.

In the optical head device 1, a bundle of rays emitted by the semiconductor laser 6 is deflected by the fixed mirror 4 in the focusing direction, converged by the objective lens 3 and incident on a track of the optical disc 2. The objective lens 3 converges a bundle of rays, which is reflected by the optical disc 2 in the focusing direction. The converged bundle of rays is deflected by the fixed mirror 4. The deflected bundle of rays is deflected by the polarization beam splitter 8, read by the light-receiving element 11 and thus a tracking error is detected. The detected tracking error is used for controlling a position of the objective lens 3 in the tracking direction. Thereby, a position of the bundle of rays incident on the optical disc 2 is adjusted to be on a track. Thus, when information is recorded on the optical disc 2, the information can be appropriately recorded on the track. When information is reproduced from the optical disc 2, the information can be appropriately reproduced from the track.

Thus, in the optical head device 1, the fixed optical system 5 reads information recorded on a track of the optical disc 2 as a result of controlling a position of the objective lens 3 in the tracking direction and thereby causing a position of an image formed on the optical disc 2 to follow the track.

However, if only the objective lens 3 is moved in the tracking direction while the fixed optical system 5 is fixed, an optical-axis deviation occurs in which an optical axis of a bundle of rays is incident on the objective lens 3 from the fixed optical system 5. If the optical head device 1 detects a tracking error in the well-known push-pull method, the optical-axis deviation forms a DC (Direct Current) offset. This is because a light receiving element included in the fixed optical system 5 is not aligned with an optical axis of a bundle of rays reflected by the optical disc 2 and converged by the objective lens 3. Therefore, the reflected light intensities of the two sides of the track do not balance one another even if the objective lens 3 is completely aligned with the track. If the DC offset is included in the detection signal of the push-pull tracking error detection method, accuracy of the tracking control is degraded.

Further, as shown in FIG. 2, intensity of a laser beam increases at a position closer to the center thereof and decreases at a position further from the center. Therefore, when the optical-axis deviation occurs, intensity of the bundle of rays incident on the optical disc 2 decreases. Consequently, it is not possible to stably record information on a track of the optical disc 2, and also it is not possible to appropriately reproduce information from a track of the optical disc 2. These problems occur when any tracking error method is applied.

An optical head device 312 is disclosed in Japanese Laid-Open Patent Application No. 4-14628 and eliminates such problems. In the optical device 312, as shown in FIG. 3, a bundle of rays emitted by a fixed optical system 305 in a focusing direction is deflected by a second mirror 314 into a jitter direction. Then, the bundle of rays is deflected by a first mirror 313 in a focusing direction, and thus is incident on an objective lens 303. Further, a bundle of rays reflected by the optical disc 302 and passing through the objective lens 303 in the focusing direction is deflected by the first mirror 313 in the jitter direction. Then, the bundle of rays is deflected by the second mirror 314 in the focusing direction, and thus is incident on the fixed optical system 305. The objective lens 303, first mirror 313 and second mirror 314 are integrally rotatably supported, a rotation axis thereof being coincident with an optical-axis center of the first mirror 313 and fixed optical system 305 and also being coincident with the focusing direction. Thereby, the objective lens 303 moves approximately in a tracking direction.

In this disclosed optical head device 312, the first mirror 313, second mirror 314 and objective lens 303 rotate integrally. Further, the fixed optical system 305 is located on an optical axis of the second mirror 314. Therefore, there is no optical-axis deviation in the bundle of rays incident on the objective lens from the second mirror. Further, there is no optical-axis deviation in the bundle of rays incident on the fixed optical system. However, in this device 312, the second mirror 314 and fixed optical system 305 are arranged in the focusing direction. Accordingly, it is difficult to miniaturize the optical head device 312 in a direction perpendicular to the optical disc 302.

Further, if an optical head device in which a mirror-lens parallel moving method is applied is used, because an objective lens and a reflection mirror integrally move there, no optical-axis deviation occurs. However, in this device, the objective lens is movably supported, to be movable in a focusing direction through a spring, on the reflection mirror. Thus, during a tracking operation, the objective lens tends to have a resonance vibration. Further, such an arrangement cannot be constructively applied to an optical head device in which tracking is performed by rotation of an objective lens.

For example, it can be considered that, in an optical head device using the mirror-lens parallel moving method, an objective lens and a reflection mirror are rotated together. However, in the arrangement, an optical axis of a bundle of rays incident on the objective lens is inclined, and thereby, light-converging performance is degraded. As a result, a spot incident on an optical disc is degraded.

An optical head device 201 in the related art will now be described with reference to FIG. 4. In the figure, a focusing direction is referred to as Fo, a tracking direction is referred to as Tr, and a direction perpendicular to the focusing direction and also perpendicular to the tracking direction is referred to as a jitter direction and indicated by Ji in the figure.

In the optical head device 201, a semiconductor laser 202 which is a laser light source is used. Along an optical axis of the semiconductor laser 202, a collimator lens 203, a grating 204 acting as a ray-bundle splitting means, a polarization beam splitter 205, a quarter-wave plate 206 and an objective lens 207 are arranged in the stated order. Along a reflection light path of the polarization beam splitter 205, a converging lens 208, a cylindrical lens 209 and a light-receiving element unit 210 are arranged in the stated order.

The optical head device 201 is provided as a part of a disc drive apparatus (not shown in the figure). The disc drive apparatus has a turntable (not shown in the figure) for rotatably supporting a replaceable optical disc 2. The optical head device 201 is movably supported, to be movable in the tracking direction, in a position so as to face the thus-supported optical disc 2, in the disc drive apparatus. In the optical head device 201, only the objective lens 207 is movably supported to be movable in the tracking direction. The other components 2–6, 8–10 are fixed in the optical head device 201, and constitute a fixed optical system 212. The optical head device 201 splits a bundle of rays and therefore the light-receiving element unit 210 actually includes three light-receiving elements.

In the optical head device 201, a bundle of rays emitted by the semiconductor laser 202 becomes a parallel bundle of rays through the collimator lens 203, and is then split into one main bundle of rays and two sub-bundles of rays through the grating 204. The three bundles of rays are converged by the objective lens 207, and are incident on a rotating optical disc 2. At this time, the main bundle of rays forms an image on a track of the optical disc 2, and the two sub-bundles of rays form images on two gaps, located at the two sides of the track, respectively. The three bundles of rays are reflected by the optical disc 2 in the focusing direction, then deflected by the polarization beam splitter 205, and then detected by the light-receiving element unit 210.

A focusing error and a tracking error are detected from an output signal of the light-receiving element unit 210. Using the detected focusing and tracking errors, a position of the objective lens 207 is controlled in the tracking direction and focusing direction. Accordingly, a spot formed on the optical disc 2 is adjusted to be on the track.

Specifically, a push-pull signal is generated from each of the three bundles of rays, and the push-pull signals of the two sub-bundles of rays are subtracted from the push-pull signal of the main bundle of rays. It is possible to detect the tracking error from a single push-pull signal. However, by performing the subtracting as mentioned above, it is possible to detect the tracking error more accurately. Such a method is referred to as a differential push-pull method and disclosed in Japanese Laid-Open Patent Application Nos. 61-94246 and 7-93764, for example.

Thus, in the optical head device 201, it is possible to appropriately perform a tracking operation so that the main bundle of rays is appropriately incident on a track of the optical disc 2. Thereby, information is appropriately recorded on the track of the optical disc 2, and also information is appropriately reproduced from the track of the optical disc 2. The focusing error is detected from the main bundle of rays.

In the optical head device 201, a position of the objective lens 207 is controlled in the tracking direction and focusing direction, and thereby the fixed optical system 212 appropriately performs information recording on and reproducing from a track of the optical disc 2.

As shown in FIG. 5, the intensity of a laser light is stronger at a position closer to the center and is weaker at a position further from the center. Therefore, as shown in FIG. 6, when an optical-axis deviation occurs with respect to the objective lens 207, the light intensity per area of a spot formed on the optical disc 2 from the objective lens 207 decreases. As a result, it is not possible to stably record information on a track of the optical disc 2, and also it is not possible to appropriately reproduce information from a track of the optical disc 2.

Similarly, when a focusing error occurs, as shown in FIG. 7, the light intensity per area of a spot formed on the optical disc 2 decreases. Similarly, when a disc tilt occurs, as shown in FIG. 8, the light intensity per area of a spot formed on the optical disc 2 decreases. Disc tilt is a condition in which the optical disc 2 tilts with respect to the optical head device 201.

Such decrease of a light intensity per area of a spot formed on the optical disc 2 seriously adversely affects recording information on the optical disc 2. Therefore, in the optical head device 3 in the related art, optical-axis deviation and disc tilt is detected through a respective sensor device. Based on the detection results, output of the semiconductor laser 202 is appropriately corrected. However, in this method, special sensors are needed and also the number of components increases. Accordingly, assembly of the optical head device is complicated and also it is difficult to miniaturize the optical head device and to reduce the weight thereof.

SUMMARY OF THE INVENTION

In a first optical head device according to the present invention, a bundle of rays emitted from the fixed optical system in the tracking direction is deflected in the jitter direction through a movable deflection means. The resulting bundle of rays is deflected in the focusing direction through a fixed deflection means and is incident on the optical disc via the objective lens. At this time, because a co-moving mechanism causes the movable deflection means to move integrally with the objective lens, no optical-axis deviation occurs due to objective lens movement in the tracking control. Because no optical-axis deviation occurs in the bundle of rays incident on the objective lens via various deflection means from the fixed optical system, it is possible to appropriately detect a tracking error through the push-pull method. Further, light intensity variation due to light intensity distribution of the laser light can be prevented. Further, because the optical-axis deviation can be prevented, it is not necessary to provide many optical components in the focusing direction. Thereby, it is possible to reduce the size of the device in the focusing direction.

In a second optical head device according to the present invention, a bundle of rays emitted from the fixed optical system is even-number times (for example, twice, fourth, sixth or so) deflected through a movable deflection means. The resulting bundle of rays is deflected into the focusing direction through a fixed deflection means and is incident on the optical disc via the objective lens. At this time, because a co-moving mechanism causes the movable deflection means to move integrally with the objective lens, no optical-axis deviation occurs due to objective lens movement in the tracking control. Because no optical-axis deviation occurs in the bundle of rays incident on the objective lens via various deflection means from the fixed optical system, it is possible to appropriately detect a tracking error through the push-pull method. Further, light intensity variation due to light intensity distribution of the laser light can be prevented. Further, because the optical-axis deviation can be prevented, it is not necessary to provide many optical components in the focusing direction. Thereby, it is possible to reduce the size of the device in the focusing direction.

In a third optical head device according to the present invention, a bundle of rays emitted from the fixed optical system in the jitter direction is deflected in the tracking direction through first movable deflection means. Second movable deflection means deflects the resulting bundle of rays in the jitter direction. The resulting bundle of rays is deflected in the focusing direction through a fixed deflection means and is incident on the optical disc via the objective lens. At this time, because a co-moving mechanism causes the first and second movable deflection means to move integrally with the objective lens, no optical-axis deviation occurs due to objective lens movement in the tracking control. Because no optical-axis deviation occurs in the bundle of rays incident on the objective lens via various deflection means from the fixed optical system, it is possible to appropriately detect a tracking error through the push-pull method. Further, light intensity variation due to light intensity distribution of the laser light can be prevented. Further, because the optical-axis deviation can be prevented, it is not necessary to provide many optical components in the focusing direction. Thereby, it is possible to reduce the size of the device in the focusing direction.

In a fourth optical head device according to the present invention, a bundle of rays emitted from the fixed optical system in the tracking direction is deflected into the jitter direction through first movable deflection means. Second movable deflection means deflects the resulting bundle of rays in the tracking direction. The resulting bundle of rays is deflected in the jitter direction through a first fixed deflection means. The resulting bundle of rays is deflected into the focusing direction through a second fixed deflection means and is incident on the optical disc via the objective lens. At this time, because a co-moving mechanism causes the first and second movable deflection means to move integrally with the objective lens, no optical-axis deviation occurs due to objective lens movement in the tracking control. Because no optical-axis deviation occurs in the bundle of rays incident on the objective lens via various deflection means from the fixed optical system, it is possible to appropriately detect a tracking error through the push-pull method. Further, light intensity variation due to light intensity distribution of the laser light can be prevented. Further, because the optical-axis deviation can be prevented, it is not necessary to provide many optical components in the focusing direction. Thereby, it is possible to reduce the size of the device in the focusing direction.

In a fifth optical head device according to the present invention, a bundle of rays emitted from the fixed optical system is successively transmitted through a plurality of parallel transmission planes by a movable deflection means. The resulting bundle of rays is deflected in the focusing direction through a fixed deflection means and is incident on the optical disc via the objective lens. At this time, because a co-moving mechanism causes the movable deflection means to move integrally with the objective lens, no optical-axis deviation occurs due to objective lens movement in the tracking control. Because no optical-axis deviation occurs in the bundle of rays incident on the objective lens via various deflection means from the fixed optical system, it is possible to appropriately detect a tracking error through the push-pull method. Further, light intensity variation due to light intensity distribution of the laser light can be prevented. Further, because the optical-axis deviation can be prevented, it is not necessary to provide many optical components in the focusing direction. Thereby, it is possible to reduce the size of the device in the focusing direction.

In a sixth optical head device according to the present invention, a bundle of rays emitted from the fixed optical system in the jitter direction is deflected in the focusing direction through first movable deflection means. A fixed deflection means deflects the resulting bundle of rays in the jitter direction. The resulting bundle of rays is deflected in the focusing direction through second movable deflection means and is incident on the optical disc via the objective lens. At this time, because a co-moving mechanism causes the first and second movable deflection means to move integrally with the objective lens, no optical-axis deviation occurs due to objective lens movement in the tracking control. Because no optical-axis deviation occurs in the bundle of rays incident on the objective lens via various deflection means from the fixed optical system, it is possible to appropriately detect a tracking error through the push-pull method. Further, light intensity variation due to light intensity distribution of the laser light can be prevented. Further, because the optical-axis deviation can be prevented, it is not necessary to provide many optical components in the focusing direction. Thereby, it is possible to reduce the size of the device in the focusing direction.

In a seventh optical head device according to the present invention, a bundle of rays in the tracking direction is deflected in the jitter direction through movable deflection means. The resulting bundle of rays is deflected through fixed deflection means in the focusing direction and is incident on the optical disc via the objective lens. At this time, because a co-moving mechanism causes the movable deflection means to move integrally with the objective lens, no optical-axis deviation occurs due to objective lens movement in the tracking control. Further, the bundle of rays is split into a main bundle of rays and a sub-bundle of rays and push-pull signals are detected individually from the main bundle of rays and sub-bundle of rays. A result of adding the two push-pull signals indicates optical-axis deviation and disc tilt. However, no optical-axis deviation occurs in the objective lens as mentioned above and the adding result can be considered to indicate only the disc tilt and thus can be treated as a disc tilt signal. Because no optical-axis deviation occurs in the bundle of rays incident on the objective lens via various deflection means from the fixed optical system, spot light intensity variation due to light intensity distribution of the laser light can be prevented. Thereby, information recording/reproducing can be appropriately performed on the optical disc. Further, because it is possible to obtain the disc tilt signal from the push-pull signals without either providing any special sensor device for detecting disc tilt or any special sensor device for detecting the optical-axis deviation, the optical head device can be effectively miniaturized, reduced in its weight, and manufactured with high efficiency.

In an eighth optical head device according to the present invention, a bundle of rays in a predetermined direction is deflected even-number times (for example, twice, fourth, sixth or so) through movable deflection means. The resulting bundle of rays is deflected through fixed deflection means in the focusing direction and is incident on the optical disc via the objective lens. At this time, because a co-moving mechanism causes the movable deflection means to move integrally with the objective lens, no optical-axis deviation occurs due to objective lens movement in the tracking control. Further, the bundle of rays is split into a main bundle of rays and a sub-bundle of rays and push-pull signals are detected individually from the main bundle of rays and sub-bundle of rays. A result of adding the two push-pull signals indicates optical-axis deviation and disc tilt. However, no optical-axis deviation occurs in the objective lens as mentioned above. The adding result can be considered to indicate only disc tilt and thus can be treated as a disc tilt signal. Because no optical-axis deviation occurs in the bundle of rays incident on the objective lens via various deflection means from the fixed optical system, spot light intensity variation due to light intensity distribution of the laser light can be prevented. Thereby, information recording/reproducing can be appropriately performed on the optical disc. Further, because it is possible to obtain the disc tilt signal from the push-pull signals without either providing any special sensor device for detecting disc tilt or any special sensor device for detecting the optical-axis deviation, the optical head device can be effectively miniaturized, reduced in its weight, and manufactured with high efficiency.

In a ninth optical head device according to the present invention, a bundle of rays in the jitter direction is deflected in the tracking direction through first movable deflection means. The resulting bundle of rays is deflected through second movable deflection means in the jitter direction. The resulting bundle of rays is deflected through fixed deflection means in the focusing direction and is incident on the optical disc via the objective lens. At this time, because a co-moving mechanism causes the first and second movable deflection means to move integrally with the objective lens, no optical-axis deviation occurs due to objective lens movement in the tracking control. Further, the bundle of rays is split into a main bundle of rays and a sub-bundle of rays and push-pull signals are detected individually from the main bundle of rays and sub-bundle of rays. A result of adding the two push-pull signals indicates optical-axis deviation and disc tilt. However, no optical-axis deviation occurs in the objective lens as mentioned above. The adding result can be considered to indicate only disc tilt and thus can be treated as a disc tilt signal. Because no optical-axis deviation occurs in the bundle of rays incident on the objective lens via various deflection means from the fixed optical system, spot light intensity variation due to light intensity distribution of the laser light can be prevented. Thereby, information recording/reproducing can be appropriately performed on the optical disc. Further, because it is possible to obtain the disc tilt signal from the push-pull signals without providing any special sensor device for detecting disc tilt or any special sensor device for detecting the optical-axis deviation, the optical head device can be effectively miniaturized, reduced in weight, and manufactured with high efficiency.

In a tenth head device according to the present invention, a bundle of rays in the tracking direction is deflected in the jitter direction through first movable deflection means. The resulting bundle of rays is deflected through second movable deflection means in the tracking direction. The resulting bundle of rays is deflected through first fixed deflection means in the jitter direction. The resulting bundle of rays is deflected through second fixed deflection means in the focusing direction and is incident on the optical disc via the objective lens. At this time, because a co-moving mechanism causes the first and second movable deflection means to move integrally with the objective lens, no optical-axis deviation occurs due to objective lens movement in the tracking control. Further, this bundle of rays is split into a main bundle of rays and a sub-bundle of rays and push-pull signals are detected individually from the main bundle of rays and the sub-bundle of rays. A result of adding the two push-pull signals indicates optical-axis deviation and disc tilt. However, no optical-axis deviation occurs in the objective lens as mentioned above. The adding result can be considered to indicate only disc tilt and thus can be treated as a disc tilt signal. Because no optical-axis deviation occurs in the bundle of rays incident on the objective lens via various deflection means from the fixed optical system, spot light intensity variation due to light intensity distribution of the laser light can be prevented. Thereby, information recording/reproducing can be appropriately performed on the optical disc. Further, because it is possible to obtain the disc tilt signal from the push-pull signals without providing any special sensor device for detecting disc tilt or any special sensor device for detecting the optical-axis deviation, the optical head device can be effectively miniaturized, reduced in weight, and manufactured with high efficiency.

In an eleventh optical head device according to the present invention, a bundle of rays in the jitter direction is transmitted by an even-number of transmission planes of movable deflection means. The resulting bundle of rays is deflected through fixed deflection means in the focusing direction and is incident on the optical disc via the objective lens. At this time, because a co-moving mechanism causes the movable deflection means to move integrally with the objective lens, no optical-axis deviation occurs due to objective lens movement in the tracking control. Further, the bundle of rays is split into a main bundle of rays and a sub-bundle of rays and push-pull signals are detected individually from the main bundle of rays and the sub-bundle of rays. A result of adding the two push-pull signals indicates optical-axis deviation and disc tilt. However, no optical-axis deviation occurs in the objective lens as mentioned above, the above-mentioned adding result can be considered to indicate only disc tilt and thus can be treated as a disc tilt signal. Because no optical-axis deviation occurs in the bundle of rays incident on the objective lens via various deflection means from the fixed optical system, spot light intensity variation due to light intensity distribution of the laser light can be prevented. Thereby, information recording/reproducing can be appropriately performed on the optical disc. Further, because it is possible to obtain the disc tilt signal from the push-pull signals without providing any special sensor device for detecting disc tilt or any special sensor device for detecting the optical-axis deviation, the optical head device can be effectively miniaturized, reduced in weight, and manufactured with high efficiency.

In a twelfth head device according to the present invention, a bundle of rays in the jitter direction is deflected in the focusing direction through first movable deflection means. The resulting bundle of rays is deflected through fixed deflection means in the jitter direction. The resulting bundle of rays is deflected through second movable deflection means in the focusing direction and is incident on the optical disc via the objective lens. At this time, because a co-moving mechanism causes the first and second movable deflection means to move integrally with the objective lens, no optical-axis deviation occurs due to objective lens movement in the tracking control. Further, the bundle of rays is split into a main bundle of rays and a sub-bundle of rays and push-pull signals are detected individually from the main bundle of rays and sub-bundle of rays. A result of adding the two push-pull signals indicates optical-axis deviation and disc tilt. However, no optical-axis deviation occurs in the objective lens as mentioned above. The adding result can be considered to indicate only disc tilt and thus can be treated as a disc tilt signal. Because no optical-axis deviation occurs in the bundle of rays incident on the objective lens via various deflection means from the fixed optical system, spot light intensity variation due to light intensity distribution of the laser light can be prevented. Thereby, information recording/reproducing can be appropriately performed on the optical disc. Further, because it is possible to obtain the disc tilt signal from the push-pull signals without providing any special sensor device for detecting disc tilt or any special sensor device for detecting the optical-axis deviation, the optical head device can be effectively miniaturized, reduced in weight, and manufactured with high efficiency.

In a thirteenth optical head device according to the present invention, output control means controls output of the laser light source using the tilt signal. Therefore, when disc tilt occurs and thus a converging rate of the spot formed on the optical disc decreases, the output of the laser light source is controlled to compensate the converging-rate decrease. Thus, the spot light intensity can be maintained to be constant.

In a fourteenth optical head device according to the present invention, a focusing signal indicating a focusing error from a detection result of the main bundle of rays is produced through a focusing signal generating means. Further, output control means controls output of the laser light source using the focusing signal and the tilt signal. Therefore, when the disc tilt and focusing error occurs and thus a converging rate of the spot formed on the optical disc decreases, the output of the laser light source is controlled to compensate the converging-rate decrease. Thus, the spot light intensity can be maintained to be constant.

In a fifteenth optical head device according to the present invention, a bundle of rays emitted from the fixed optical system in the tracking direction is deflected in the jitter direction through movable deflection means, the resulting bundle of rays is deflected in the focusing direction through fixed deflection means and is incident on the optical disc via the objective lens. At this time, because the movable deflection means moves integrally with the objective lens, no optical-axis deviation occurs due to objective lens movement in the tracking control. Because no optical-axis deviation occurs in the bundle of rays incident on the objective lens via various deflection means from the fixed optical system, it is possible to detect a tracking error through the push-pull method. Further, spot light intensity variation due to light intensity distribution of the laser light can be prevented. Further, a distance in the focusing direction between a position of the center of gravity of the movable member including the objective lens and movable deflection means and the principal point of the objective lens is approximately the same as the focal length of the objective lens. Thereby, if the movable member including the objective lens and movable deflection means causes rotation resonance about a rotation axis in the jitter direction, an incident angle of the bundle of rays incident on the objective lens sifts because the movable deflection means turns accordingly. However, the objective lens also moves together and, thus, image forming position shift due to the inclination of the incident bundle of rays is canceled. As a result, a position of the light spot formed on the optical disc does not shift. Thus, occurrence of jitter error can be prevented.

In a sixteenth optical head device according to the present invention, a bundle of rays emitted from the fixed optical system in the tracking direction is deflected in the jitter direction through movable deflection means, the resulting bundle of rays is deflected in the focusing direction through fixed deflection means and is incident on the optical disc via the objective lens. At this time, because the movable deflection means moves integrally with the objective lens, no optical-axis deviation occurs due to objective lens movement in the tracking control. Because no optical-axis deviation occurs in the bundle of rays incident on the objective lens via various deflection means from the fixed optical system, it is possible to detect a tracking error through the push-pull method. Further, spot light intensity variation due to light intensity distribution of the laser light can be prevented. Further, a position of the center of gravity of the movable member including the movable deflection means and objective lens, the objective lens and the movable deflection means are arranged in the stated order in the jitter direction; and a distance along the jitter direction between the position of the center of gravity of the movable member and the principal point of the objective lens is approximately twice the focal length of the objective lens. Thereby, if the movable member including the objective lens and movable deflection means causes rotation resonance therein with a rotation axis in the tracking direction, an incident angle of the bundle of rays incident on the objective lens sifts because the movable deflection means turns accordingly. However, the objective lens also moves together and thus image forming position shift due to the inclination of the incident bundle of rays is canceled. As a result, a position of the light spot formed on the optical disc does not shift. Thus, occurrence of tracking error can be prevented.

In a seventeenth optical head device according to the present invention, a bundle of rays emitted from the fixed optical system is deflected an even-number of times in the jitter direction through movable deflection means. The resulting bundle of rays is deflected in the focusing direction through fixed deflection means and is incident on the optical disc via the objective lens. At this time, because the movable deflection means moves integrally with the objective lens, no optical-axis deviation occurs due to objective lens movement in the tracking control. Because no optical-axis deviation occurs in the bundle of rays incident on the objective lens via various deflection means from the fixed optical system, it is possible to detect a tracking error through the push-pull method. Further, spot light intensity variation due to light intensity distribution of the laser light can be prevented. Further, a distance in the focusing direction between the position of the center of gravity of the movable member including the objective lens and movable deflection means and the principal point of the objective lens is approximately twice the focal length of the objective lens. Thereby, if the movable member including the objective lens and movable deflection means causes rotation resonance therein with a rotation axis in the tracking direction, an incident angle of the bundle of rays incident on the objective lens sifts because the movable deflection means turns accordingly. However, the objective lens also moves therewith and thus image forming position shift due to the inclination of the incident bundle of rays is canceled. As a result, a position of the light spot formed on the optical disc does not shift. Thus, occurrence of jitter error can be prevented.

In an eighteen optical head device according to the present invention, a central position of an elastic support, a central position of the control driving and the position of the center of gravity of the movable member are approximately at the same position. Thereby, such rotation resonance as that mentioned above is not likely to occur even when stress applied to the control driving and/or reaction forces of the elastic support are applied to the movable member because the stress applied in the control driving and/or reaction forces of the elastic support affect the position of the center of gravity of the movable member.

Further, it may be that the position of the center of gravity of the movable member is located on the optical axis of the objective lens. Thereby, when the movable member causes the rotation resonance, the objective lens does not shift in the focusing direction. Thus, the focusing control can be easily and properly performed.

Further, a weight may be provided to a lens holder holding the objective lens and movable deflection means of the movable member so as to adjust the position of the center of gravity of the movable member. Thereby, it is possible to easily adjust the position of the center of gravity of the movable member by use of a simple structure.

Other objects and further features of the present invention will become more apparent from the following detailed description when read in conjunction with the accompanying drawings.

BRIEF DESCRIPTION OF DRAWINGS

FIG. 28 shows a side view of the optical head device in the fourth embodiment and in the fourteenth embodiment;

FIG. 29 shows a rectangular-parallelepiped prism acting as movable deflection means in the fourth embodiment and in the fourteenth embodiment;

FIG. 30A shows a plan view indicating a first transmission plane in the optical head device shown in FIG. 28;

FIG. 30B shows a plan view indicating a second transmission plane in the optical head device shown in FIG. 28;

13

Figure 41:
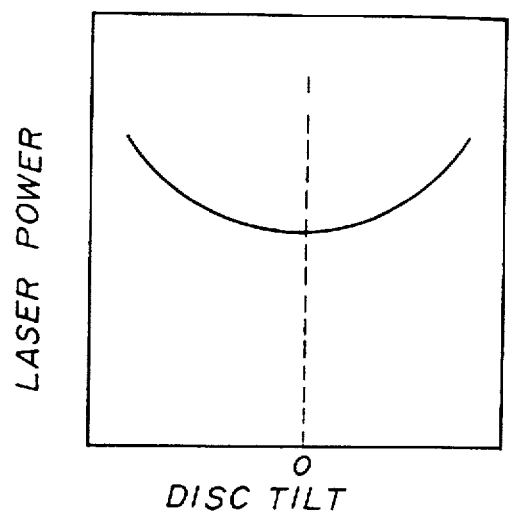
Figure 42:
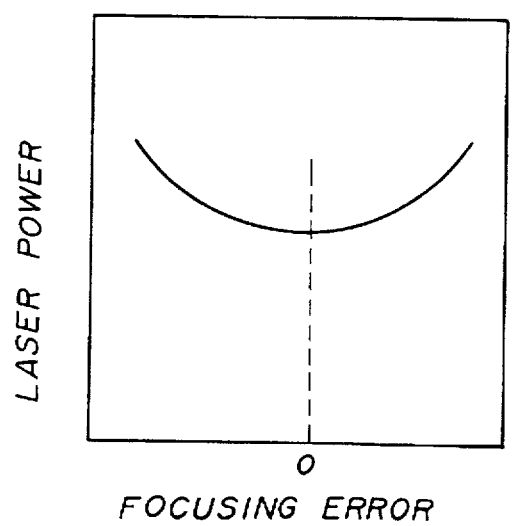
Figure 43:
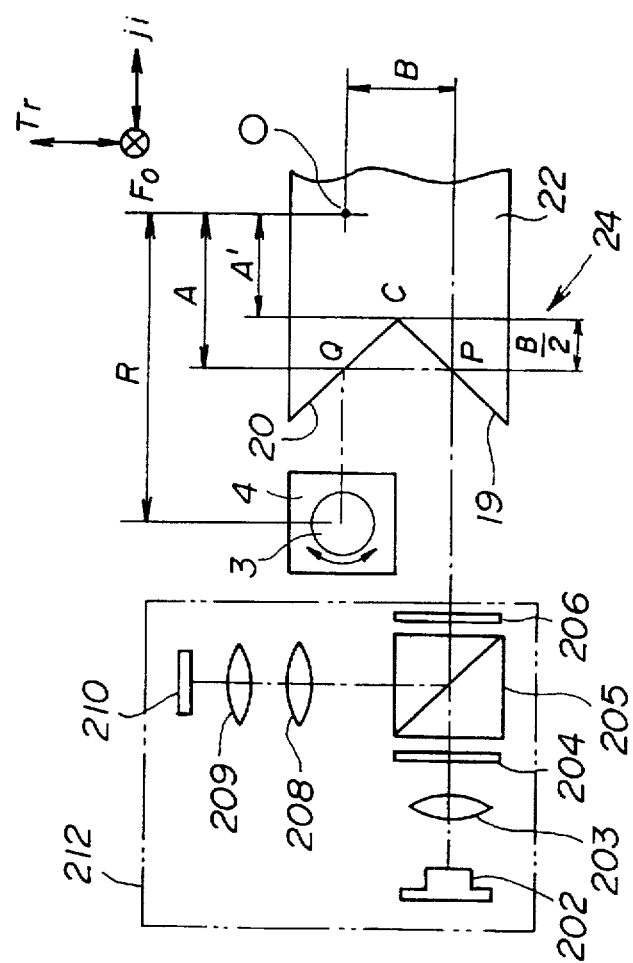
Figure 44:
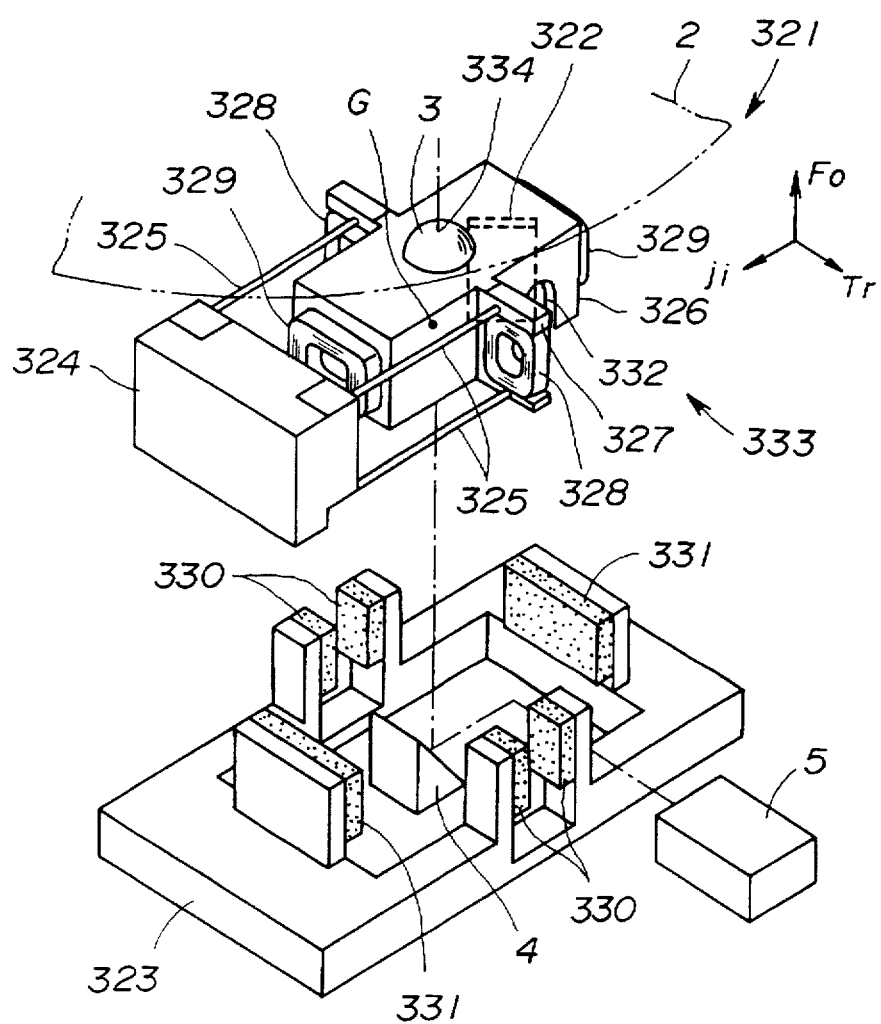
Figure 45:
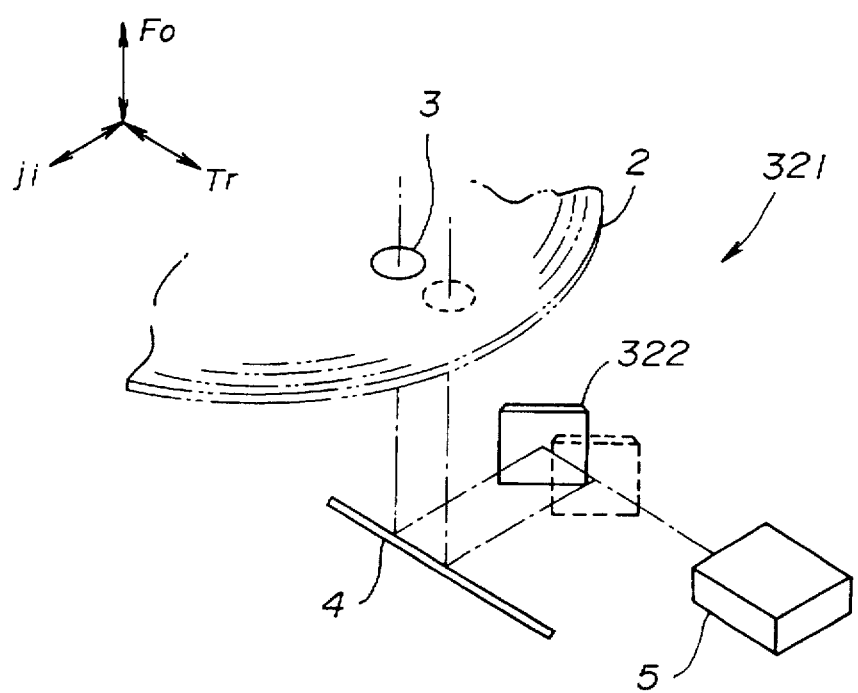
Figure 46:
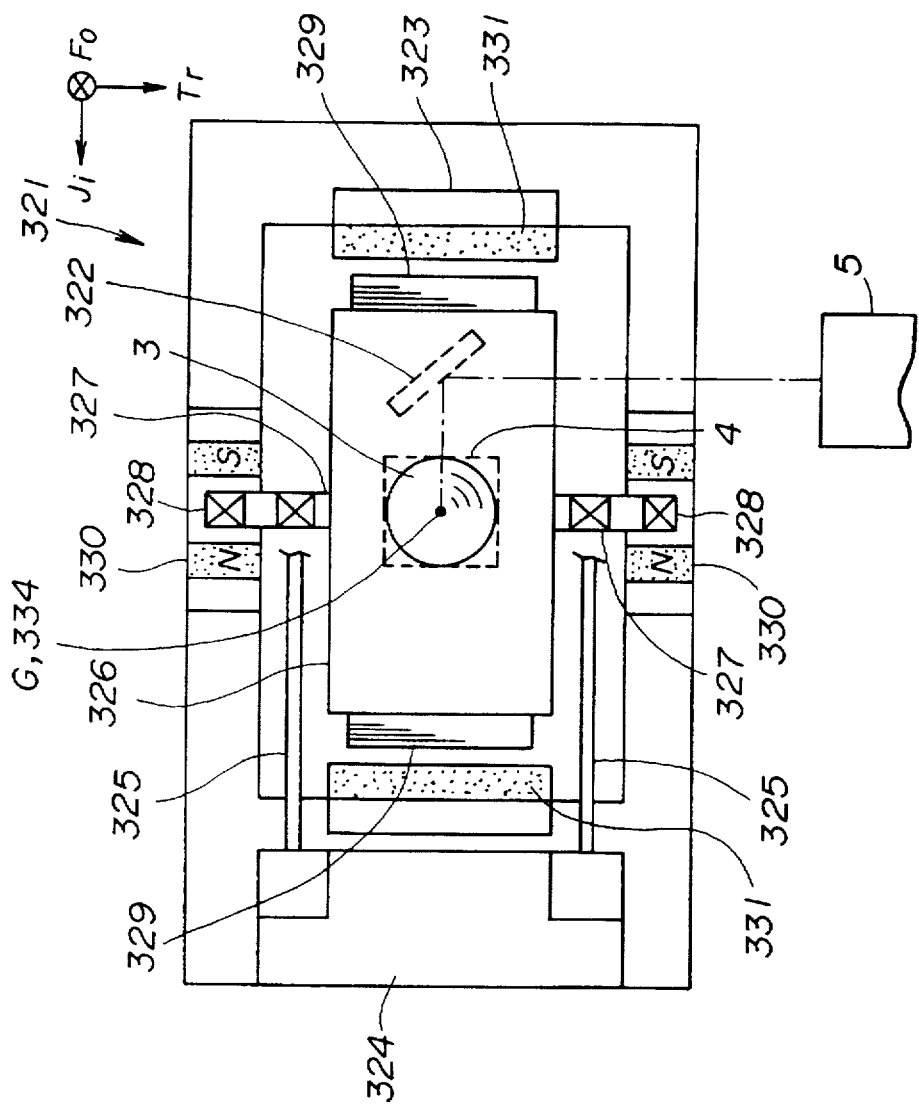
Figure 47:
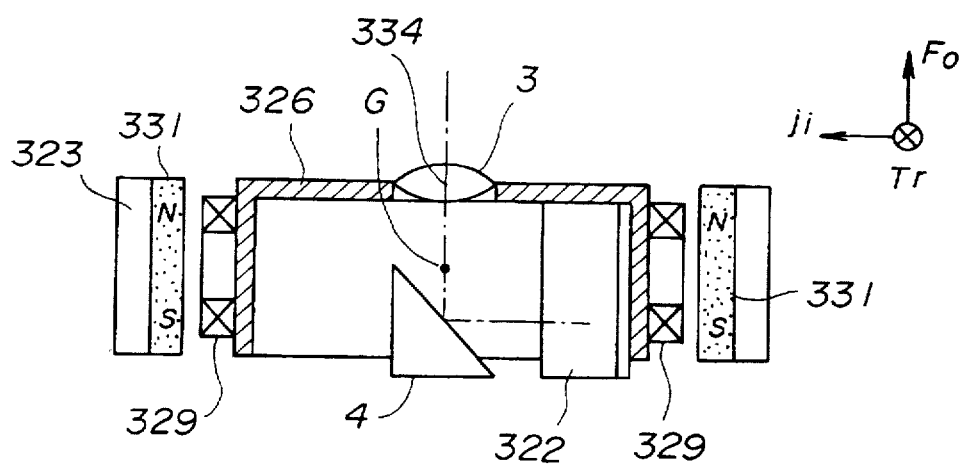
Figure 48:
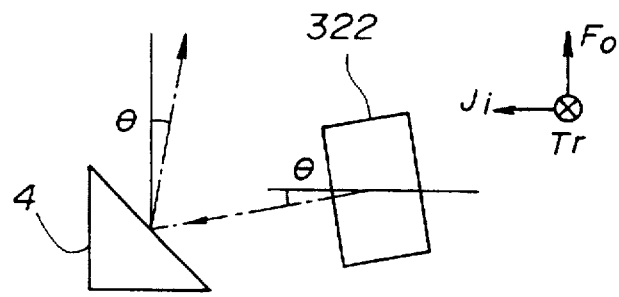
Figure 49:
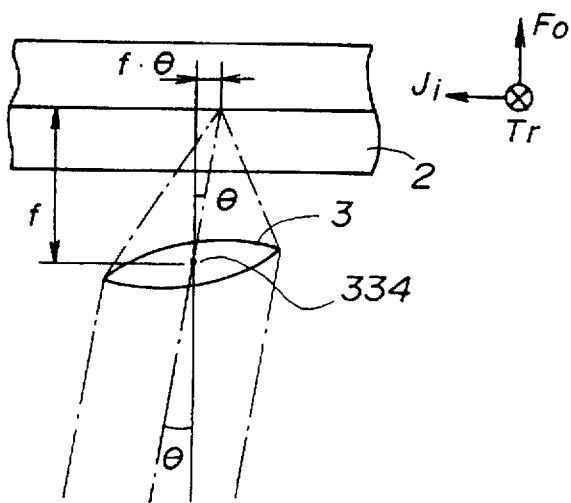
Figure 50:
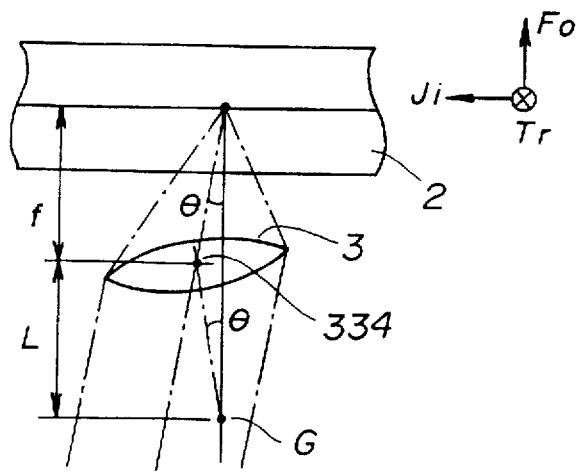
Figure 51:
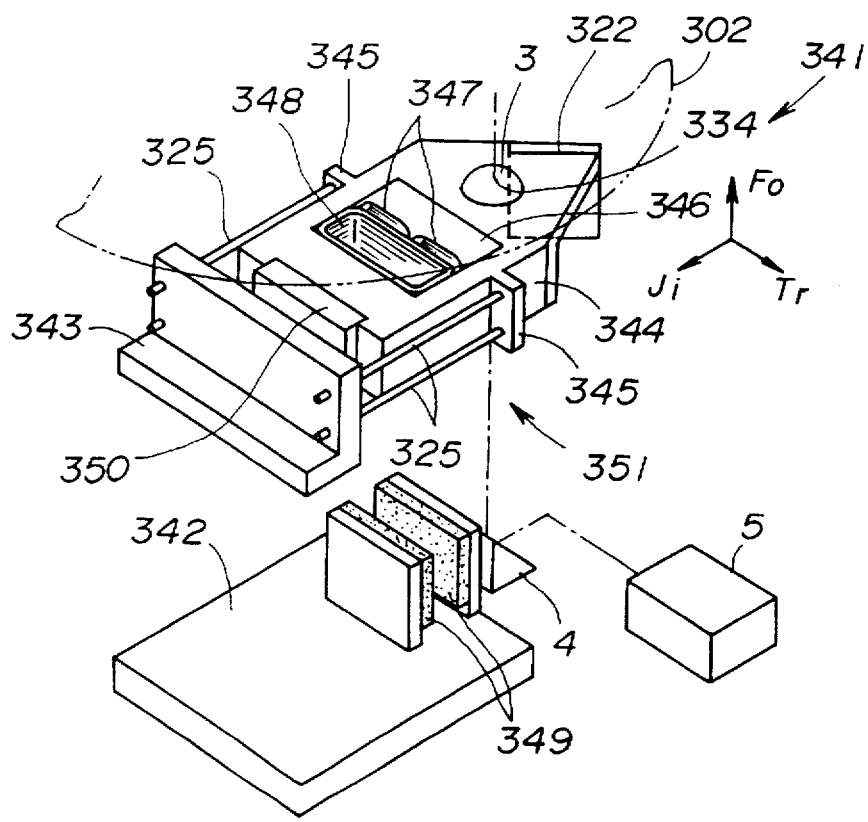
Figure 52:
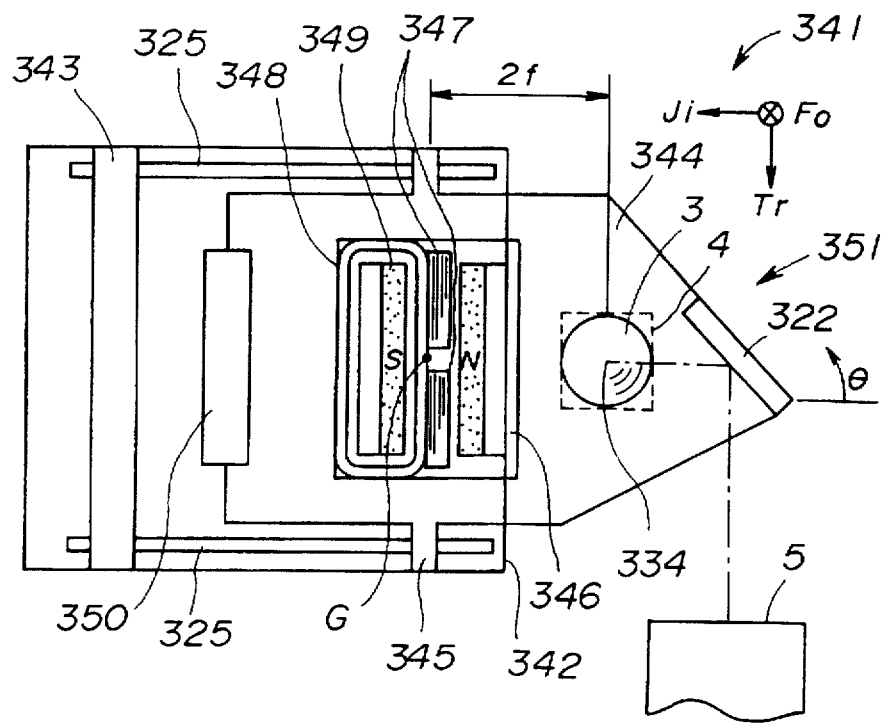
Figure 53:
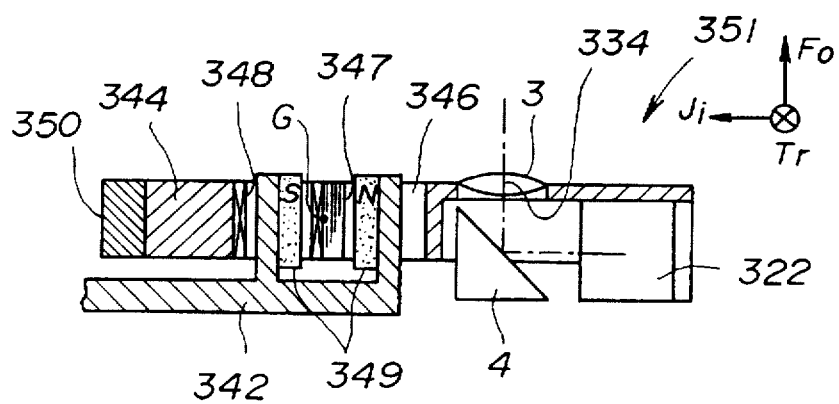
Figure 54:
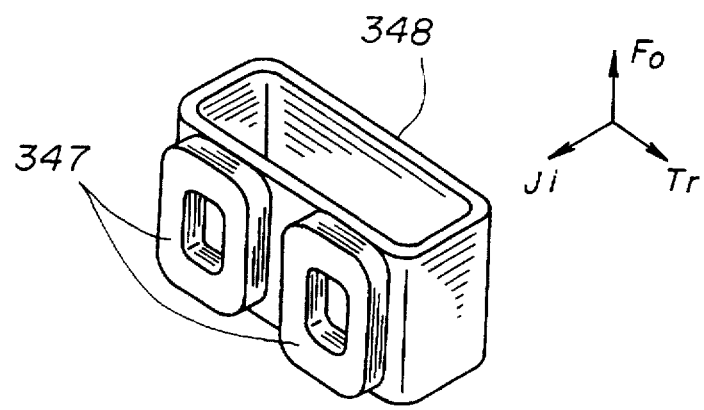
Figure 55:
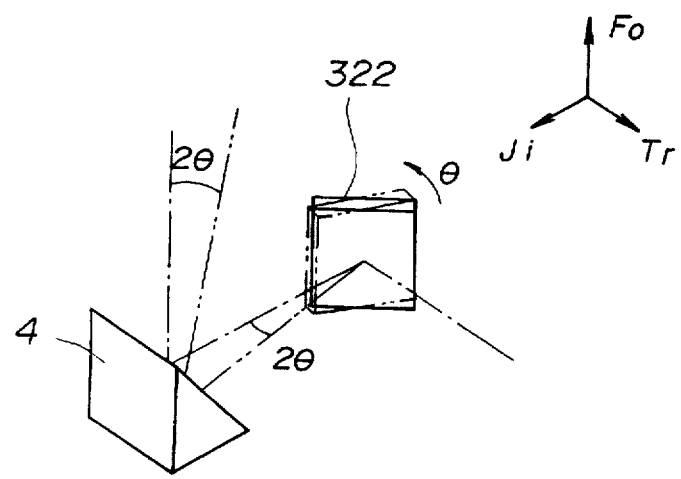
Figure 56:
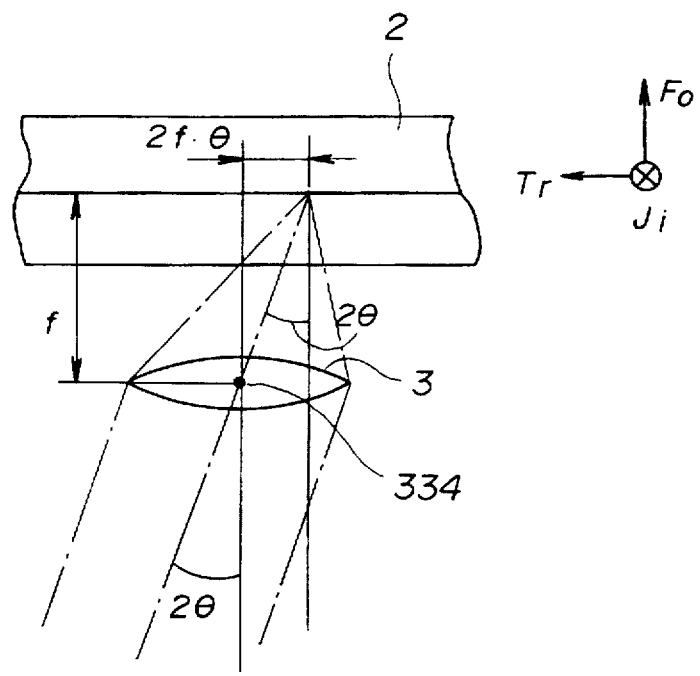
Figure 57:
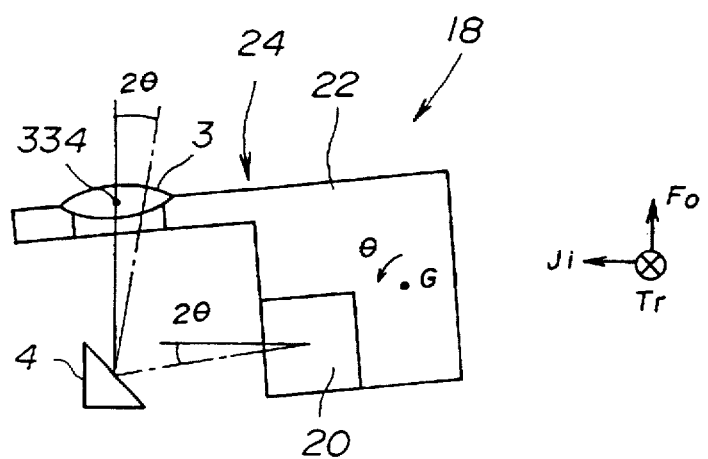
Figure 58:
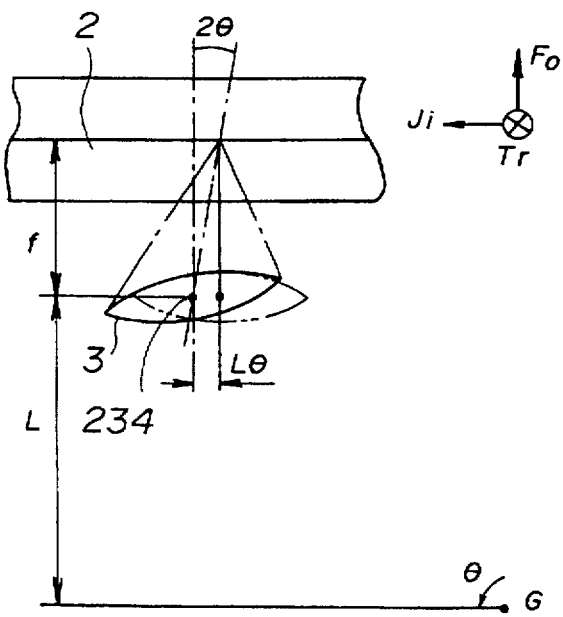

FIG. 41 shows a characteristic graph indicating a relationship between a disc tilt and a laser output;

FIG. 42 shows a characteristic graph indicating a relationship between a focusing error and a laser output;

FIG. 43 shows a plan view of the optical head device in the twelfth embodiment of the present invention;

FIG. 44 shows an exploded, perspective view of an optical head device in a twenty-first embodiment of the present invention;

FIG. 45 shows a perspective view indicating an arrangement of components/parts of the optical head device in the twenty-first embodiment;

FIG. 46 shows a plan view of the optical head device in the twenty-first embodiment of the present invention;

FIG. 47 shows a side-elevational, longitudinal-sectional view of the optical head device in the twenty-first embodiment;

FIG. 48 illustrates a state in which a bundle of rays, incident on a fixed mirror acting as fixed deflection means from a movable mirror acting as movable deflection means, turns;

FIG. 49 illustrates a state in which a light spot, formed on an optical disc through an objective lens, shifts;

FIG. 50 illustrates a state in which a rotation of a bundle of rays and a shift of the objective lens cancel out one another;

FIG. 51 shows an exploded, perspective view of an optical head device in a twenty-second embodiment of the present invention;

FIG. 52 shows a plan view of the optical head device in the twenty-second embodiment of the present invention;

FIG. 53 shows a side-elevational, longitudinal-sectional view of the optical head device in the twenty-second embodiment;

FIG. 54 shows a perspective view of tracking coils and a focusing coil of the optical device in the twenty-second embodiment;

FIG. 55 illustrates a state in which a bundle of rays, incident on a fixed mirror acting as fixed deflection means from a movable mirror acting as movable deflection means, turns in the twenty-second embodiment;;

FIG. 56 illustrates a state in which a light spot, formed on an optical disc through an objective lens, shifts in the twenty-second embodiment;;

FIG. 57 illustrates a state in which a movable member is inclined in the twenty-third embodiment; and FIG. 58 illustrates a state in which a rotation of a bundle of rays and a shift of the objective lens cancel out one another in the twenty-third embodiment.

DETAILED DESCRIPTION OF PREFERRED EMBODIMENTS

Figure 9:
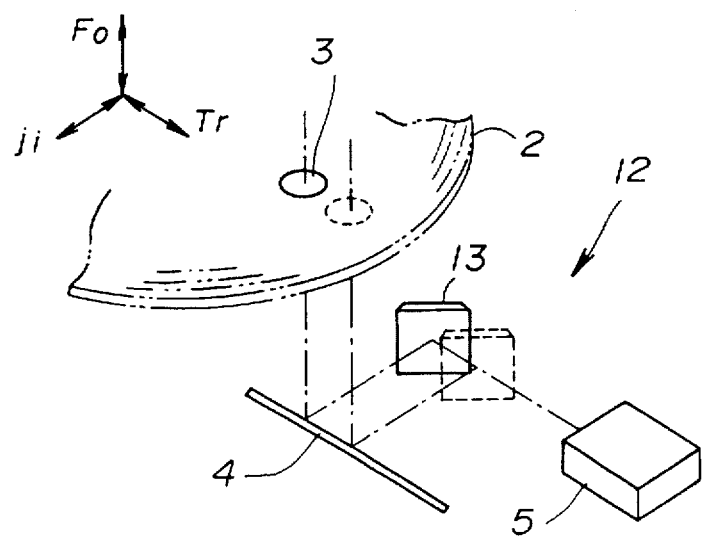
FIG. 9 shows an exploded, perspective view indicating arrangement of various components/parts of an optical head device in a first embodiment of the present invention.
Figure 10:
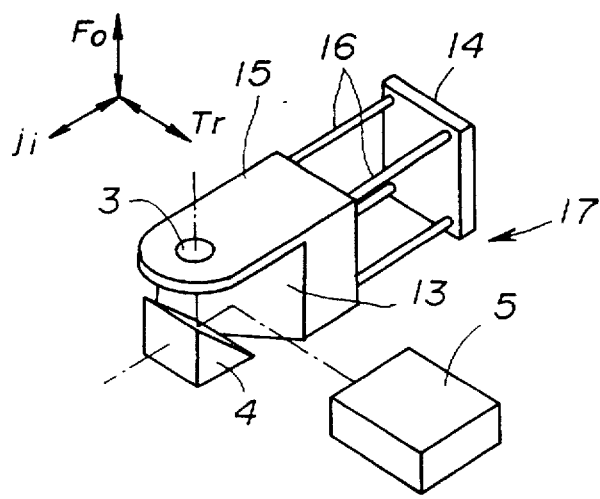
FIG. 10 shows a perspective view of the optical head device in the first embodiment.

With reference to FIGS. 9 and 10, an optical head device 12 in a first embodiment of the present invention will now be described. For the optical head device 12 in the first embodiment, the same names and reference numerals are given to components identical to those in the above-described optical head device 1 in the related art, and descriptions thereof are omitted.

In the optical head device 12, as shown in FIG. 9, in a position so as to face the optical disc 2 in the focusing direction, the objective lens 3 and the fixed mirror 4 are arranged in the stated order. The objective lens 3 is movable

14 in the tracking direction and the fixed mirror 4 is fixed. In a position so as to face the fixed mirror 4 in the jitter direction, a movable mirror 13 acting as movable deflection means is arranged. In a position so as to face the movable mirror 13 in the tracking direction, the fixed optical system 5 is arranged.

In detail, as shown in FIG. 10, on a head base (not shown in the figure) on which the fixed mirror 4 and fixed optical system 5 are fixed, a lens supporting member 14 is provided. To the lens supporting member 14, a lens holder 15 is supported via four spring shafts 16. Each of the four spring shafts is flexible and thereby the lens holder 15 can move in the focusing direction and in the tracking direction. The objective lens 3 is fitted in the top of the lens holder 15, and the movable mirror 13 is integrally formed on a lower portion of the lens holder 15. Thereby, a co-moving mechanism 17 is formed, and allows the movable mirror 13 and objective lens 3 to move integrally.

In the optical head device 12, a bundle of rays emitted from the fixed optical system 5 in the tracking direction is deflected by the movable mirror 13 in the jitter direction. The deflected bundle of rays is deflected by the fixed mirror 4 in the focusing direction, converged by the objective lens 3 and incident on a track of the optical disc 2.

The incident bundle of rays is reflected by the optical disc 2 in the focusing direction, converged by the objective lens 3 and deflected by the fixed mirror 4 in the jitter direction. The deflected bundle of rays is deflected by the movable mirror 13 and read by the fixed optical system 5.

From the read result of the fixed optical system 5, a tracking error is detected. Using the tracking error, a position of the lens holder 15 is controlled in the tracking direction. Thereby, the objective lens 3 secured in the lens holder 15 follows the track of the optical disc 2. As a result, information recorded in the track is read through the fixed optical system 5.

In the optical head device 12, when the objective lens 3 moves in the tracking direction as mentioned above, an optical axis of the objective lens 3 moves in the tracking direction with respect to an optical axis of the bundle of rays incident from the fixed mirror 4. However, actually, the movable mirror 13 moves in the tracking direction, integrally with the objective lens 3 in a translation operation (parallel displacement). Thereby, the bundle of rays incident to the fixed mirror 4 from the movable mirror 13 also moves in the tracking direction in a translation operation (parallel displacement). As a result, no substantial optical-axis deviation occurs with respect to the objective lens, in an optical axis of the bundle of rays, when the bundle of rays is emitted from the fixed optical system 5 and reflected by the movable mirror 13 and fixed mirror 4 and incident on the objective lens 3.

Figure 2:
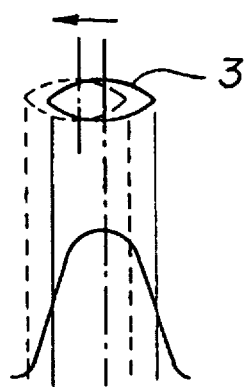
FIG. 2 shows a light intensity distribution of a bundle of rays.

Thereby, in the optical head device 12, even in a case where a tracking error is detected through the push-pull method, no DC offset is produced in the detection signal. As a result, a tracking control can be performed with high accuracy. Further, undesirable variation in light intensity of the bundle of rays incident on the optical disc 2 due to a light intensity distribution of the laser beam such as that shown in FIG. 2 is prevented. As a result, undesirable variation in light intensity of the bundle of rays detected by the fixed optical system 5 is prevented. Thereby, it is possible to perform information recording and reproducing on the optical disc 2 with high accuracy.

Figure 3:
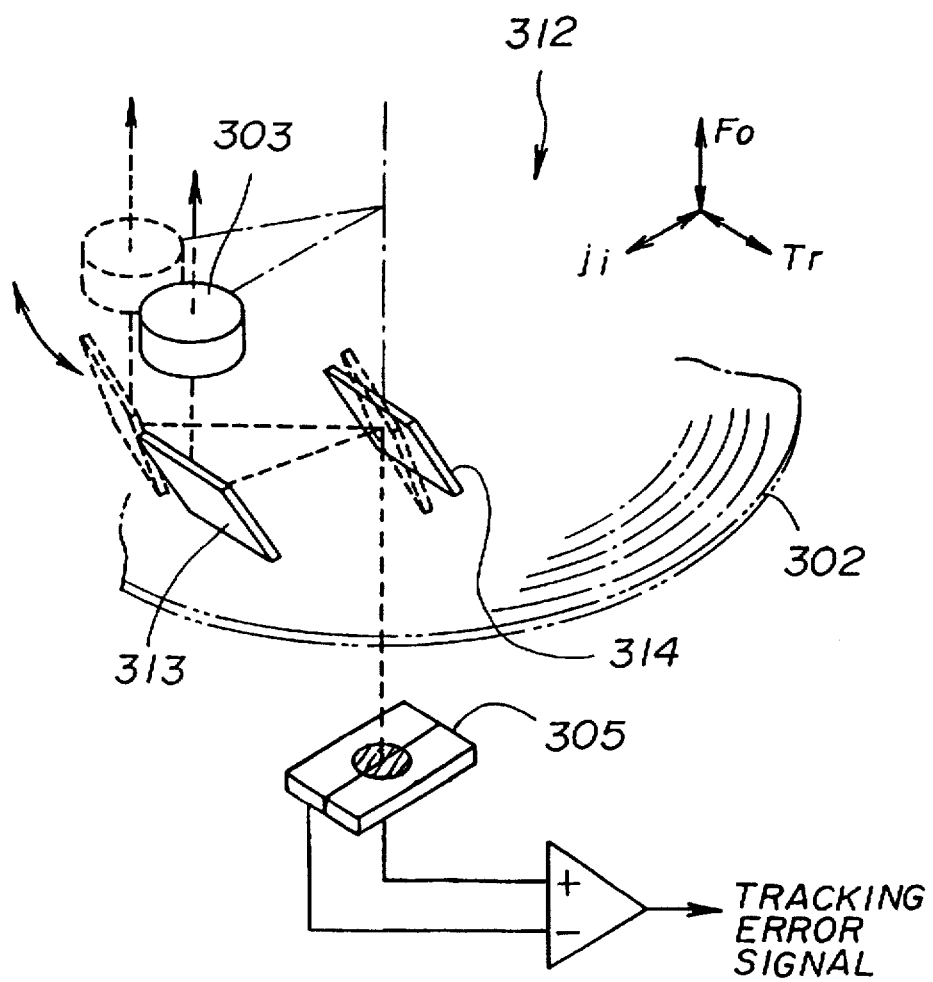
FIG. 3 shows a side view indicating various components/parts of an optical head device in another example of the related art.

Further, in contrast to the optical head device 312 in the related art shown in FIG. 3, it is not necessary to arrange a plurality of optical components along the focusing direction in the optical head device 12. As a result, it is possible to miniaturize the optical head device 12 in the focusing direction. Further, as shown in FIG. 10, the objective lens 3 and movable mirror 13 are provided directly on the lens holder 15 and thereby move integrally as described above. Accordingly, undesirable resonance vibration of the objective lens 3 with respect to the movable mirror 13 can be prevented. Thereby, a signal-to-noise (S/N) ratio in performing information recording/reproducing on the optical disc 2 can be effectively improved.

The above-described movement of the lens holder 15 in the tracking direction is a movement of a tracking operation for causing the objective lens 3 to follow a track of the optical disc 2 when the track may slightly move due to rotation of the optical disc 2. However, in a seeking operation in which a track of the optical disc 2 to be accessed is changed, the entirety of the optical head device 12 is conveyed in the tracking direction through a head conveying mechanism (not shown in the figures).

In the optical head device 12, the lens holder 15 with the objective lens 3 and movable mirror 13 can move in the tracking direction and focusing direction through the spring shafts 16 as described above. However, an application of the present invention is not limited to such an arrangement. For example, it is also possible that such a lens holder is movably supported to be movable only in the tracking direction, and the objective lens is movably supported, to be movable in the focusing direction, on the lens holder.

Further, in the optical head device 12, the movable mirror 13 is integrally formed on the lens holder 15 in which the objective lens 3 is also fitted. Thereby, a structure of the co-moving mechanism 17 is simple, and manufacturing thereof is easy and miniaturizing and weight reduction is easy. Further, it is possible to reduce the weight of a movable portion of the optical head device 12 so that a signal responding performance of the movable portion can be improved. For example, if the lens holder 15 is made of metal, by finely grinding a surface of the lens holder 15, the movable mirror 13 can be formed. However, an application of the present invention is not limited to such an arrangement. For example, it is also possible that the movable mirror is a separate component and a special co-moving mechanism is used for supporting the movable mirror together with the objective lens.

Figure 11:
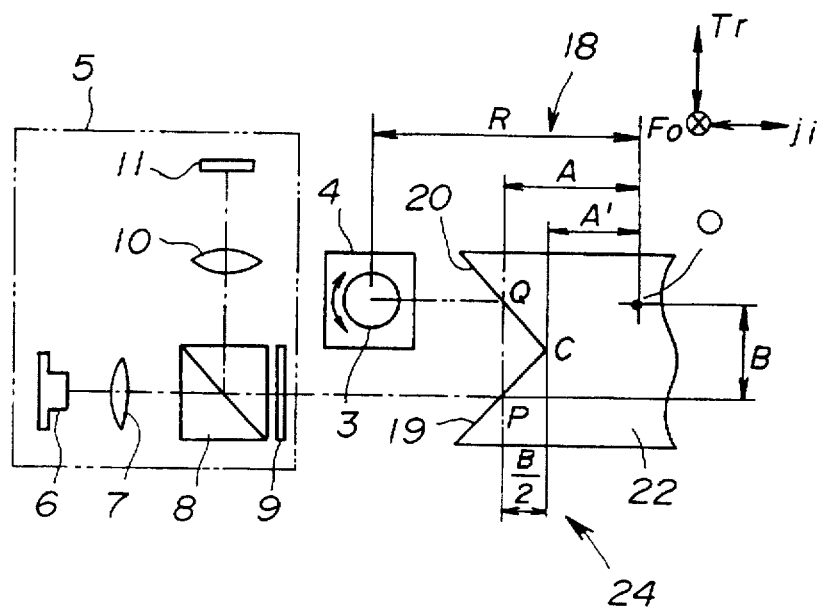
FIG. 11 shows a plan view of an optical head device in a second embodiment and in a twenty-third embodiment of the present invention.
Figure 12:
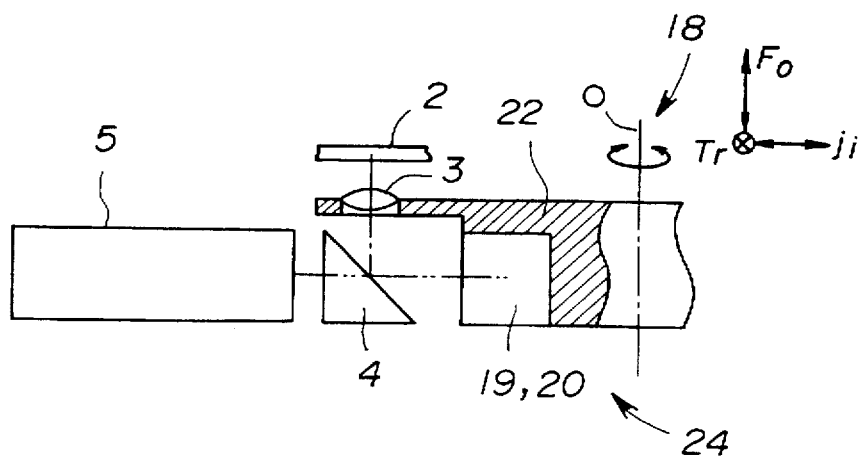
FIG. 12 shows a side view of the optical head device in the second embodiment, in a twelfth embodiment and in the twenty-third embodiment of the present invention.
Figure 13:
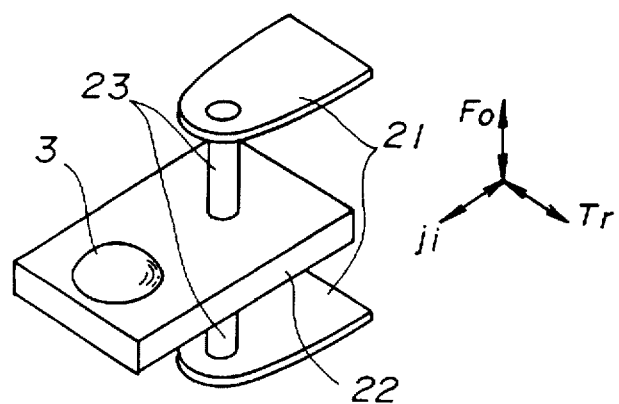
FIG. 13 shows a perspective view of the optical head device in the second embodiment, in the twelfth embodiment and in the twenty-third embodiment of the present invention.

With reference to FIGS. 11-13, a second embodiment of the present invention will now be described. For the optical head device 18 in the second embodiment, the same terms and reference numerals are given to components identical to those in the above-described optical head device 12 in the first embodiment, and descriptions thereof are omitted.

As shown in FIGS. 11 and 12, in the optical head device 18, the fixed optical system 5 is arranged so as to emit a bundle of rays in the jitter direction. Along an optical axis of the fixed optical system 5, a first movable mirror 19 acts as a first movable deflection means. The first movable mirror 19 is inclined by 45° from the jitter direction and by the same angle from the tracking direction. A second movable mirror 20 acting as a second movable deflection means is arranged in a position so as to face the first movable mirror 19 in the tracking direction.

The second movable mirror 20 is also inclined by 45° from the jitter direction and by the same angle from the tracking direction. As a result, the second movable mirror 20 faces and is perpendicular to the first movable mirror 19 as shown in FIG. 11. Further, the second movable mirror 20 faces the fixed mirror 4 in the jitter direction. Thereby, the first and second movable mirrors 19, 20 deflect a bundle of rays incident from the fixed optical system 5 to the fixed mirror 4 by two reflections. Thus, movable deflection means is formed and deflects the bundle of rays by an even number of reflections.

Further, as shown in FIG. 13, leaf springs 21, flexible in the focusing direction, are fitted to a head base (not shown in the figure). At projecting ends of these leaf springs 21, a lens holder 22 is supported rotatably via a pair of torsion bars 23 which communicate with each other in the focusing direction. The leaf springs 21 and lens holder 22 project in the jitter direction, and thereby the objective lens 3 fitted in the projecting end of the lens holder 22 is movably supported, to be movable in the focusing direction. Further, the objective lens 3 fitted in the projecting end of the lens holder 22 is rotatably supported, so as to move approximately in the tracking direction.

As shown in FIG. 12, the objective lens 3 is fitted at the top of the lens holder 22, and the above-mentioned first and second movable mirrors 19, 20 are integrally formed on a lower portion of the lens holder 22. Thus, a co-moving mechanism 24 is formed and causes the first and second movable mirrors 19, 20 to move integrally with the objective lens 3.

As shown in FIG. 11, the optical head device 18 is formed such that:

$$R = 2A - B;$$

where A is a distance, in the jitter direction, between an axis O which is a rotation axis of the lens holder 22 and a point Q at which the bundle of rays is incident on the second movable mirror 19; B is a distance, in the tracking direction, between the axis O and a point P at which the bundle of rays is incident on the first movable mirror 19; and R is a distance, in the jitter direction, between the axis O and an optical-axis center of the objective lens 3. Each of the first and second movable mirrors 19, 20 is inclined by 45° from the tracking direction and by the same angle from the jitter direction as mentioned above. As a result, $$A' = A - B/2; \text{ and}$$

$$R = 2A';$$

where A' is a distance, in the jitter direction, between the rotation axis O and a point C at which the first and second movable mirrors 19, 20 cross one another.

In the optical head device 18 with the above-described arrangement, the bundle of rays emitted from the fixed optical system 5 in the jitter direction is deflected by the first movable mirror 19 into the tracking direction, and then deflected by the second movable mirror in the jitter direction. The bundle of rays in the jitter direction is deflected by the fixed mirror 4 in the focusing direction, converged by the objective lens 3 and incident on a track of the optical disc 2.

The bundle of rays is reflected in the focusing direction by the optical disc 2, converged by the objective lens 3 and deflected by the fixed mirror 4 in the jitter direction. The bundle of rays along the jitter direction is deflected by the second movable mirror 20 in the tracking direction, deflected by the first movable mirror 19 in the jitter direction and read by the fixed optical system 5.

A tracking error is detected from the read result of the fixed optical system 5, and, based on the tracking error, the position of lens holder 22 is rotated in the tracking direction. Thereby, the objective lens 3 is caused to follow the track of the optical disc 2, and thus information recorded on the track is read through the fixed optical system 5.

In the optical head device 18, as a result of the lens holder 22 being rotated as described above, the objective lens 3 is also moved in the tracking direction accordingly. At this time, the first and second movable mirrors 19, 20 are rotated integrally together with the objective lens 3. The first and second movable mirrors 19, 20 deflect the bundle of rays by two reflections. Thereby, when the lens holder 22 is rotated about the axis O, a direction of the bundle of rays incident on the fixed mirror does not vary.

That is, when the lens holder 22 turns by an infinitesimal angle Θ, the bundle of rays incident on the objective lens 3 from the fixed optical system 5 and via the first and second mirrors 19, 20 moves in a translation operation (parallel displacement) by approximately 2A'Θ (where Θ is an angle in radians) in the tracking direction. Simultaneously, the objective lens 3 moves in the tracking direction by approximately RΘ (where Θ is an angle in radians). Because R=2A', thus RΘ=2A'Θ and 2A'Θ is equal to the above-mentioned distance by which the bundle of rays move, the objective lens 3 is still located on the optical axis of the moved bundle of rays. Thus, no optical-axis deviation occurs in the bundle of rays incident on the objective lens 3 from the fixed optical system 5. Similarly, no optical-axis deviation occurs in the bundle of rays incident on the fixed optical system 5 from the objective lens 3.

This will now be described in detail. In the description, a process in which light emitted from the fixed optical system 5 is incident on the objective lens 3 is described. However, by reversing the order, the process is identical to a process in which light emitted from the objective lens 3 is incident on the fixed optical system 5.

Initially, each of the first and second movable mirrors 19, 20 is inclined by 45° from the tracking direction and by the same angle from the jitter direction. As shown in FIG. 11, when the bundle of rays emitted from the fixed optical system 5 in the jitter direction is incident on the first movable mirror 19 at the point P, the bundle of rays reflected therefrom is incident on the second movable mirror 20 at the point Q in the tracking direction. Then, the bundle of rays reflected is incident on the fixed mirror 4 in the jitter direction.

Then, when the lens holder 22 turns by an infinitesimal angle Θ counterclockwise about the axis O, the first and second movable mirrors 19, 20 also turn by the same angle Θ and also slightly move in the tracking direction and in the jitter direction. When the first and second movable mirrors 19, 20 move in a translation operation (parallel displacement) by δy in the tracking direction with respect to the fixed optical system 5, the bundle of rays reflected by the first and second movable mirrors 19, 20 and emitted to the fixed mirror 4 moves in a translation operation (parallel displacement) by 2δy in the tracking direction.

In contrast to this, although the first and second movable mirrors 19, 20 move in a translation operation (parallel displacement) by δx in the jitter direction with respect to the fixed optical system 5, the bundle of rays reflected by the first and second movable mirrors 19, 20 and emitted to the fixed mirror 4 does not move. Further, although the first and second movable mirrors 19, 20 turn by the angle Θ about the crossing point C, the bundle of rays reflected by the first and second movable mirrors 19, 20 and emitted to the fixed mirror 4 does not move.

Thus, when the lens holder 22 turns by the angle Θ about the axis O, the bundle of rays incident on the objective lens 3 moves by 2δy in the tracking direction. Because 2δy=(2A−B)Θ=2A'Θ (where Θ is an angle in radians), the moving distance of the bundle of rays is 2A'Θ. As shown in FIG. 11, the center of the optical axis of the objective lens 3 moves by RΘ in the tracking direction due to turning of the lens holder 22 by the angle Θ. However, because this moving distance RΘ is such that RΘ=2A'Θ, this moving distance is the same as the above-mentioned moving distance of the bundle of rays.

Thus, in the optical head device 18, when the lens holder 22 is rotated by Θ for a tracking control, the optical axis of the bundle of rays incident on the objective lens 3 moves by 2A'Θ in the tracking direction. However, the objective lens 3 also moves by the same 2A'Θ in the tracking direction simultaneously. Thereby, no optical-axis deviation occurs in the bundle of rays incident on the objective lens 3. Similarly, no optical-axis deviation occurs in the bundle of rays reflected by the optical disc 2, converged by the objective lens 3, reflected by the first and second moving mirrors 19, 20 and returning to the fixed optical system 5.

Thereby, in the optical head device 18, even in a case where a tracking error is detected through the push-pull method, no DC offset is produced in the detection signal. As a result, a tracking control can be performed with high accuracy. Further, undesirable variation in light intensity of the bundle of rays incident on the optical disc 2 due to light intensity distribution of the laser beam, such as that shown in FIG. 2, is prevented. As a result, undesirable variation in light intensity of the bundle of rays detected by the fixed optical system 5 is prevented. Thereby, it is possible to perform information recording and reproducing on the optical disc 2 with high accuracy.

Further, in contrast to the optical head device 312 in the related art shown in FIG. 3, it is not necessary to arrange a plurality of optical components along the focusing direction in the optical head device 18. As a result, it is possible to miniaturize the optical head device 18 in the focusing direction. Further, as shown in FIG. 12, the objective lens 3 and first and second movable mirrors 19, 20 are provided directly on the lens holder 22 and thereby move integrally as described above. Accordingly, an undesirable resonance vibration of the objective lens 3 with respect to the first and second movable mirrors 19, 20 can be prevented.

In the optical head device 18, the lens holder 22 with the objective lens 3 and first and second movable mirrors 19, 20 can move in the tracking direction and in the focusing direction through the leaf springs 21 as described above. However, an application of the present invention is not limited to such an arrangement. For example, it is also possible that such a lens holder is movably supported to be movable only in the tracking direction, and the objective lens is movably supported, to be movable in the focusing direction, on the lens holder.

Further, in the optical head device 18, the first and second movable mirrors 19, 20 are integrally formed on the lens holder 22 in which the objective lens 3 is also fitted. Thereby, the structure of the co-moving mechanism 24 is simple so that manufacturing is easy and miniaturizing and weight reduction thereof is easy. Further, it is possible to reduce the weight of a movable portion of the optical head device 18 so that signal responding performance of the movable portion can be improved. For example, if the lens holder 22 is made of metal, by forming a hollow therein having two plane inner walls with an interior right angle therebetween, and finely polishing the walls, the first and second movable mirrors 19, 20 can be formed there.

Figure 14:
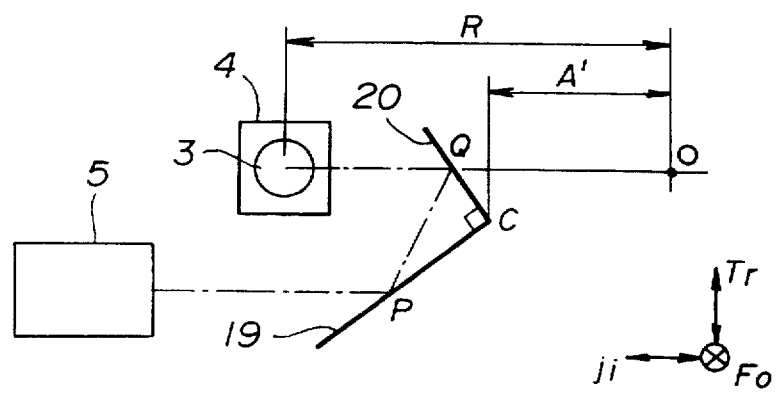
FIG. 14 shows a first variation example of the second embodiment and twelfth embodiment.

Further, for the sake of simplification of the description, the example has been described above in which the first and second mirrors 19, 20 face one another with a right angle therebetween, and each face thereof is inclined by 45° from the tracking direction and by the same angle from the jitter direction. However, the present invention is not limited to such an arrangement. By providing movable deflection means which deflects a bundle of rays an even number of reflections of the bundle of rays, optical-axis deviation in a bundle of rays incident on the objective lens 3 can be prevented. Further, for example, as shown in FIG. 14, it is also possible that the first and second movable mirrors 19, 20 are arranged so that each of the two mirrors 19, 20 is initially inclined by a predetermined angle other than 45° from the tracking direction and by another predetermined angle other than 45° from the jitter direction. Even so, the two mirrors 19, 20 will have an interior right angle therebetween. Further, as shown in FIG. 15, it is also possible that the two mirrors 19, 20 are arranged so that an interior angle between the two mirrors 19, 20 is an angle other than a right angle.

In the case shown in FIG. 14 in which each of the two mirrors 19, 20 is initially inclined by a predetermined angle other than 45° from the tracking direction and by a predetermined angle other than 45° from the jitter direction, a direction of a bundle of rays incident on the second movable mirror 20 from the first movable mirror 19 is not coincident with the tracking direction as shown in the figure. However, as long as the condition that R=2A' is maintained, when the lens holder 22 turns about the axis O by an angle Θ, the objective lens 3 moves in the tracking direction by RΘ and also the bundle of rays incident on the objective lens 3 moves by an angle 2A'Θ in the tracking direction. As a result, by the same reason as described above, optical-axis deviation such as that described above can be prevented.

Figure 15:
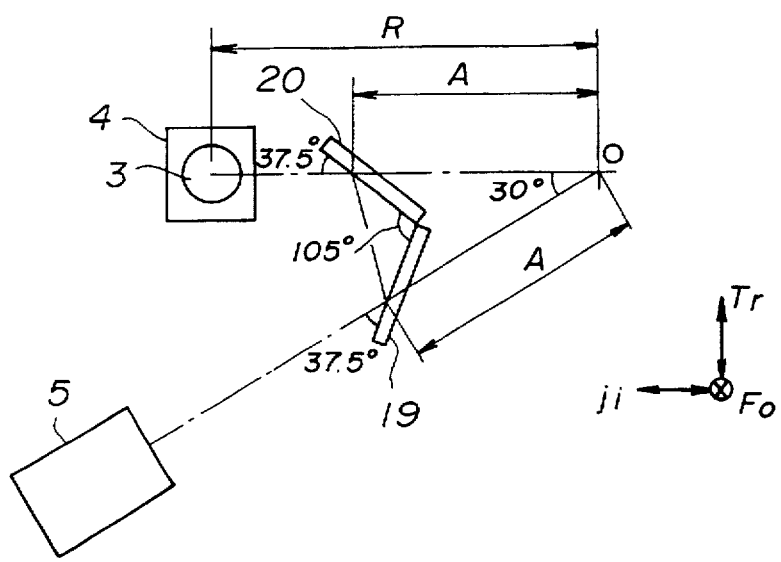
FIG. 15 shows a second variation example of the second embodiment and twelfth embodiment.

In the case shown in FIG. 15 in which the interior angle between the two movable mirrors 19, 20 is a predetermined angle other than a right angle, a simple condition such as that described above cannot be defined. However, occurrence of optical-axis deviation such as described above can be prevented by, for example, setting the interior angle between the first and second movable mirrors 19, 20 to be 105°, setting a bundle of rays incident on the first movable mirror 19 and a bundle of rays reflected by the second movable mirror 20 so that extending lines of these two bundles of rays cross at the rotation axis O and an interior angle therebetween is 30° and setting R so that R≈1.527A.

Thus, by setting the first and second movable mirrors 19, 20 so that the two mirrors 19, 20 face one another at a right angle, occurrence of optical-axis deviation such as that described above can be effectively prevented using a simple arrangement. However, by adjusting the interior angle between the first and second movable mirrors 19, 20 appropriately at an angle other than a right angle, it is possible to desirably alter a spatial relationship between the objective lens 3 and fixed optical system 5. Therefore, the best selection would be made depending on specifications and requirements of an actual product of the optical head device.

Further, the example has been described above wherein the first and second movable mirrors 19, 20 act as the movable deflection means for preventing occurrence of optical-axis deviation described above, and performs desired deflection by the two reflections of the bundle of rays. However, the number of reflections is not limited to two. Any number can be applied to the number of reflections as long as the number is an even number. For example, the number of reflection can be four or six. However, the number of reflections applied to the above-described optical head device 18 is necessary and sufficient. Therefore, the optical head device 18 prevents the occurrence of optical-axis deviation such as that described above with the best arrangement.

Figure 16:
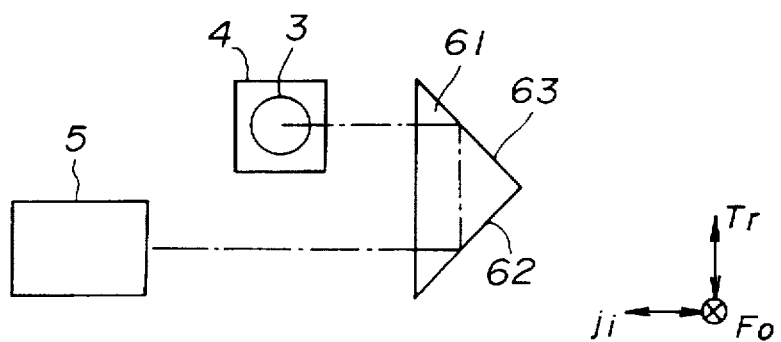
FIG. 16 shows a third variation example of the second embodiment and twelfth embodiment.

Further, in the optical head device 18, the movable deflection means includes the first and second movable mirrors 19, 20. However, instead, it is also possible that, as shown in FIG. 16, the movable deflection means includes only a single triangle prism 61. By applying this element, it is possible to positively manage a spatial relationship between two reflection planes 62, 63 of the triangle prism 61 acting as the first and second movable mirrors 19, 20. Further, it is possible to use an ordinary product on the market as the triangle prism 61. Therefore, manufacturing of the optical head device 18 can be easily accomplished. The triangle prism 61 can rotate by 90° a polarization plane of a bundle of rays back and forth between the fixed optical system 5 and optical disc 2. Thereby, it is possible to omit provision of the quarter-wave plate 9 from the fixed optical system 5.

Figure 17:
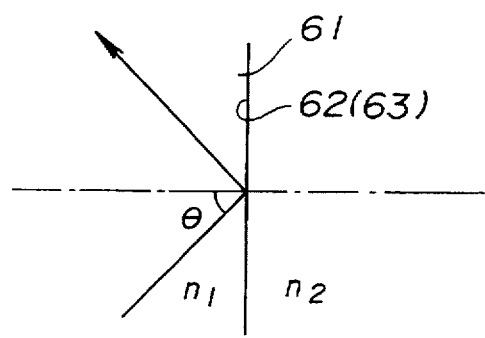
FIG. 17 shows a plan view indicating a first reflection plane acting as first movable deflection means in the optical head device shown in FIG. 16.

If refractive indexes of the inside and outside of the triangle prism 61, $n_1$ and $n_2$ shown in FIG. 17, are such that $n_1 > n_2$, when an incident angle Θ of a bundle of rays exceeds a critical angle Θc (where $\sin\Theta c = n_2/n_1$), each of the reflection planes 62, 63 of the triangle prism 61 performs total reflection on the incident bundle of rays. In the reflected bundle of rays, there occurs a phase difference between a polarization component in a plane including the incident optical path and reflection optical path and a polarization component in a plane perpendicular to the plane including the incident optical path and reflection optical path. This phase difference varies due to properties of the triangle prism 61. If the triangle prism 61 is made of an optical glass having a refractive index of 1.55 through 1.56 in air, when the angle Θ of the bundle of rays is such that Θ=45°, the phase difference is approximately 45°.

Thus, as a result of reflections by the two reflection surfaces 62, 63 of the triangle prism 61, the bundle of rays emitted from the fixed optical system 5 to the optical disc 2 is converted from linearly polarized light to circularly polarized light, and also the bundle of rays returning from the optical disc 2 to the fixed optical system 5 is converted from circularly polarized light to linearly polarized light. The bundle of rays of linearly polarized light having returned to the fixed optical system 5 has a polarization plane which is rotated by 90° from the polarization plane of the bundle of rays of linearly polarized light emitted by the fixed optical system. Therefore, the bundle of rays having returned to the fixed optical system 5 can be split through the polarization beam splitter 8 from the bundle of rays emitted from the fixed optical system 5.

Thus, the triangle prism 61 deflects the bundle of rays through two reflections and also rotates the polarization plane by 90°. Thereby, it is possible to omit provision of the quarter-wave plate 9 from the fixed optical system 5. As a result, a number of components constituting the fixed optical system 5 can be effectively reduced, and thus the fixed optical system 5 can be miniaturized and weight thereof can be reduced. Thus, manufacturing efficiency can be improved and costs can be reduced.

In order that the triangle prism 61 appropriately rotates the polarization plane of the bundle of rays, it is necessary that the polarization component in the plane including the incident optical axis and reflected optical axis of the bundle of rays of the linearly polarization light is equal to the polarization component in the plane perpendicular to the plane including the incident optical axis and reflected optical axis. In order to fulfill this condition, it is necessary to rotate the fixed optical system 5 by 45° and thus position it.

Further, the example has been described above in which the polarization beam splitter 8 splits the bundle of rays with high efficiency. However, instead, the splitting of the bundle of rays can be performed using another type of beam splitter such as a semitransparent mirror (half mirror) without regard to the polarization.

With reference to FIGS. 18–21, a third embodiment of the present invention will now be described. For an optical head device 25 in the third embodiment, the same terms and reference numerals are given to components identical to those in the above-described optical head device 18 in the second embodiment, and descriptions thereof are omitted.

Figure 18:
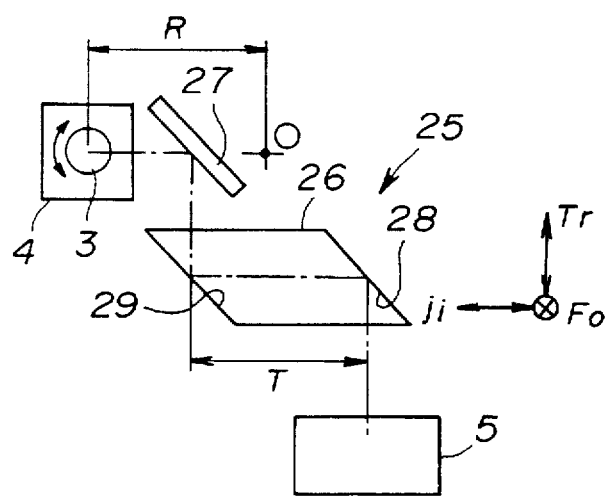
FIG. 18 shows a plan view of an optical head device in a third embodiment and in a thirteenth embodiment of the present invention.

In the optical head device 25, as shown in FIG. 18, a parallel prism 26 acting as a movable deflection means is arranged in a position so as to face the fixed optical system 5 in the tracking direction. The parallel prism 26 is movably supported. A first fixed mirror 27 acting as first fixed deflection means is fixed in a position so as to face the parallel prism 26 in the tracking direction. This first fixed mirror 27 faces a second fixed mirror 4 acting as the second fixed deflection means in the jitter direction.

The parallel prism 26 has a plan-view shape of a parallelogram, and is arranged along the jitter direction as shown in FIG. 18. Therefore, a first reflection plane 28 acting as a first movable deflection means and a second reflection plane 29 acting as a second movable deflection means face one another in parallel, and are inclined by 45° from a direction of the optical-axis. As a result, the first reflection plane 28 faces the fixed optical system 5 in the tracking direction, and the first fixed mirror 27 faces the second reflection plane 29 in the tracking direction.

Figure 19:
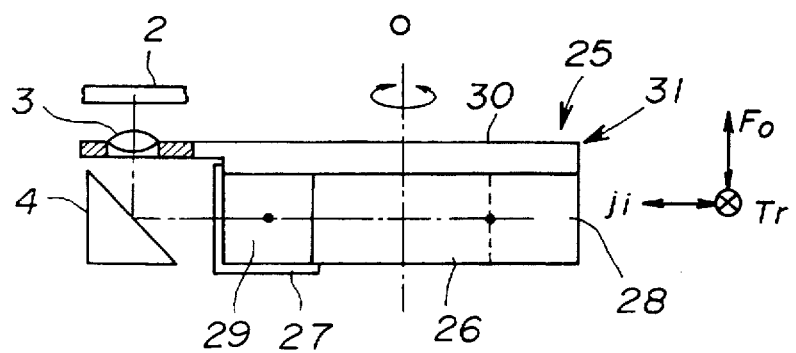
FIG. 19 shows a side view of the optical head device in the third embodiment and in the thirteenth embodiment.

As shown in FIG. 19, the objective lens 3 and parallel prism 26 are commonly fitted to a single lens holder 30. Thus, a co-moving mechanism 31 is formed and causes the first and second reflection planes 28, 29 to move integrally with the objective lens 3.

The optical head device 25, as shown in FIG. 18 has an arrangement such that;

$$R=T;$$

where R is a distance in the jitter direction between the axis O which is a rotation axis of the lens holder 30 and a rotation axis of the objective lens 3; and T is a distance in the jitter direction between the first and second reflection planes 28, 29 of the parallel prism 26.

Also in this arrangement of the optical head device 25, rotation of the lens holder 30 causes the objective lens 3 to move in the tracking direction. At this time, the parallel prism 26 also moves integrally with the objective lens 3. If the lens holder 30 turns by an infinitesimal angle $\Theta$, the bundle of rays incident on the objective lens 3 from the fixed optical system 5 via the first and second reflection planes 28, 29 performs a parallel displacement (translation operation) by approximately $T\Theta$ ($\Theta$ is in radians) in the tracking direction. Simultaneously, the objective lens 3 moves by approximately $R\Theta$ in the tracking direction. Because R=T, the moving distance of the bundle of rays incident to the objective lens 3 and the moving distance of objective lens 3 itself are equal to one another. As a result, the objective lens 3 is still aligned with the optical axis of the bundle of rays having performed the parallel displacement. Accordingly, no optical-axis displacement occurs in the bundle of rays incident on the objective lens 3 from the fixed optical system 5, and no optical-axis displacement occurs in the bundle of rays incident on the fixed optical system 5 from the objective lens 3.

Figure 20:
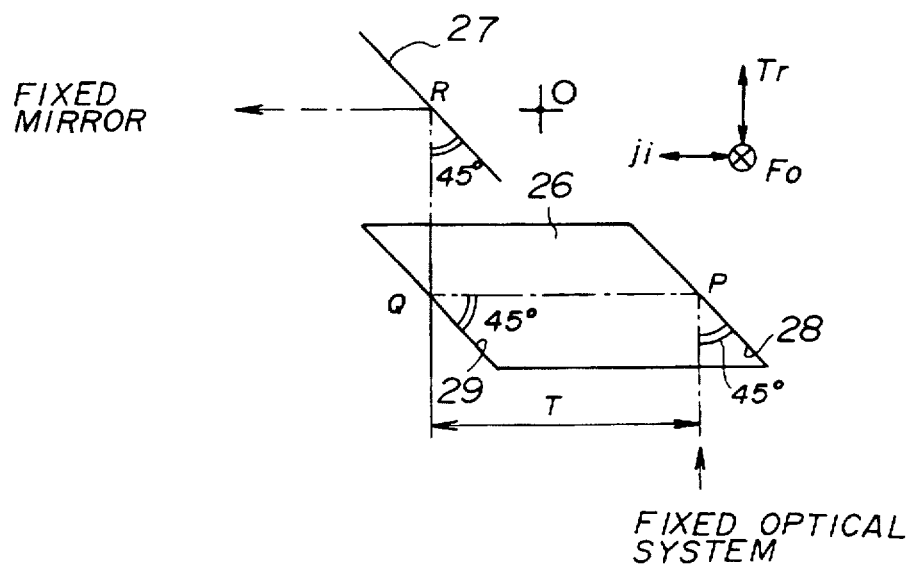
FIG. 20 shows a plan view of a parallel prism used in the optical head device shown in FIG. 18.

This fact will now be explained with reference to FIGS. 20 and 21. Initially, each of the first and second deflection planes 28, 29 of the parallel prism 26 is inclined by 45° from the tracking direction and also inclined by 45° from the jitter direction. In this condition, when the bundle of rays emitted from the fixed optical system 5 in the tracking direction is incident on the first reflection plane 28 at a point P as shown in FIG. 20, the bundle of rays is reflected and incident on the second reflection plane 29 at a point Q in the jitter direction. The bundle of rays is reflected and incident on the first fixed mirror 27 in the tracking direction.

Then, when the lens holder 30 is rotated about the axis O, the parallel prism 26 turns and the first and second reflection planes 28, 29 move together. Although the parallel prism 26 performs the parallel displacement, a spatial relationship between the incident light and reflected light does not vary. Therefore, the rotation of the parallel prism 26 about the axis O can be considered to be equivalent to a rotation of the parallel prism 26 about the point P. This is because it is considered that the parallel prism 26 having turned about the axis P is coincide with the parallel prism 26 having turned about the point P when performing a parallel displacement (translation operation). Thus, the rotation of the parallel prism 26 about the axis O by the infinitesimal angle $\Theta$ is equivalent to the rotation of the parallel prism 26 about the point P by the infinitesimal angle $\Theta$ when considering movement of the bundle of rays due to the rotation of the parallel prism 26.

Figure 21:
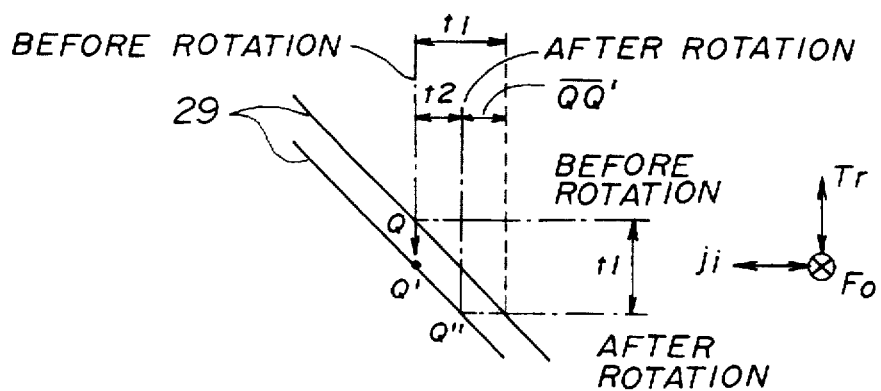
FIG. 21 shows a plan view indicating a second reflection plane acting as second movable deflection means in the optical head device shown in FIG. 18.

The bundle of rays reflected by the thus-inclined first reflection plane 28 at the point P is inclined by an angle $2\Theta$ from a normal direction. Thereby, a position Q" at which the thus-reflected bundle of rays is incident on the second reflection plane 29 moves by a distance $t_1$ from the point Q in the tracking direction. This distance $t_1$ is such that:

$$t_1 = \langle PQ \rangle 2\Theta = 2T\Theta;$$

where $\langle PQ \rangle$ is referred to a distance between the points P and Q. At this time, the second reflection plane 29 also moves by approximately $T\Theta$ in the tracking direction. Therefore, taking this point into account, the above-mentioned point Q" moves by a distance $t_2$ from the point Q in the jitter direction as shown in FIG. 21. This distance $t_2$ is such that:

$$t_2 = t_1 - \langle QQ' \rangle = 2T\Theta - T\Theta = T\Theta;$$

where $\langle QQ' \rangle$ is referred to a distance between the point Q and a point Q' shown in FIG. 21.

Simultaneously, the center of optical axis of the objective lens 3 moves by $R\Theta$ in the tracking direction due to the rotation of the lens holder 30 by the angle $\Theta$. Because R=T, the moving distance $R\Theta$ of the objective lens 3 is equal to the moving distance $T\Theta$ of the light incident point on the second reflection plane 29.

Thus, in the optical head device 25, when the lens holder 30 turns by the angle $\Theta$ for performing a tracking control operation, the optical axis of the bundle of rays incident to the objective lens 3 from the fixed optical system 5 via the parallel prism 26 and first, second reflection planes 28, 29 moves by $T\Theta$ in the tracking direction. However, simultaneously, the objective lens 3 also moves by $T\Theta$ in the tracking direction. Thereby, no optical-axis deviation occurs in the bundle of rays incident on the objective lens 3. Similarly, no optical-axis deviation occurs in the bundle of rays returning to the fixed optical system after being reflected by the optical disc 2 and passing through the objective lens 3 and first, second reflection planes 28, 29 of the parallel prism 2.

Accordingly, in the optical head device 25, even in a case where a tracking error is detected through the push-pull method, no DC offset is produced in the detection signal. As a result, a tracking control can be performed with high accuracy. Further, undesirable variation in light intensity of the bundle of rays incident on the optical disc 2 due to light intensity distribution of the laser beam, such as that shown in FIG. 2, is prevented. As a result, undesirable variation in light intensity of the bundle of rays detected by the fixed optical system 5 is prevented. Thus, it is possible to perform information recording and reproducing on the optical disc 2 with high accuracy.

Further, in contrast to the optical head device 312 in the related art shown in FIG. 3, it is not necessary to arrange a plurality of optical components in the focusing direction of the optical head device 25. As a result, it is possible to miniaturize the optical head device 25 in the focusing direction. Further, as shown in FIG. 19, the objective lens 3 and parallel prism 26 provided with the first and second reflection planes 28, 29 are provided directly on the lens holder 30 and move integrally therewith as described above. Accordingly, an undesirable resonance vibration of the objective lens 3 can be prevented with respect to the first and second reflection planes 28, 29 of the parallel prism 26.

Further, in the optical head device 25, as an example, the parallel prism 26, initially a separate member, is integrally formed on the lens holder 30 in which the objective lens 3 is also fitted. Thus, the first, second movable deflection means are embodied by the first, second reflection planes 28, 29 of the parallel prism 26. However, the present invention is not limited to such an arrangement. For example, instead, a pair of reflection mirrors fitted to the lens holder 30, or a pair of reflection surfaces formed on a highly polished metal can also be used for embodying the first, second movable deflection means.

Further, in the third embodiment described above, refraction by the parallel prism 26 has not been considered. Therefore, when the optical head device 25 is actually manufactured, modification of some conditions may be needed. However, the fact that the bundle of rays performs a parallel displacement (translation operation) due to rotation of the parallel prism 26 does not change.

Figure 22:
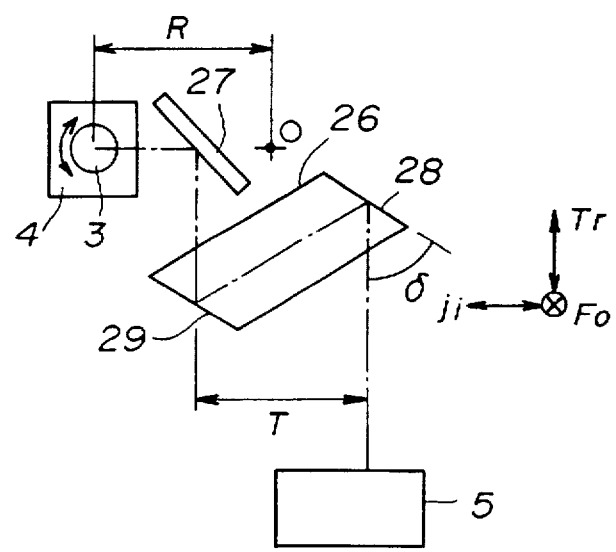
FIG. 22 shows a first variation example of the third embodiment and thirteenth embodiment.

Further, for the sake of simplification of the description, the example has been described above in which the first and second reflection planes 28, 29 face one another in parallel, and each is inclined by 45° from the tracking direction and by the same angle from the jitter direction. However, the present invention is not limited to such an arrangement. By providing movable deflection means which deflects a bundle of rays by an even number of reflections of the bundle of rays, occurrence of optical-axis deviation in a bundle of rays incident on the objective lens 3 can be prevented. Further, for example, the first and second reflection planes 28, 29 are not necessarily parallel with one another. Furthermore, for example, as shown in FIG. 22, it is also possible that the first and second reflection planes 28, 29 are arranged so that each of the two planes 28, 29 is initially inclined by a predetermined angle other than 45° from the tracking direction and by another predetermined angle other than 45° from the jitter direction. As shown in FIG. 22, each of the two planes 28, 29 is initially inclined by an angle δ from the tracking direction.

Figure 23:
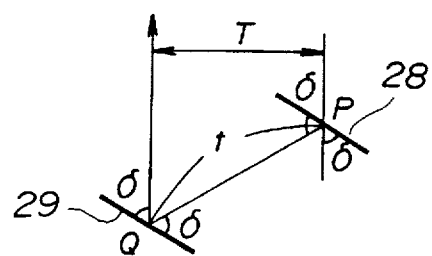
FIG. 23 shows a plan view indicating first and second reflection planes acting as first and second movable deflection means in the optical head device shown in FIG. 22.

In the case shown in FIG. 22, a direction of the bundle of rays communicating from the first reflection plane 28 to the second reflection plane 29 is not coincident with the jitter direction. However, if R=T tanδ, no optical-axis deviation occurs in the bundle of rays being incident on the objective lens 3 when the lens holder 30 turns about the axis O. This fact will now be explained with reference to FIGS. 22–24.

R is referred to a distance in the jitter direction between an axis which is a rotation axis of the lens holder 30 and an optical-axis center of the objective lens 3, t is referred to an actual distance of a light path between the first and second reflection planes 28, 29, and T is referred to a distance of the same light path in the jitter direction between the first and second reflection planes 28, 29. As described above, rotation of the lens holder 30 about the axis O by an infinitesimal angle Θ is equivalent to a rotation of the parallel prism 26 about the point P by the same angle Θ.

Figure 24:
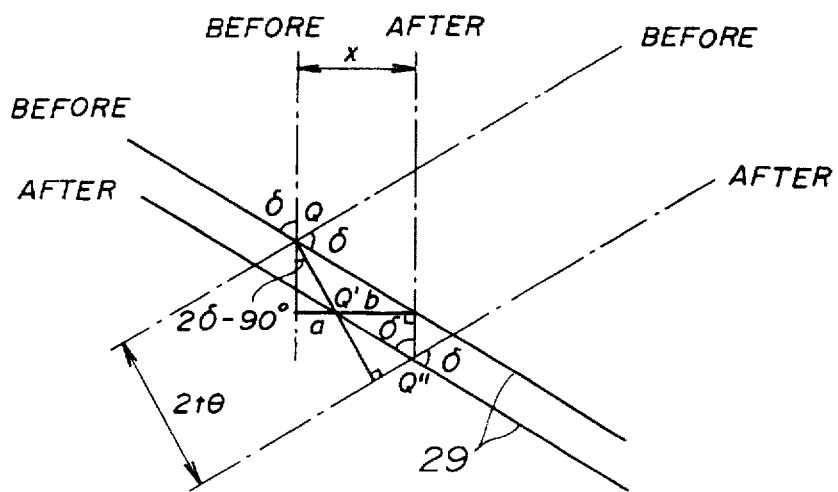
FIG. 24 shows a plan view of the second reflection plane shown in FIG. 23.

A bundle of rays reflected by the thus-inclined first reflection plane 28 at the point P is accordingly inclined by an angle 2Θ from a normal condition. Thereby, as shown in FIG. 24, the position Q" at which this bundle of rays is incident on the second reflection plane 29 moves by a distance 2tΘ in a direction perpendicular to the optical axis from the point Q. At this time, the second reflection plane 29 moves by approximately tΘ. Thereby, the point Q moves to the point Q'.

A distance x between the above-mentioned point Q and point Q" in the jitter direction is a distance by which the bundle of rays incident on the objective lens 3 moves in the tracking direction, and is a total of a distance a between the points Q and Q' in the jitter direction and a distance b between the points Q' and Q" in the jitter direction. Thus, $$a = t\Theta \sin(2\delta - 90) = t\Theta(\sin^2\delta - \cos^2\delta),$$

$$b = t\Theta, \text{ and}$$

$$x = a + b = 2t\Theta \sin^2\delta.$$

Because $$t = T/\cos(2\delta - 90) = T/2\sin\delta \cos\delta,$$

$$x = T\Theta \tan\delta.$$

Simultaneously, the optical-axis center of the objective lens 3 moves by RΘ in the tracking direction due to the angle-Θ rotation. The moving distance RΘ of the optical-axis center of the objective lens 3 at this time is T Θ tanδ because R=T tanδ.

Thus, in the optical head device 25, when the lens holder 30 is rotated by the angle Θ for performing a tracking control operation, the optical axis of the bundle of rays incident on the objective lens 3 from the fixed optical system 5 via the first, second reflection planes 28, 29 of the parallel prism 26 moves by TΘtanδ in the tracking direction. However, at this time, the objective lens 3 also moves by TΘtanδ in the tracking direction. Therefore, no optical-axis deviation occurs in the bundle of rays incident on the objective lens 3.

In the case where the first and second reflection planes 28, 29 are not parallel to one another, a simple condition such as that described above cannot be defined. Thus, by setting the first and second reflection planes 28, 29 so that the two planes 28, 29 face one another in parallel, optical-axis deviation can be effectively prevented using a simple arrangement. However, by appropriately adjusting an angle between the first and second reflection planes 28, 29, it is possible to desirably alter a spatial relationship between the objective lens 3 and fixed optical system 5. Thereby, the best selection of the spatial relationship would be made depending on the specifications and requirements for an actual product of the optical head device.

Figure 25:
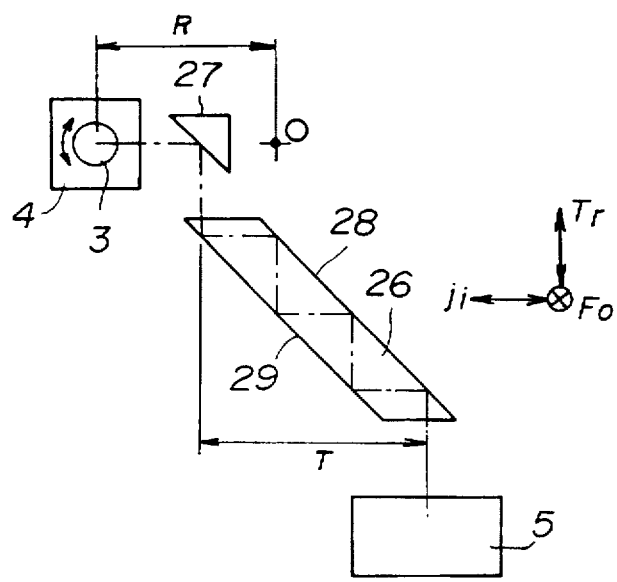
FIG. 25 shows a second variation example of the third embodiment and thirteenth embodiment.

Further, the example has been described above wherein the first and second reflection planes 28, 29 act as the movable deflection means for preventing occurrence of the optical-axis deviation, and performs desired deflection by the two reflections of the bundle of rays. However, the number of reflections is not limited to two. Any number can be used for the number of reflections as long as the number is an even number. For example, the number of reflections can be four or six. Such an example will now be described with reference to FIGS. 25 and 26.

Figure 26:
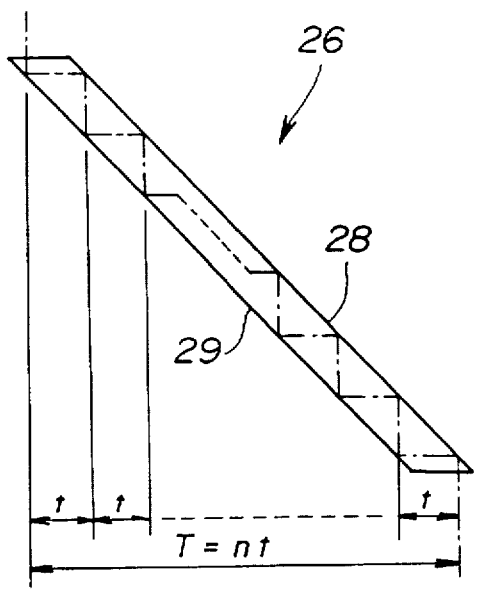
FIG. 26 shows a parallel prism acting as movable deflection means in the optical head device shown in FIG. 25.

In a case where the number of reflections of the bundle of rays inside the parallel prism 26 is 2n, the first reflection plane 28 reflects the bundle of rays n times and also the second reflection plane 29 reflects the bundle of rays n times. In a case where a distance between the first and second reflection planes 28, 29 in the jitter direction is t as shown in FIG. 26, when the parallel prism 26 turns by an angle Θ, the bundle of rays reflected by the first and second reflection planes 28, 29 one by one performs a parallel displacement (translation operation) by tΘ. This parallel displacement is repeated inside the parallel prism 26 n times. As a result, the bundle of rays finally being emitted from the parallel prism 26 has performed a parallel displacement (translation operation) by ntΘ.

A distance T between the bundle of rays first incident on the parallel prism 26 and the bundle of rays finally emitted from the parallel prism 26 is nt. Accordingly, the ray-bundle-moving distance ntΘ, due to the angle-Θ rotation, is TΘ. Because the moving distance of the objective lens 3 is RΘ, no optical-axis deviation occurs if R=T.

With reference to FIGS. 27-30B, a fourth embodiment of the present invention will now be described. For an optical head device 32 in the fourth embodiment, the same terms and reference numerals are given to components identical to those in the above-described optical head device 18 in the second embodiment, and descriptions thereof are omitted.

Figure 27:
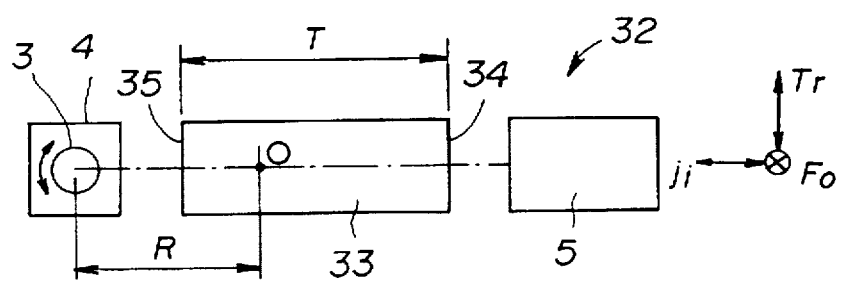
FIG. 27 shows a plan view of an optical head device in a fourth embodiment and in a fourteenth embodiment of the present invention.

In the optical head device 32, as shown in FIG. 27, a rectangular-parallelepiped prism 33 acting as a moving deflection means and the fixed mirror 4 are arranged in the given order in the jitter direction of the fixed optical system 5. Because the rectangular-parallelepiped prism 33 is arranged in the jitter direction, a first transmission plane 34 and a second transmission plane 35 formed at the two sides thereof face one another in parallel, and each of them is perpendicular to the optical-axis direction. Because the bundle of rays goes back and forth between the fixed optical system 5 and the optical disc 2, the first and second transmission planes 34, 35 alternate between an incident plane and an emitting planes according to a direction of the bundle of rays.

As shown in FIG. 28, the objective lens 3 and rectangular-parallelepiped prism 33 are commonly fitted to the single lens holder 36. Thus, a co-moving mechanism 37 is formed and causes the first and second transmission planes 34, 35 to move integrally with the objective lens 3.

The optical head device 32 has an arrangement such that:

$R=T(n-1)/n$;

where, as shown in FIG. 29, R is referred to a distance in the jitter direction between an axis O which is a rotation axis of the lens holder 36 and an optical-axis center of the objective lens 3. T is referred to a distance in the jitter direction between the first and second transmission planes 34, 35 of the rectangular-parallelepiped prism 33. The refractive index of the rectangular-parallelepiped prism 33 is referred to as n. The rectangular-parallelepiped prism 33 is formed of a glass or like material such that n=1.5, for example.

In this arrangement of the optical head device 32, a rotation of the lens holder 36 causes the objective lens 3 to move in the tracking direction. At the same time, the rectangular-parallelepiped prism 33 also moves integrally with the objective lens 3. At this time, when the lens holder 33 turns by an infinitesimal angle Θ, a bundle of rays incident on the objective lens 3 from the fixed optical system via the first and second transmission planes 34, 35 of the rectangular-parallelepiped prism 33 performs a parallel displacement (translation operation) by approximately TΘ(n−1)/n in the tracking direction. Simultaneously, the objective lens 3 moves in the tracking direction by approximately RΘ. Because R=T(n−1)/n, the moving distance of the bundle of rays incident on the objective lens 3 is equal to the moving distance of the objective lens 3. Accordingly, the objective lens 3 is still aligned with the optical axis of the incident bundle of rays. Thus, no optical-axis deviation occurs in the bundle of rays being incident on the objective lens 3 from the fixed optical system 5, and also no optical-axis deviation occurs in the bundle of rays incident on the fixed optical system 5 from the objective lens 3.

This fact will now be explained with reference to FIGS. 29, 30A and 30B. Each of the first and second transmission planes 34, 35 is perpendicular to the jitter direction, initially. When the rectangular-parallelepiped prism 33 is rotated about the axis O, positions of the first and second transmission planes 34, 35 move accordingly. However, because the optical axis of the bundle of rays emitted from the fixed optical system 5 passes through the rotation axis O of the rectangular-parallelepiped prism 33, an infinitesimal angle Θ rotation of the rectangular-parallelepiped prism 33 is equivalent to the angle Θ rotation of the first transmission plane 34 about a point P shown in FIG. 29, when examining position change of the bundle of rays in the rectangular-parallelepiped prism 30.

When the rectangular-parallelepiped prism 33 turns by the angle Θ, the bundle of rays emitted by the fixed optical system 5 in the jitter direction is incident on and refracted by the first transmission plane 34 at the point P as shown in FIG. 30B. At this time, a relationship between the refraction angle w and the rotation angle Θ is such that n=sinΘ/sinw≈Θ/w. Thus, w≈Θ/n. Because the bundle of rays travels in a direction inclined by an angle $w_2$, shown in FIG. 30B, from a direction of the original optical axis, the angle $w_2$ is such that $w_2=Θ-w=Θ-Θ/n=Θ(n-1)/n$.

Thus, the bundle of rays at angle $w_2$ refracted at the point P on the first transmission plane 34 is emitted externally from the similarly inclined second transmission plane 35 at a position Q' as shown in FIG. 30A. This position Q' results from a normal position Q moving by a distance t in the tracking direction. This distance t is such that t≈Tw$_2$=TΘ(n−1)/n (the angle $w_2$ is measured in radians).

Simultaneously, the optical-axis center of the objective lens 3 moves by RΘ in the tracking direction due to the angle-Θp rotation. This distance RΘ is such that RΘ=TΘ(n−1)/n because R=T(n−1)/n.

Thus, in the optical head device 32, when the lens holder 36 turns by the angle Θ for performing a tracking control operation, the optical axis of the bundle of rays incident on the objective lens 3 forms the fixed optical system 5 via the first and second transmission planes 34, 35 moved by TΘ(n−1)/n in the tracking direction. However, simultaneously the objective lens 3 also moves by TΘ(n−1)/n in the tracking direction. Accordingly, the objective lens 3 is still aligned with the optical axis of the incident bundle of rays. Thus, no optical-axis deviation occurs in the bundle of rays incident on the objective lens 3 from the fixed optical system 5. Similarly, no optical-axis deviation occurs in the bundle of rays returning to the fixed optical system 5 after being reflected by the optical disc 2, converged by the objective lens 3 and refracted by the first and second transmission planes 34, 35 of the rectangular-parallelepiped prism 33.

In the optical head device 32, even in a case where a tracking error is detected through the push-pull method, no DC offset is produced in the detection signal. As a result, a tracking control can be performed with high accuracy. Further, undesirable variation in light intensity of the bundle of rays incident on the optical disc 2 due to light intensity distribution of laser beam such as that shown in FIG. 2 is prevented. As a result, undesirable variation in light intensity of the bundle of rays detected by the fixed optical system 5 is prevented. Thereby, it is possible to perform information recording and reproducing on the optical disc 2 with high accuracy.

Further, in contrast to the optical head device 312 in the related art shown in FIG. 3, it is not necessary to arrange a plurality of optical components in the focusing direction in the optical head device 32. As a result, it is possible to miniaturize the optical head device 32 in the focusing direction. Further, as shown in FIG. 28, the objective lens 3 and first, second transmission planes 34, 35 of the rectangular-parallelepiped prism 33 are provided directly on the lens holder 36 and thereby move integrally as described above. Accordingly, undesirable resonance vibration of the objective lens 3 can be prevented with respect to the first and second transmission planes 34, 35 of the rectangular-parallelepiped prism 33.

Figure 31:
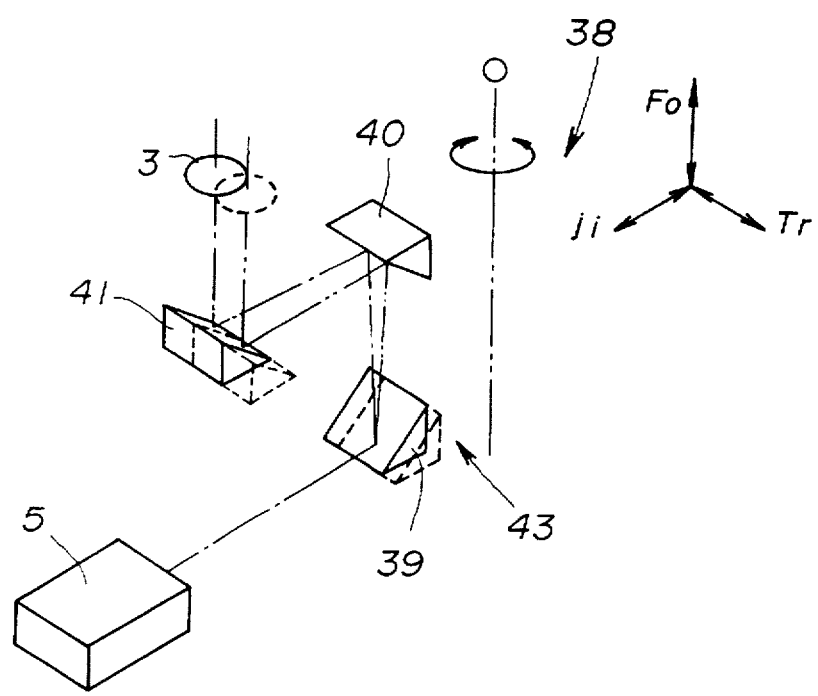
FIG. 31 shows an exploded, perspective view indicating an arrangement of various components/parts of an optical head device in a fifth embodiment and in a fifteenth embodiment of the present invention.
Figure 32:
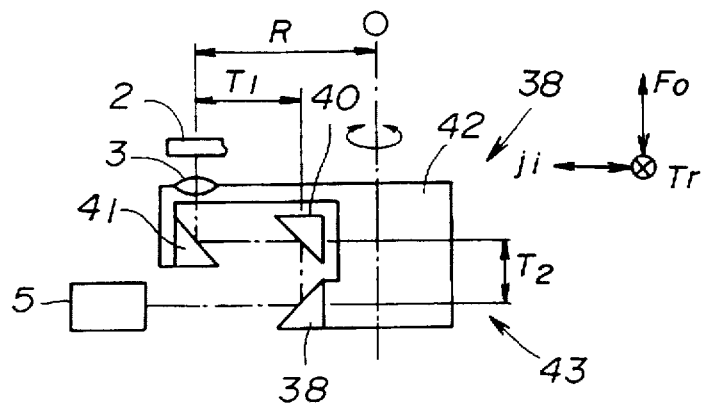
FIG. 32 shows a side view of the optical head device in the fifth embodiment and fifteenth embodiment.

With reference to FIGS. 31 and 32, a fifth embodiment of the present invention will now be described. For an optical head device 38 in the fifth embodiment, the same terms and reference numerals are given to components identical to those in the above-described optical head device 18 in the second embodiment, and descriptions thereof are omitted.

In the optical head device 38, as shown in FIG. 31, a first movable mirror 39 acting as first movable deflection means is arranged at a position so as to face the fixed optical system 5 in the jitter direction. A fixed mirror 40 acting as fixed deflection means is fixed at a position so as to face the first movable mirror 39 in the focusing direction. A second movable mirror 41 acting as second movable deflection means is arranged at a position so as to face the fixed mirror 40 in the jitter direction. The objective lens 3 is arranged at a position so as to face the second movable mirror 41 in the focusing direction.

As shown in FIG. 32, the objective lens 3, first movable mirror 39 and second movable mirror 41 are commonly fitted to a single lens holder 42. Thus, a co-moving mechanism 43 is formed and causes the first and second movable mirrors 39, 41 to move integrally with the objective lens 3.

The optical head device 38 has an arrangement such that:

$$R = T_1 + T_2;$$

where R is referred to as a distance in the jitter direction between an axis O which is a rotation axis of the lens holder 42 and an optical axis of the lens holder 3, $T_1$ is referred to as a distance in the focusing direction between the fixed mirror 40 and the first movable mirror 39, and $T_2$ is referred to as a distance in the jitter direction between the second movable mirror 41 and the fixed mirror 40.

In this optical head device 38, the objective lens 3 is caused to move in the tracking direction by rotation of the lens holder 42. Simultaneously, together with the objective lens 3, first and second movable mirrors 39, 41 are integrally rotated. At this time, when the lens holder 42 turns by an infinitesimal angle $\Theta$, a bundle of rays incident on the objective lens 3 from the fixed optical system 5 via the mirrors 39, 40, 41 moves by approximately $(T_1+T_2)\Theta$ ($\Theta$ is in radians) in the tracking direction in a parallel displacement (translation operation). Simultaneously, the objective lens 3 moves in the tracking direction by approximately $R\Theta$. Because $R=T_1+T_2$, the objective lens 3 is still aligned with the optical axis of the incident bundle of rays after moving. Thus, no optical-axis deviation occurs in the bundle of rays incident on the objective lens 3 from the fixed optical system 5, and also no optical-axis deviation occurs in the bundle of rays incident on the fixed optical system 5 from the objective lens 3.

In detail, when the first and second movable mirrors 39, 41 turn together with the objective lens 3 about the axis O by the angle $\Theta$, the bundle of rays emitted from the fixed optical system 5 in the jitter direction and reflected by the first movable mirror 39 is incident on the fixed mirror 40 in a direction inclined from the focusing direction by the angle $\Theta$ in the tracking direction. A position at which the bundle of rays is incident on the fixed mirror 40 moves from the normal position by $\Theta T_1$ ($\Theta$ is in radians) in the tracking direction. Also the bundle of rays reflected by the fixed mirror 40 is incident on the second movable mirror 41 in a direction inclined from the jitter direction by the angle $\Theta$ in the tracking direction.

At this time, a position at which the bundle of rays is incident on the second movable mirror 41 moves from the position, at which the bundle of rays is reflected by the fixed mirror, by $\Theta T_2$ in the tracking direction. Thus, the position at which the second movable mirror 41 reflects the bundle of rays moves from the normal position by $\Theta T_1 + \Theta T_2$ in the tracking direction, where $\Theta T_1 + \Theta T_2 = (T_1+T_2)\Theta$. At this position, the bundle of rays is reflected by the second movable mirror 41 in the focusing direction.

Simultaneously, the optical-axis center of the objective lens 3 moves by $R\Theta$ in the tracking direction due to the angle-$\Theta p$ rotation. This distance $R\Theta$ is such that $R\Theta=(T_1+T_2)\Theta$ because $R=T_1+T_2$.

Thus, in the optical head device 38, when the lens holder 42 turns by the angle $\Theta$ for performing a tracking control operation, the optical axis of the bundle of rays incident on the objective lens 3 forms the fixed optical system 5 via the first and second movable mirrors 39, 41 and moves by $(T_1+T_2)\Theta$ in the tracking direction. However, simultaneously the objective lens 3 also moves by $(T_1+T_2)\Theta$ in the tracking direction. Accordingly, the objective lens 3 is still aligned with the optical axis of the incident bundle of rays. Thus, no optical-axis deviation occurs in the bundle of rays incident on the objective lens 3 from the fixed optical system 5. Similarly, no optical-axis deviation occurs in the bundle of rays returning to the fixed optical system 5 after being reflected by the optical disc 2, converged by the objective lens 3 and refracted by the first and second movable mirrors 39, 41.

In the optical head device 38, even in a case where a tracking error is detected through the push-pull method, no DC offset is produced in the detection signal. As a result, a tracking control can be performed with high accuracy. Further, undesirable variation in light intensity of the bundle of rays incident on the optical disc 2 due to light intensity distribution of laser beam such as that shown in FIG. 2 is prevented. As a result, undesirable variation in light intensity of the bundle of rays detected by the fixed optical system 5 is prevented. Thus, it is possible to perform information recording and reproducing on the optical disc 2 with high accuracy.

In contrast to the optical head device 312 in the related art shown in FIG. 3, it is not necessary to arrange a plurality of optical components in the focusing direction in the optical head device 38. As a result, it is possible to miniaturize the optical head device 38 in the focusing direction. Further, the objective lens 3 and first, second movable mirrors 39, 41 are provided directly on the lens holder 42 and move integrally as described above. Accordingly, undesirable resonance vibration of the objective lens 3 can be prevented with respect to the first and second movable mirrors 39, 41.

Figure 33:
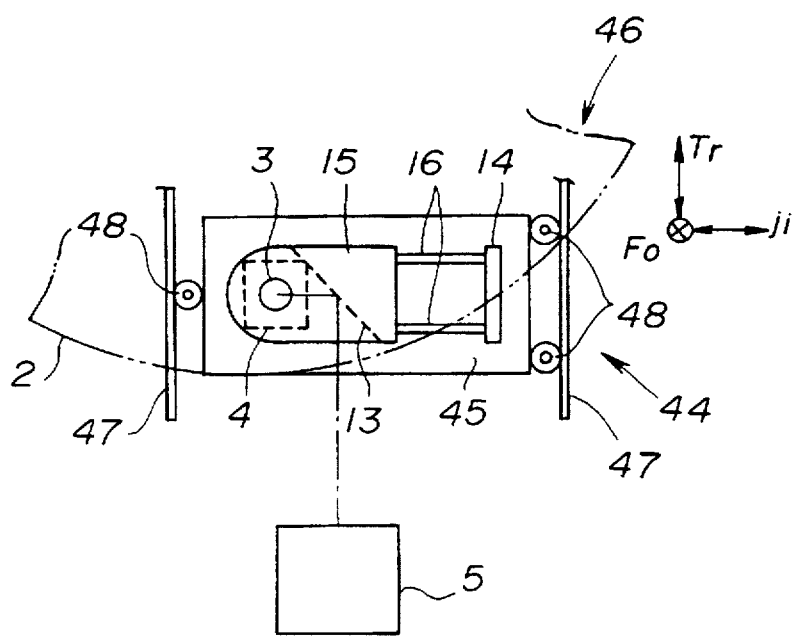
FIG. 33 shows a plan view of an optical head device in a sixth embodiment and in a sixteenth embodiment.

With reference to FIG. 33, a sixth embodiment of the present invention will now be described. For an optical head device 44 in the sixth embodiment, the same terms and reference numerals are given to components identical to those in the above-described optical head device 12 in the first embodiment, and descriptions thereof are omitted.

In this optical head device 44, the fixed mirror 4 and the lens supporting member 14 are fixed to a carriage 45. This carriage 45 is supported in an apparatus body (not shown in the figure) through a head carrying mechanism 46 movable in the tracking direction with respect to the apparatus body. The fixed optical system 5 is fixed to the apparatus body, and faces the movable mirror 13 which is movable together with the carriage 45.

The head carrying mechanism 46 has a pair of guide rails 47, each of which extends along the tracking direction and are fixed to the apparatus body. Wheels 48 are provided to the carriage 45 and used for the carriage to slide on the rails 47. A linear motor (not shown in the figure) is provided for driving the carriage 45. A stator of the linear motor is fixed to the apparatus body and a rotor of the linear motor is fitted to the carriage 45 In this optical head device 44, a tracking operation for causing the objective lens 3 to follow a slight movement of a track due to rotation of the optical disc 2 is performed as a result of the lens holder 15 being moved with respect to the carriage 45 similar to the arrangement shown in FIG. 10. In contrast to this, a seeking operation, in which a track of the optical disc 2 to be accessed is changed, is performed by movement of the carriage 45 with respect to the apparatus body. Because the fixed optical system 5 is not mounted on the carriage 45, a mass to be driven in the seeking operation can be effectively reduced, and thereby it is possible to achieve a high-speed seeking operation and to save power required therefor.

Use of the linear motor as a driving source of the head carrying mechanism 46 has been indicated merely for example. It is also possible to use a combination of a stepper motor and a rack-and-pinion mechanism, a combination of a stepper motor and a feed-screw mechanism, or the like.

Figure 34:
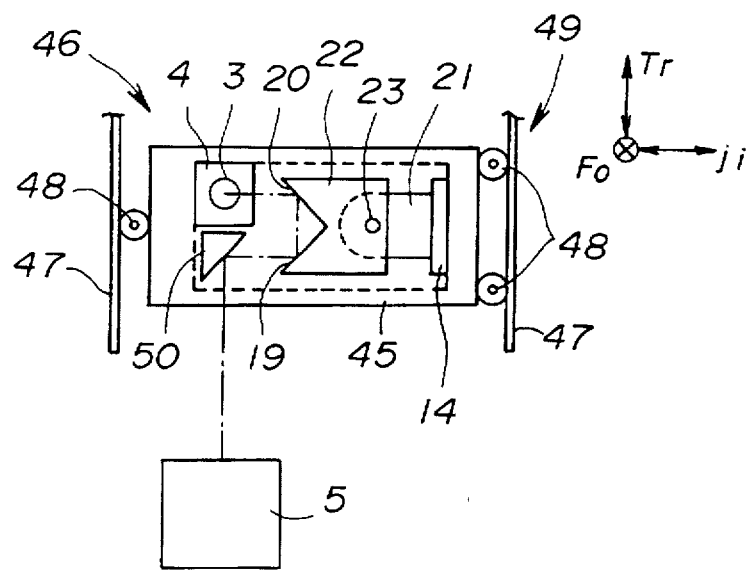
FIG. 34 shows a plan view of an optical head device in a seventh embodiment and in a seventeenth embodiment.

With reference to FIG. 34, a seventh embodiment of the present invention will now be described. For an optical head device 49 in the seventh embodiment, the same terms and reference numerals are given to components identical to those in the optical head devices 18, 44, and descriptions thereof are omitted.

In this optical head device 49, the carriage 45 is movably supported through the head carrying mechanism 46 to be movable in the tracking direction with respect to the apparatus body. The lens holder 22 and fixed mirror 4 are mounted on the carriage 45. Also on the carriage 45, a reflection mirror 50 is fixed at a position so as to face the first movable mirror 19 of the lens holder 22. The fixed optical system 5 is fixed to the apparatus body at a position so as to face the reflection mirror 50.

The tracking operation for causing the objective lens 3 to follow a slight movement of a track due to rotation of the optical disc 2 is performed as a result of the lens holder 22 being moved with respect to the carriage 45 similar to arrangement shown in FIG. 13. In contrast to this, a seeking operation, in which a track of the optical disc 2 to be accessed is changed, is performed by movement of the carriage 45 with respect to the apparatus body. Because the fixed optical system 5 is not mounted on the carriage 45, a mass to be driven in the seeking operation can be effectively reduced, and it is possible to achieve high-speed seeking operation and to save power required therefor.

Figure 35:
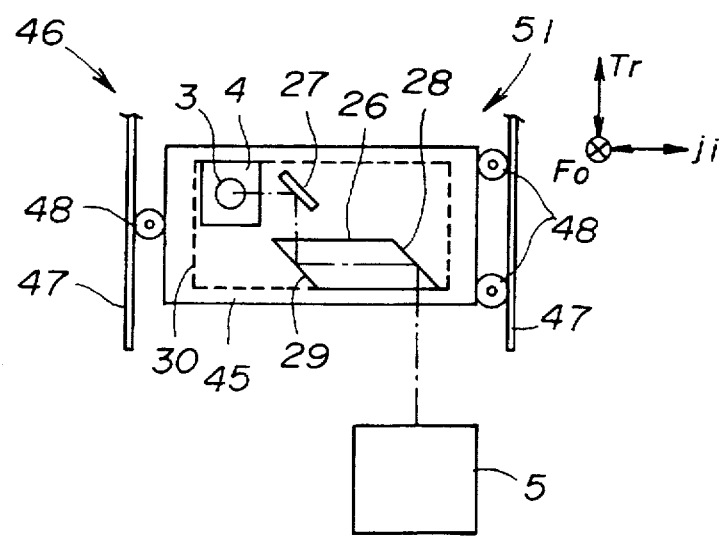
FIG. 35 shows a plan view of an optical head device in an eighth embodiment and in an eighteenth embodiment.

With reference to FIG. 35, an eighth embodiment of the present invention will now be described. For an optical head device 51 in the eighth embodiment, the same terms and reference numerals are given to components identical to those in the optical head devices 25, 44, and descriptions thereof are omitted.

In this optical head device 51, the lens holder 30 and fixed mirror 4 are mounted on the carriage 45 which is movable in the tracking direction. At a position facing the first reflection plane 28 of the parallel prism 26, the fixed optical system 5 is fixed on the apparatus body.

The tracking operation for causing the objective lens 3 to follow a slight movement of a track due to rotation of the optical disc 2 is performed as a result of the lens holder 30 being moved with respect to the carriage 45 similar to the arrangement shown in FIG. 19. In contrast to this, a seeking operation, in which a track is changed, is performed by movement of the carriage 45 with respect to the apparatus body. Because the fixed optical system 5 is not mounted on the carriage 45, a mass to be driven in the seeking operation can be effectively reduced, and it is possible to achieve a high-speed seeking operation and to save power required therefor.

Figure 36:
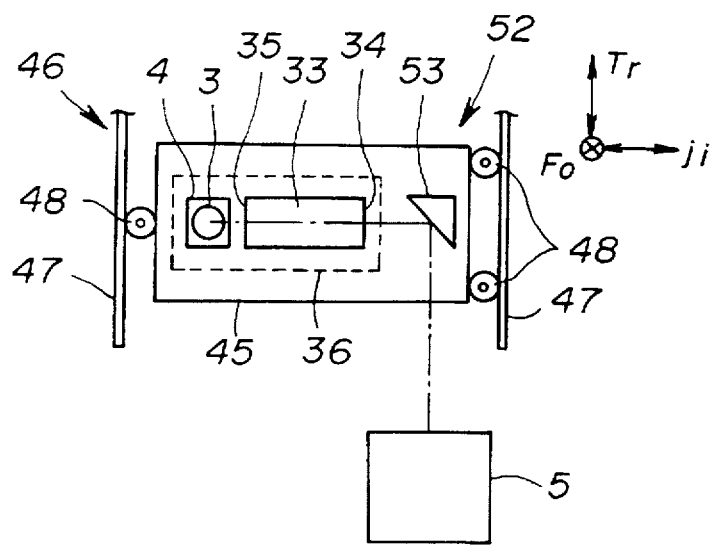
FIG. 36 shows a plan view of an optical head device in a ninth embodiment and in a nineteenth embodiment.

With reference to FIG. 36, a ninth embodiment of the present invention will now be described. For an optical head device 52 in the ninth embodiment, the same terms and reference numerals are given to components identical to those in the optical head devices 32, 44, and descriptions thereof are omitted.

In this optical head device 52, a reflection mirror 53, the lens holder 36 and fixed mirror 4 are mounted on the carriage 45 which is movable in the tracking direction. The reflection mirror 53 faces the first transmission plane 34 of the rectangular-parallelepiped prism 33 at a 45° angle and the fixed optical system 5 at a 45° angle as shown in the figure.

The tracking operation for causing the objective lens 3 to follow a slight movement of a track due to rotation of the optical disc 2 is performed as a result of the lens holder 36 being moved with respect to the carriage 45 similar to the arrangement shown in FIG. 28. In contrast to this, a seeking operation, in which a track is changed, is performed by movement of the carriage 45 with respect to the apparatus body. Because the fixed optical system 5 is not mounted on the carriage 45, a mass to be driven in the seeking operation can be effectively reduced, and it is possible to achieve a high-speed seeking operation and to save power required therefor.

Figure 37:
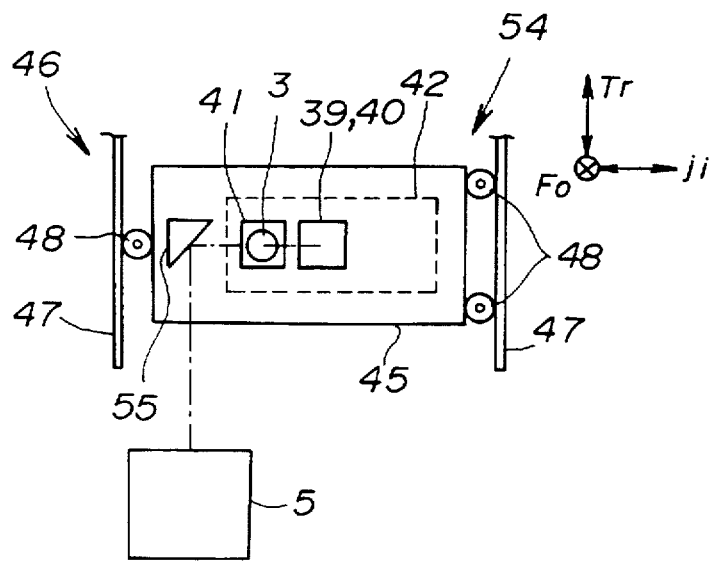
FIG. 37 shows a plan view of an optical head device in a tenth embodiment and in a twentieth embodiment.

With reference to FIG. 37, a tenth embodiment of the present invention will now be described. For an optical head device 54 in the tenth embodiment, the same terms and reference numerals are given to components identical to those in the optical head devices 38, 44, and descriptions thereof are omitted.

In this optical head device 54, the lens holder 42 and a reflection mirror 55 are mounted on the carriage 45 which is movable in the tracking direction. The reflection mirror 55 faces the first movable mirror 39 and the fixed optical system 5.

The tracking operation for causing the objective lens 3 to follow a slight movement of a track due to rotation of the optical disc 2 is performed as a result of the lens holder 36 being moved with respect to the carriage 42 similar to the arrangement shown in FIG. 32. In contrast to this, a seeking operation, in which a track is changed, is performed by movement of the carriage 45 with respect to the apparatus body. Because the fixed optical system 5 is not mounted on the carriage 45, a mass to be driven in the seeking operation can be effectively reduced, and it is possible to achieve a high-speed seeking operation and to save power required therefor.

With reference to FIGS. 38, 39, 40, 41 and 42, an eleventh embodiment of the present invention will now be described. With regard to an optical head device 221 in the eleventh embodiment, the same terms and reference numerals are given to components identical to those in the optical head device 201 in the related art shown in FIG. 4, and descriptions thereof are omitted.

Figure 4:
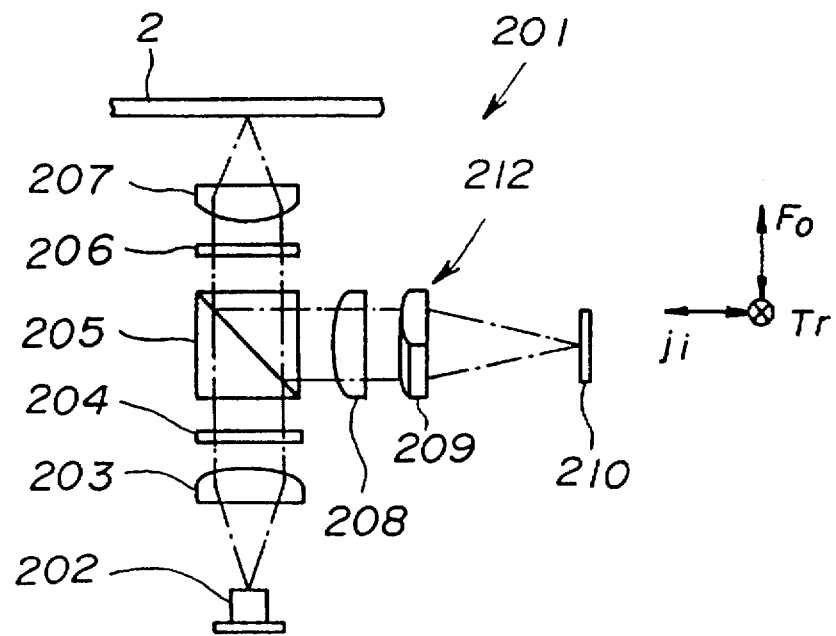
FIG. 4 shows a side view indicating various components/parts of an optical head device in another example of the related art.
Figure 5:
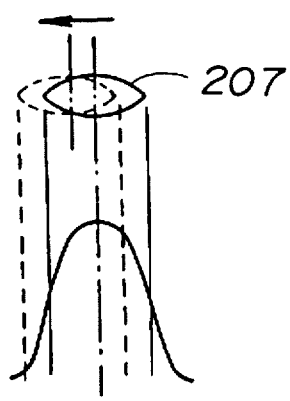
FIG. 5 shows a light intensity distribution of a bundle of rays.
Figure 6:
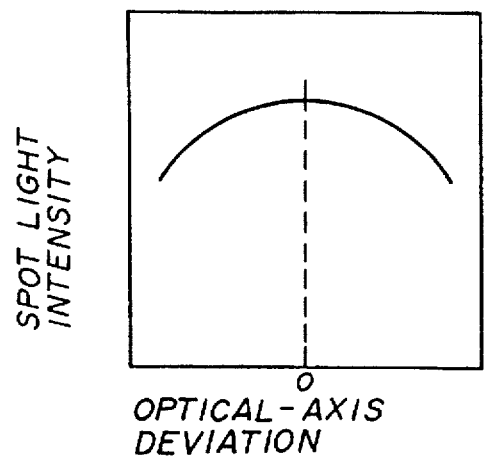
FIG. 6 shows a characteristic graph indicating a relationship between an optical-axis deviation and a spot light intensity.
Figure 39:
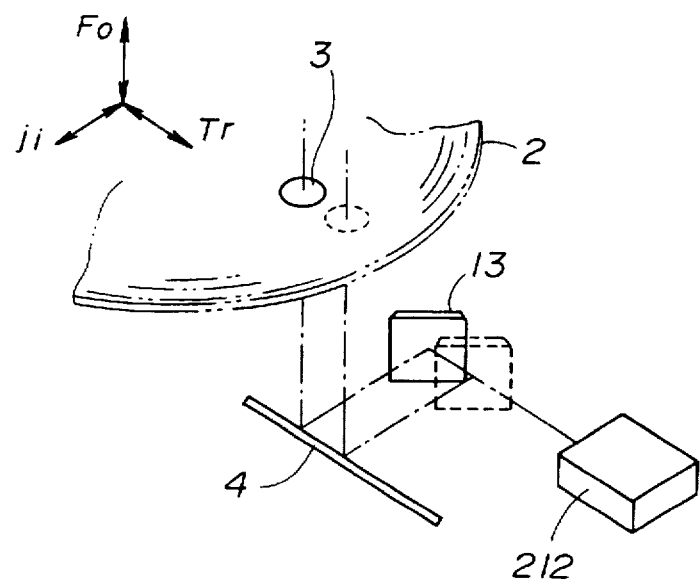
FIG. 39 shows an exploded, perspective view indicating an arrangement of optical components/parts of the optical head device in the eleventh embodiment.
Figure 40:
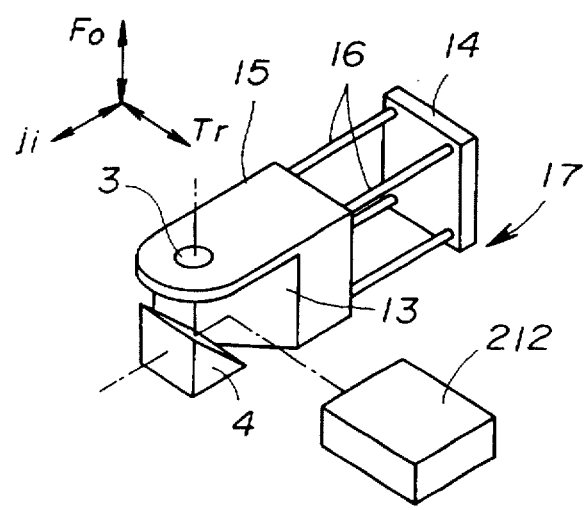
FIG. 40 shows a perspective view indicating the optical head device in the eleventh embodiment.

As shown in FIGS. 39 and 40, the optical head device 221 includes an arrangement approximately identical to the arrangement of the optical head device 12 in the first embodiment with reference to FIGS. 9 and 10. However, instead of the fixed optical system 5 of the first embodiment, the fixed optical system 212, identical to the fixed optical system 212 in the related art described with reference to FIG. 4, is used. With regard to the optical system 221, the same terms and reference numerals are given to components substantially identical to those in the optical head device 12 in the first embodiment shown in FIGS. 9 and 10, and descriptions thereof are omitted.

Secured in the lens holder 15 of the optical head device 221 is a tracking coil and a focusing coil. A tracking magnet and a focusing magnet, facing the tracking coil and focusing coil respectively, are fixed to the head base (each member not shown in the figures). The tracking coil and focusing coil are included in the co-moving mechanism 17. Thereby, positions of the movable mirror 13 and objective lens 3 are integrally controlled in the tracking direction and focusing direction through the co-moving mechanism 17.

Figure 38:
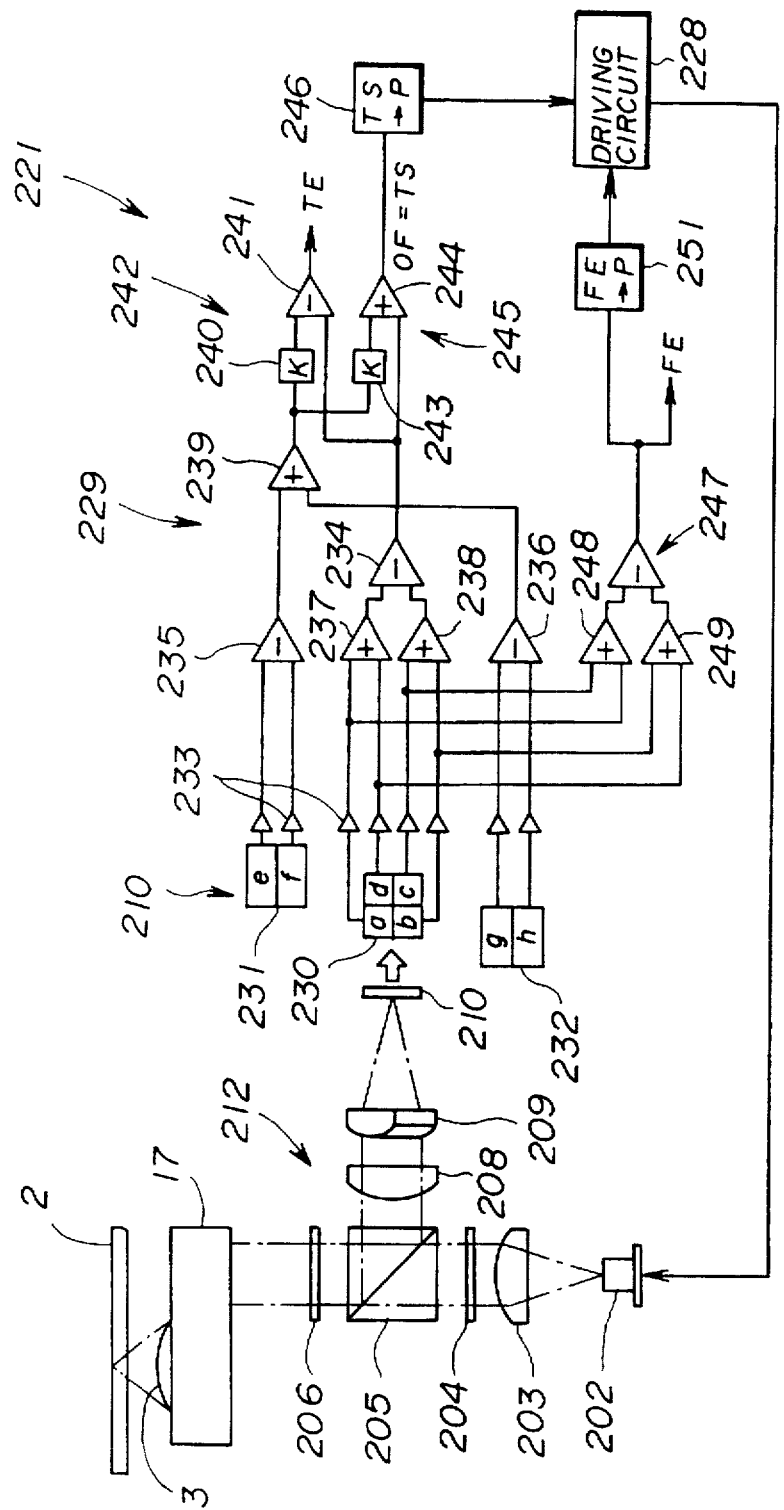
FIG. 38 shows a diagram indicating an arrangement of various components/parts of an optical head device in a eleventh embodiment of the present invention.

As shown in FIG. 38, a laser driving circuit 228 is connected to the semiconductor laser 202 in the fixed optical system 212. An error detecting circuit 229 is connected to the light-receiving element unit 210 in the fixed optical system 212. In the light-receiving element unit 210, a main detecting unit 230 which is a single light-receiving element is provided at a position at which the main detecting unit 230 receives the main bundle of rays. In the light-receiving element unit 210, sub-detecting units 231, 232, which are two light-receiving elements respectively, are separately provided at positions at which the sub-detecting units 231, 232 receive the two sub-bundles of rays, respectively. The main detecting unit 230 includes four photodiodes 'a', 'b', 'c' and 'd', the sub-detecting unit 231 includes two photodiodes 'e' and 'f' and the sub-detecting unit 232 includes two photodiodes 'g' and 'h'.

A current-voltage converting amplifier 233 is individually connected to each of the photodiodes a, b, c, d, e, f, g and h. Differential amplifiers 234, 235 and 236, acting as push-pull signal generating means, are connected to the current-voltage converting amplifiers 233 for the three detecting units 230, 232 and 232, respectively, as shown in FIG. 38. Because the main detecting unit 230 includes the four photodiodes a, b, c and d, for each two photodiodes adjacent in a direction corresponding to the direction perpendicular to the tracking direction, a respective one of adders 237 and 238 are inserted between the current-voltage converting amplifiers 233 and the differential amplifier 234. (That is, the adder 237 adds two of the four photodiodes a, b, c and d aligned in the direction corresponding to the direction perpendicular to the tracking direction, and the adder 238 adds other two photodiodes also aligned in the same direction corresponding to the direction perpendicular to the tracking direction.)

An adder 239 is connected to the differential amplifiers 235, 236 which are connected to the sub-detecting units 231, 232. A gain adjuster 240 is connected to the adder 239. The gain adjuster 240 and the differential amplifier 234, connected to the main detecting unit 230, are connected to a differential amplifier 241. Thus, a tracking detecting circuit 242 acting as tracking signal generating means is formed. A tracking driving circuit (not shown in the figure) is connected to the tracking detecting circuit 242. The tracking coil in the co-moving mechanism 17 is connected to the tracking driving circuit.

Similarly, the adder 239 connected to the sub-detecting units 231, 232 is also connected to another gain adjuster 243. The gain adjuster 243 and the differential amplifier 234, connected to the main detecting unit 230, are connected to a differential amplifier 244. Thus, a tilt detecting circuit 245 acting as tilt signal generating means is formed. A first laser control circuit 246 acting as output control means is connected to the tilt detecting circuit 245. The laser control circuit 246 is connected to the laser driving circuit 228.

A focusing detecting circuit 247 is also connected to the main detecting unit 230. This focusing detecting circuit 247 includes adders 248, 249, to a respective one of which two photodiodes adjacent in each diagonal direction are connected, and the adders 248, 249 which are connected to a differential amplifier 250. A focusing driving circuit (not shown in the figures) is connected to the focusing detecting circuit 247, and is connected to the focusing coil in the co-moving mechanism 17. Further, a second laser control circuit 251 acting as output control means is connected to the focusing detecting circuit 247. The laser control circuit 251 is connected also to the laser driving circuit 228.

In this optical head device 221, the fixed optical system 212 emits the main bundle of rays and two sub-bundles of rays in the tracking direction. These three bundles of rays are deflected by the movable mirror 13, shown in FIG. 39, in the jitter direction. The thus-deflected three bundles of rays are further deflected by the fixed mirror 4 in the focusing direction, then converged by the objective lens 3 and incident on the optical disc 2. The main bundle of rays forms an image on a track of the optical disc, and the two sub-bundles of rays individually form images on two gaps, located at the two sides of the track, respectively.

The three bundles of rays are reflected by the optical disc 2, converged by the objective lens 3, and deflected by the fixed mirror 4 in the jitter direction. The thus-deflected three bundles of rays are further deflected by the movable mirror 13 in the tracking direction and incident on the fixed optical system 212. In the fixed optical system, the main detecting unit 230 detects the reflected light of the main bundle of rays, while the sub-detecting units 231, 232 individually detect the reflected light of the two sub-bundles of rays, respectively.

At this time, in the detecting units 230, 231 and 232, the photodiodes a, b, c, d, e, f, g and h detect the incident bundle of rays. A difference between outputs of the two sides in the tracking direction of each detecting unit is obtained in a respective one of the differential amplifiers 234, 235 and 236. Thus, three push-pull signals indicating tracking errors are generated.

These push-pull signals are input to the tracking detecting circuit 242. The tracking detecting circuit 242 uses the differential push-pull method and generates a tracking signal. The two push-pull signals of the sub-bundle of rays are added to each other through the adder 239. Gain of the adding result is adjusted through the gain adjuster 240. The result is subtracted from the push-pull signal of the main bundle of rays through the differential amplifier 241. Thus, the tracking signal TE is generated. This tracking signal TE is such that:

$$TE=(sa+sd)-(sb+sc)-K\{(se-sf)+(sg-sh)\};$$

where sa, sb, sc, sd, se, sf, sg and sh are referred to the detection results of the photodiodes a, b, c, d, e, f, g and h, respectively; and K is referred to as an adjustment coefficient of the gain adjuster 240.

The focusing detecting circuit 247 uses the four detection results of the four photodiodes a, b, c and d of the main detecting unit 230, and generates a focusing direction through the well-known astigmatic method. The detection results of two photodiodes adjacent to each other in each diagonal direction are added to each other through a respective one of the adders 248, 249. A difference between the results is obtained through the differential amplifier 250. Thus, the focusing signal FE is generated. This focusing signal is such that:

$$FE=(sa+sc)-(sb+sd).$$

Using the focusing signal and tracking signal, the co-moving mechanism 17 of the optical head device 221 controls a position of the lens holder 15 of the optical head device 221 in the focusing direction and tracking direction. Thus, the objective lens 3 of the lens holder 15 appropriately forms a spot on the track of the optical disc 2, and information recording and reproducing can be properly performed on the track through the optical head device 221.

In the optical head device 221, for the same reasons as described for the optical head device 12 in the first embodiment, no optical-axis deviation occurs in the bundles of rays incident on the objective lens 3 from the fixed optical system 212 via the movable mirror 13 and the fixed mirror 4.

In the optical head device 221, the tilt detecting circuit 245 generates a tilt signal. Output of the semiconductor laser 202 is corrected by using the tilt signal and the focusing signal. As a result, even if disc tilt and/or focusing error occurs, light intensity of a spot formed on the track of the optical disc 2 is maintained as having a constant value.

In the tilt detecting circuit, the two push-pull signals of the sub-bundle of rays are added to each other through the adder 239, and gain of the adding result is adjusted through the gain adjuster 243. The result is added to the push-pull signal of the main bundle of rays through the differential amplifier 241. Thus, an offset signal OF is generated. This offset signal OF is such that:

$$TE=(sa+sd)-(sb+sc)+K\{(se-sf)+(sg-sh)\},$$

where K is referred to as an adjustment coefficient of the gain adjuster 243. The offset signal OF may indicate optical-axis deviation in the objective lens 3 and tilt of the optical disc 2 with respect to a plane perpendicular to an optical axis of incident bundles of rays. However, the optical head device 221 has no optical-axis deviation for the same reasons as those described above for the optical head device 12 in the first embodiment. Therefore, the offset signal OF can be treated as a tilt signal TS which specially indicates tilt of the optical disc 2 with respect to a plane perpendicular to an optical axis of incident bundles of rays.

Figure 7:
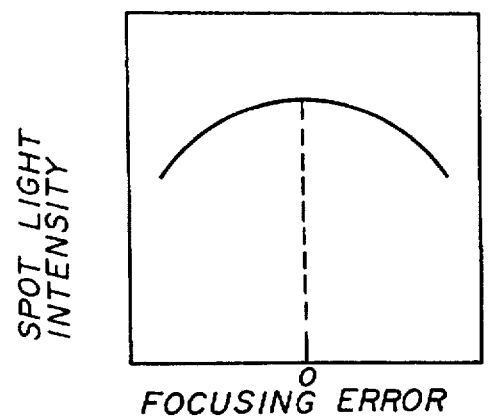
FIG. 7 shows a characteristic graph indicating a relationship between a focusing error and a spot light intensity.
Figure 8:
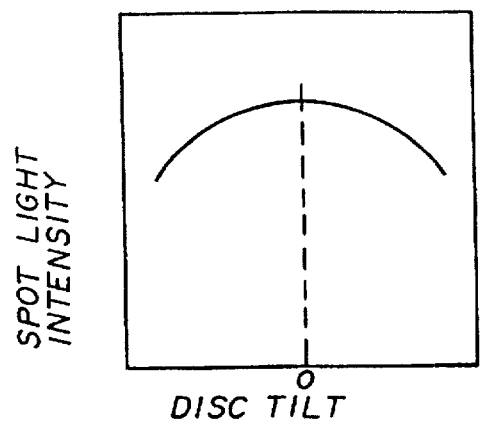
FIG. 8 shows a characteristic graph indicating a relationship between disc tilt and spot light intensity.

According to a curve shown in FIG. 41, output of the laser driving circuit 228 is controlled by the first laser control circuit 246 by using the thus-obtained tilt signal TS. Simultaneously, according to a curve shown in FIG. 42, the output of the laser driving circuit 228 is controlled by the second laser control circuit 251 by using the thus-obtained focusing signal FE. Thus, output of the semiconductor laser 2 is changed depending on the focusing error and disc tilt indicated by the focusing signal FE and tilt signal TS, respectively. Light intensity of a spot formed on the optical disc 2 decreases as focusing error and disc tilt increase, as shown in FIGS. 7 and 8. In order to compensate for such light-intensity decrease, the laser power of the bundles of rays to be supplied should be increased at a rate corresponding to a rate of the light-intensity decrease. For example, when a rate of light-intensity decrease due to focusing error is 1/(1.2), the laser power increase should be at a rate of 1.2 through the laser control circuit 246. Similarly, when a rate of light-intensity decrease due to disc tilt is 1/(1.1), the laser power increase should be at a rate of 1.1 through the laser control circuit 251. If focusing error and disc tilt simultaneously occur, the output of the semiconductor laser 2 should be increased at a rate obtained from multiplying 1.2 by 1.1, that is, in the rate of 1.32.

In the optical head device 221, no optical-axis deviation occurs in the objective lens 3 when the tracking control is performed. Therefore, undesirable variation in light intensity of the spot formed on the optical disc 2 due to light intensity distribution of the laser beam such as that shown in FIG. 2 is prevented. As a result, undesirable variation in light intensity of the bundle of rays detected by the fixed optical system 212 is prevented. Output of the semiconductor laser 202 is controlled so as to compensate light-intensity decrease of the spot formed on the optical disc 2 which occurs due to disc tilt and/or focusing error. Accordingly, it is possible to perform information recording and reproducing on the optical disc 2 by the fixed optical system 212 with a high accuracy.

Because no optical-axis deviation occurs in the objective lens 3, the offset signal which may indicate optical-axis deviation and disc tilt can be treated as a tilt signal. As a result, without providing another special sensor device, disc tilt can be appropriately detected. In other words, it is not necessary to provide a special sensor device for detecting the disc tilt and also it is not necessary to provide a sensor device for detecting the optical-axis deviation. As a result, it is possible to effectively reduce a number of components/parts used in the optical head device, and improve efficiency of assembling the optical head device. It is also possible to miniaturize and reduce weight of the optical head device.

Other effects/advantages of the optical head device 221 are the same as those described in the description of the optical head device 12 in the first embodiment.

A twelfth embodiment of the present invention will now be described. An optical head device in the twelfth embodiment is similar to the optical head device 221 in the eleventh embodiment. However, instead of the arrangement shown in FIGS. 39 and 40 including the optical disc 2, fixed mirror 4, co-moving mechanism 17 and fixed optical system 212 in the eleventh embodiment, an arrangement shown in FIGS. 43, 12 and 13 (in FIG. 12, the fixed optical system 5 is replaced with the fixed optical system 212 in the twelfth embodiment) including the optical disc 2, fixed mirror 4, co-moving mechanism 24 and fixed optical system 212 is used in the twelfth embodiment. This arrangement of the twelfth embodiment including the optical disc 2, fixed mirror 4, co-moving mechanism 24 and fixed optical system 212, and each parts/components therein are substantially similar to those in the second embodiment shown in FIGS. 11, 12 and 13, except that the fixed optical system 5 is replaced with the fixed optical system 212 in the twelfth embodiment. Therefore, duplicate descriptions and figures for the optical head device in the twelfth embodiment will be omitted.

In the optical head system in the twelfth embodiment, the laser driving circuit 228 and the error detecting circuit 229 are connected to the fixed optical system 212 as shown in FIG. 38, and the error detecting circuit 229 is connected to a co-moving mechanism 24, shown in FIG. 43, substantially identically to the co-moving mechanism 24 of the second embodiment.

The effects/advantages and possible variation examples of the optical head device 221 of the eleventh embodiment are identical to effects/advantages and possible variation examples of the optical head device in the twelfth embodiment, except that the effects/advantages and possible variation examples due to the arrangement shown in FIGS. 43, 12 and 13 in the twelfth embodiment are identical to effects/advantages and possible variation examples (shown in FIGS. 14, 15, 16 and 17) due to the arramgenent shown in FIGS. 11, 12 and 13 in the second embodiment. (In FIGS. 14, 15 and 16, the fixed optical system 5 is replaced with the fixed optical system 212 in the possible variation examples of the twelfth embodiment.)

A thirteenth embodiment of the present invention will now be described. An optical head device in the thirteenth embodiment is approximately identical to the optical head device in the twelfth embodiment. However, instead of the arrangement shown in FIGS. 43, 12 and 13 including the optical disc 2, fixed mirror 4, co-moving mechanism 24 and fixed optical system 212 in the twelfth embodiment, an arrangement shown in FIGS. 18, 19, 20 and 21 (in FIG. 18, the fixed optical system 5 is replaced with the fixed optical system 212 in the thirteenth embodiment) including the optical disc 2, fixed mirror 4, co-moving mechanism 31 and fixed optical system 212 is used in the thirteenth embodiment. This arrangement of the thirteenth embodiment including the optical disc 2, fixed mirror 4, co-moving mechanism 31 and fixed optical system 212, and each parts/components therein are substantially identical to those in the third embodiment shown in FIGS. 18, 19, 20 and 21, except that the fixed optical system 5 is replaced with the fixed optical system 212 in the thirteenth embodiment. Therefore, duplicate descriptions and figures for the optical head device in the thirteenth embodiment will be omitted.

In the optical head system in the thirteenth embodiment, the laser driving circuit 228 and the error detecting circuit 229 are connected to the fixed optical system 212 in a manner identical to that shown in FIG. 38, and the error detecting circuit 229 is connected to a co-moving mechanism 31, shown in FIG. 19, substantially identically to the co-moving mechanism 31 of the second embodiment.

The effects/advantages and possible variation examples of the optical head device 221 of the eleventh embodiment are identical to effects/advantages and possible variation examples of the optical head device in the thirteenth embodiment, except that the effects/advantages and possible variation examples due to the arrangement shown in FIGS. 18, 19, 20 and 21 in the thirteenth embodiment are identical to effects/advantages and possible variation examples (shown in FIGS. 22, 23, 24, 25 and 26) due to the arramgenent shown in FIGS. 18, 19, 20 and 21 of the third embodiment. (In FIGS. 22 and 25, the fixed optical system 5 is replaced with the fixed optical system 212 in the possible variation examples of the thirteenth embodiment.)

A fourteenth embodiment of the present invention will now be described. An optical head device in the fourteenth embodiment is approximately identical to the optical head device in the twelfth embodiment. However, instead of the arrangement shown in FIGS. 43, 12 and 13 including the optical disc 2, fixed mirror 4, co-moving mechanism 24 and fixed optical system 212 in the twelfth embodiment, an arrangement shown in FIGS. 27, 28, 29, 30A and 30B (in FIGS. 27 and 28, the fixed optical system 5 is replaced with the fixed optical system 212 in the fourteenth embodiment) including the optical disc 2, fixed mirror 4, co-moving mechanism 37 and fixed optical system 212 is used in the fourteenth embodiment. This arrangement of the fourteenth embodiment including the optical disc 2, fixed mirror 4, co-moving mechanism 37 and fixed optical system 212, and each parts/components therein is substantially identical to the fourth embodiment shown in FIGS. 27, 28, 29, 30A and 30B, except that the fixed optical system 5 is replaced with the fixed optical system 212 in the fourteenth embodiment. Therefore, duplicate descriptions and figures for the optical head device in the fourteenth embodiment will be omitted.

In the optical head system in the fourteenth embodiment, the error detecting circuit 229 is connected to the co-moving mechanism 37.

The effects/advantages and possible variation examples of the optical head device 221 of the eleventh embodiment are identical to effects/advantages and possible variation examples of the optical head device in the fourteenth embodiment, except that the effects/advantages and possible variation examples due to the arrangement shown in FIGS. 27, 28, 29, 30A and 30B in the fourteenth embodiment are identical to effects/advantages and possible variation examples due to the arramgenent shown in FIGS. 27, 28, 29, 30A and 30B in the fourth embodiment.

A fifteenth embodiment of the present invention will now be described. An optical head device in the fifteenth embodiment is approximately identical to the optical head device in the twelfth embodiment. However, instead of the arrangement shown in FIGS. 43, 12 and 13 including the optical disc 2, fixed mirror 4, co-moving mechanism 24 and fixed optical system 212 in the twelfth embodiment, an arrangement shown in FIGS. 31 and 32 (in FIGS. 31 and 32, the fixed optical system 5 is replaced with the fixed optical system 212 in the fifteenth embodiment) including the optical disc 2, fixed mirror 40, co-moving mechanism 43 and fixed optical system 212 is used in the fifteenth embodiment. This arrangement of the fifteenth embodiment including the optical disc 2, fixed mirror 40, co-moving mechanism 43 and fixed optical system 212, and each parts/components therein is substantially identical to the fifth embodiment shown in FIGS. 31 and 32, except that the fixed optical system 5 is replaced with the fixed optical system 212 in the fifteenth embodiment. Therefore, duplicate descriptions and figures for the optical head device in the fifteenth embodiment will be omitted.

The effects/advantages and possible variation examples of the optical head device 221 of the eleventh embodiment are identical to effects/advantages and possible variation examples of the optical head device in the fifteenth embodiment, except that the effects/advantages and possible variation examples due to the arrangement shown in FIGS. 31 and 32 in the fifteenth embodiment are identical to effects/advantages and possible variation examples due to the arramgenent shown in FIGS. 31 and 32 in the fifth embodiment.

A sixteenth embodiment of the present invention will now be described. An optical head device in the sixteenth embodiment is approximately identical to the optical head device in the eleventh embodiment. However, the optical head device in the sixteenth embodiment has an arrangement substantially the same as the arrangement of the sixth embodiment described with reference to FIG. 33. However, in the sixteenth embodiment, the fixed optical system 5 is replaced with the fixed optical system 212. Therefore, duplicate descriptions and figures for the optical head device in the sixteenth embodiment will be omitted.

The effects/advantages and possible variation examples of the optical head device 221 of the eleventh embodiment are identical to effects/advantages and possible variation examples of the optical head device in the sixteenth embodiment, except that the effects/advantages and possible variation examples due to the arrangement shown in FIG. 33 in the sixteenth embodiment are identical to effects/advantages and possible variation examples due to the arramgenent shown in FIG. 33 in the sixth embodiment.

A seventeenth embodiment of the present invention will now be described. An optical head device in the seventeenth embodiment is approximately identical to the optical head device in the eleventh embodiment. However, the optical head device in the seventeenth embodiment has an arrangement substantially the same as the arrangement of the seventh embodiment described with reference to FIG. 34. However, in the seventeenth embodiment, the fixed optical system 5 is replaced with the fixed optical system 212. Therefore, duplicate descriptions and figures for the optical head device in the seventeenth embodiment will be omitted.

The effects/advantages and possible variation examples of the optical head device 221 of the eleventh embodiment are identical to effects/advantages and possible variation examples of the optical head device in the seventeenth embodiment, except that the effects/advantages and possible variation examples due to the arrangement shown in FIG. 34 in the seventeenth embodiment are identical to effects/advantages and possible variation examples due to the arramgenent shown in FIG. 34 in the seventh embodiment.

A nineteenth embodiment of the present invention will now be described. An optical head device in the nineteenth embodiment is approximately identical to the optical head device in the eleventh embodiment. However, the optical head device in the nineteenth embodiment has an arrangement substantially the same as the arrangement of the ninth embodiment described with reference to FIG. 36. However, in the nineteenth embodiment, the fixed optical system 5 is replaced with the fixed optical system 212.

Therefore, duplicate descriptions and figures for the optical head device in the nineteenth embodiment will be omitted.

The effects/advantages and possible variation examples of the optical head device 221 of the eleventh embodiment are identical to effects/advantages and possible variation examples of the optical head device in the seventeenth embodiment, except that the effects/advantages and possible variation examples due to the arrangement shown in FIG. 36 in the nineteenth embodiment are identical to effects/advantages and possible variation examples due to the arramgenent shown in FIG. 36 in the ninth embodiment.

An twentieth embodiment of the present invention will now be described. An optical head device in the twentieth embodiment is approximately identical to the optical head device in the eleventh embodiment. However, the optical head device in the twentieth embodiment has an arrangement substantially the same as the arrangement of the tenth embodiment described with reference to FIG. 37. However, in the twentieth embodiment, the fixed optical system 5 is replaced with the fixed optical system 212. Therefore, duplicate descriptions and figures for the optical head device in the twentieth embodiment will be omitted.

The effects/advantages and possible variation examples of the optical head device 221 of the eleventh embodiment are identical to effects/advantages and possible variation examples of the optical head device in the seventeenth embodiment, except that the effects/advantages and possible variation examples due to the arrangement shown in FIG. 37 in the twentieth embodiment are identical to effects/advantages and possible variation examples due to the arramgenent shown in FIG. 37 in the tenth embodiment.

Figure 1:
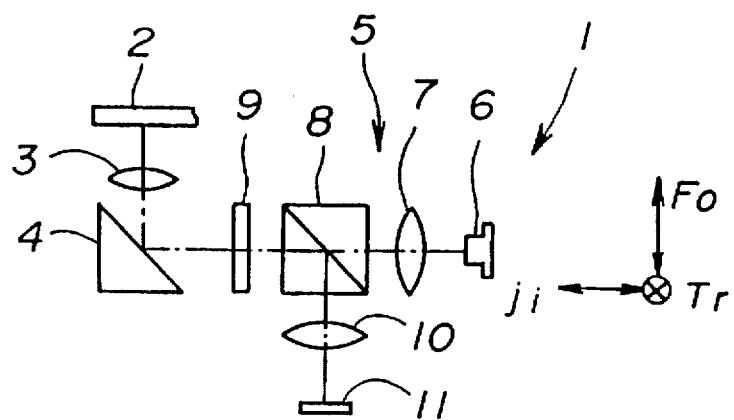
FIG. 1 shows a side view indicating various components/parts of an optical head device in an example of the related art.

With reference to FIGS. 44–50, a twenty-first embodiment of the present invention will now be described. For an optical head device 321 in the twenty-first embodiment, the same terms and reference numerals are given to components identical to those in the above-described optical head device 1 in the related art shown in FIG. 1, and descriptions thereof are omitted.

The optical head device 321 also has the fixed optical system 5 including the laser light source, light-receiving element and beam splitter. As shown in FIG. 45, a movable mirror 322 acting as movable deflection means is arranged at a position so as to face the fixed optical system 5 in the tracking direction. The fixed mirror 4 acting as fixed deflection means is arranged at a position so as to face the movable mirror 322 in the jitter direction. The objective lens 3 is arranged at a position so as to face the fixed mirror 4 in the focusing direction.

As shown in FIG. 44, on a head base (not shown in the figure) which is movable in the tracking direction, the fixed mirror 4, fixed optical system 5 and a yoke 323 are fixed. On the yoke 323, a rectangular-parallelepiped lens supporting member 324 is fitted. The lens supporting member 324 has four spring shafts 325, which are elastic members, individually projecting in the jitter direction from four corners of a surface, facing the jitter direction, of the lens supporting member 324. The projecting ends of the spring shafts 325 are individually connected to the lens holder 326. Through the spring shafts 325, the lens holder 326 is movably supported on the lens supporting member 324 to be movable in the tracking direction and also in the focusing direction. The lens holder 326 is of substantially box-shape extending in the jitter direction. The spring shafts 325 are connected to supporting projections 327 projecting from two sides, each facing the tracking direction, approximately at the middle of the lens holder 326.

Tracking coils 328 are fitted on the supporting projections 327, respectively. Focusing coils 329 are fitted to two end surfaces of the lens holder 326, perpendicular to the jitter direction, respectively. On the yoke 323, tracking magnets 330 and focusing magnets 331 are fixed, and faces the coils 328, 329, respectively, as shown in FIGS. 44A and 46. The tracking magnets 330 are magnetized in magnetic poles opposite to one another between the two sides of the tracking coils 328 as shown in FIG. 46. The focusing magnets 331 are magnetized in magnetic poles opposite to one another between the top and bottom thereof as shown in FIG. 47.

The objective lens 3 is fitted at the center on the top surface, perpendicular to the focusing direction, of the lens holder 326. The movable mirror 322 is fitted on an inner wall perpendicular to the jitter direction of the lens holder 326. A cut-out 332 is formed at a side wall of the lens holder 326 facing the movable mirror 322 as shown in FIG. 44. Through the cut-out 332, the movable mirror 322 faces the fixed optical system 5.

An error detecting circuit (not shown in the figures) is connected to the light-receiving element of the fixed optical system 5 and includes error detecting means for detecting a tracking error and a focusing error individually. A coil driving circuit (not shown in the figures) is connected to the error detecting circuit and applies a predetermined driving power to the tracking and focusing coils 328, 329 depending on the detected tracking and focusing errors. The coil driving circuit acts as position control means and controls a position of the lens holder 326 in the tracking direction and in the focusing direction with respect to the head base through the predetermined driving power.

In the optical head device 321, the lens holder 326 with the objective lens 3, movable mirror 322, and tracking and focusing coils 328, 329 fitted thereto is elastically movably supported through the spring shafts 325. Thus, a movable member 333 is formed by the lens holder 326. The optical head device 321 is formed such that a central position of the elastic support, a central position of control the driving and a position G of the center of gravity of the movable member 333 are approximately at the same position. The position G of the center of gravity of the movable member 333 is positioned on an optical axis of the objective lens 3. A distance "L" along the focusing direction between the position G of the center of gravity of the movable member 333 and the principal point 334 of the objective lens 3 is the same as the focal length "f" of the objective lens 3.

The central position of elastic support is a center of a plurality of positions at which the movable member 333 is elastically supported. Specifically, the central position of elastic support is a center of four points at which the four spring shafts 325 are connected with the supporting projections 327 of the lens holder 326, respectively. The central position of control driving of the movable member 333 is a center at which stresses are applied to the movable member 333 for appropriately controlling the position of the movable member 333 in the tracking direction and in the focusing direction by the position control means. The central position of control driving is the center between the pair of tracking coils 328 and also the center between the pair of focusing coils 329.

A bundle of rays emitted from the fixed optical system 5 in the tracking direction is deflected by the movable mirror 322 in the jitter direction. The thus-deflected bundle of rays is deflected by the fixed mirror 4 in the focusing direction and forms an image on a track of the optical disc 2 through the objective lens 3.

The optical disc 2 reflects the bundle of rays in the focusing direction. The thus-reflected bundle of rays pass through the objective lens 3 and is deflected in the jitter direction by the fixed mirror 4. The thus-deflected bundle of rays is further deflected by the movable mirror 322 in the tracking direction and read by the fixed optical system 5.

The tracking error and focusing error are detected from the read result of the fixed optical system 5. Depending on the thus-detected tracking and focusing errors, driving power is applied to the tracking and focusing coils 328, 329. The position of the lens holder 326 is controlled in the tracking direction and in the focusing direction. The objective lens 3 fitted to the lens holder 326 follows the track of the optical disc 2, and information recorded on the track is read by the fixed optical system 5.

In the optical head device 321, when the objective lens 3 moves in the tracking direction, an optical axis of the objective lens 3 accordingly moves in the tracking direction with respect to an optical axis of the bundle of rays incident from the fixed mirror 4. Actually, the movable mirror 22 moves in the tracking direction, integrally with the objective lens 3 in a translation operation (parallel displacement). Thereby, the bundle of rays incident to the fixed mirror 4 from the movable mirror 22 also moves in the tracking direction in a translation operation (parallel displacement). As a result, no substantial optical-axis deviation with respect to the objective lens 3 occurs, in an optical axis of the bundle of rays, through a process in which the bundle of rays is emitted from the fixed optical system 5 and reflected by the movable mirror 22 and fixed mirror 4 and incident on the objective lens 3.

In the optical head device 321, even in a case where a tracking error is detected through the push-pull method, no DC offset is produced in the detection signal. As a result, a tracking control can be performed with high accuracy. Further, undesirable variation in light intensity of the bundle of rays incident on the optical disc 2 due to light intensity distribution of the laser beam such as that shown in FIG. 2 is prevented. As a result, undesirable variation in light intensity of the bundle of rays detected by the fixed optical system 5 is prevented. Thus, it is possible to perform information recording and reproducing on the optical disc 2 with high accuracy.

The above-described movement of the lens holder 326 in the tracking direction is a movement of a tracking operation for causing the objective lens 3 to follow a track on the optical disc 2 when the track may slightly move due to rotation of the optical disc 2. In a seeking operation in which a track of the optical disc 2 is changed, the entirety of the optical head device 321 is conveyed in the tracking direction through a head conveying mechanism (not shown in the figures).

In the optical head device 321, it is possible to prevent the optical-axis deviation due to the tracking error, by causing the movable mirror 322 to move integrally with the objective lens 3. However, a rotation resonance about a rotation axis in the tracking direction of the movable member 333 may occur. Occurrence of the rotation resonance may result in occurrence of a jitter error. A case will now be considered in which the movable member 333 turns about the position G of the center of gravity about the rotation axis in the tracking direction and thus causes the rotation resonance so as to turn by an angle "Θ". In this case, the movable mirror 322 also turns by the same angle "Θ" in the same direction. As shown in FIGS. 48 and 49, the bundle of rays incident on the objective lens 3 as a result of being emitted from the fixed optical system 5 and reflected by the movable mirror 322 and fixed mirror 4 is inclined by the angle "Θ" from the original optical-axis direction in the jitter direction. A position of image forming on the optical disc 2 by the objective lens 3 having the focal length "f" shifts by "fΘ" (where "Θ" is in radians) in the jitter direction. The jitter error occurs in the read result obtained from reading the bundle of rays reflected by the optical disc 2 in the fixed optical system 5.

In the optical head device 321, the distance "L" in the focusing direction between the position G of the center of gravity of the movable member 333 and the principal point 334 of the objective lens 3 is the same as the focal length "f" of the objective lens 3. Thereby, the occurrence of the jitter error due to the rotation resonance of the movable member 333 can be prevented. That is, the rotation resonance of the movable member occurs about the position G of the center of gravity of the movable member 333 as the rotation center. In the case where the movable member 333 turns by the angle "Θ" counterclockwise in FIG. 47 as shown in FIG. 48 due to the rotation resonance, the objective lens 3 shifts by "LΘ" leftward in FIG. 49 in the jitter direction. The bundle of rays incident on the objective lens 3 is inclined by "Θ" rightward in the jitter direction and the position at which the image is formed on the optical disc 2 through the objective lens 3 shifts by "fΘ" rightward with respect to the objective lens 3 as shown in FIG. 49. The objective lens 3 itself shifts by "LΘ" leftward simultaneously. The leftward shift of the objective lens 3 cancels out the rightward shift of the image forming position on the optical disc 2 as shown in FIG. 50. As a result, shift of the image forming position on the optical disc 2 does not occur.

The objective lens 3 and the movable mirror 322 are integrally moved and occurrence of the optical-axis deviation due to the tracking control is prevented. There is a possibility that the objective lens 3 and the movable mirror 322 integrally perform the rotation resonance. By positioning the objective lens 3 so as to be apart from the position G of the center of gravity of the movable member 333 by a distance the same as the focal length "f" of the objective lens 3, a shift of the image forming position on the optical disc 2 due to a shift of the angle of the bundle of rays can be canceled out by a shift of a position of the objective lens 3. Thus, shift of the image forming position on the optical disc 2 can be prevented.

In the optical head device 321, the central position of elastic support, the central position of control driving and the position G of the center of gravity of the movable member 333 are approximately at the same position. Thus, such rotation resonance is not likely to occur even when stress applied in the control driving and/or reaction forces of the elastic support are applied to the movable member 333. Because the position G of the center of gravity of the movable member 333 is located on the optical axis of the objective lens 3, when rotation resonance occurs in the movable member 333, a position of the objective lens 3 does not shift in the focusing direction. Therefore, focusing control of the objective lens 3 can be easily performed.

Occurrence of optical-axis deviation due to the tracking control is prevented as a result of causing the objective lens 3 to integrally move with the movable mirror 322. Further, shift of the image forming position on the optical disc 2 due to the rotation resonance of the movable member 333 is canceled out by a together occurring shift of the objective lens 3 itself. In this time, it can be considered that the shift of the objective lens 3 in the canceling operation may cause optical-axis deviation. However, optical-axis deviation occurring due to the tracking control has an order of approximately 0.4 mm. In contrast to this, shift of the objective lens 3, occurring due to the rotation resonance, has an order of several μm. Thus, shift of the objective lens 3 due to the rotation resonance does not cause a substantial problem.

With reference to FIGS. 51–56, a twenty-second embodiment of the present invention will now be described. For an optical head device 341 in the twenty-second embodiment, the same terms and reference numerals are given to components identical to those in the optical head device 321 in the twenty-first embodiment, and descriptions thereof are omitted.

As shown in FIGS. 51–53, on the head base (not shown in the figures) movable in the tracking direction, the mirror 4, optical system 5 and a yoke 342 are fixed. The four spring shafts 25 as elastic members project from a lens supporting member 343 which is fitted to the yoke 342. A lens holder 344 is elastically connected to the lens supporting member 343 through the spring shafts 325 to be movable in the tracking direction and in the focusing direction. The lens holder 344 is connected with the spring shafts 325 via supporting projections 345 project from the two sides, each perpendicular to the tracking direction, of the lens holder 344 at approximately the middle, in the jitter direction, thereof.

The lens holder 344 has a rectangular pass-through hole 346 formed therein which passes through the lens holder 344 the focusing direction at approximately the center thereof. A pair of tracking coils 347 and a focusing coil 348 are fitted inside the pass-through hole 346. As shown in FIG. 54, the focusing coil 348 is wound to form a large rectangle corresponding to approximately half of the cross-sectional area of the pass-through hole 346 of the lens holder 344. The pair of tracking coils 347 have small windings and are arranged in a plane along the tracking direction and provided to the focusing coil 348. A pair of magnets 349 having magnetic poles opposite to one another face the coil 347, 348, as shown in FIGS. 52 and 53. The magnets 349 are connected to the yoke 342.

The objective lens 3 is fitted on the top surface, perpendicular to the focusing direction, of the lens holder 344. The movable mirror 322 is located at an end in the jitter direction of the lens holder 344, and a counterweight 350 is detachably fitted to the other end of the lens holder 344 as shown in FIGS. 51, 52 and 53. The lens holder 344 having the various components/parts fitted thereto is elastically and movably supported through the spring shafts 325, and forms a movable member 351.

By providing the counterweight 350, the position G of the center of gravity of the movable member 351 is adjusted. The position G of the center of gravity of the movable member 351 is precisely at the same position as the central position of the elastic support and also at the central position for the control driving. In the moving member 351, the position G of the center of gravity, the objective lens 3 and the movable mirror 322 are arranged in the stated order in the jitter direction as shown in FIG. 52. A distance along the jitter direction between the position G of the center of the gravity of the movable member 351 and the principal point 334 of the objective lens 3 is the same as twice the focal length "f" of the objective lens 3.

Similar to the above-described optical head device 321, the movable mirror 322 shifts integrally with the objective lens 3. Therefore, no optical-axis deviation occurs in a bundle of rays incident on the objective lens 3 from the fixed optical system 5 via the movable mirror 322 and fixed mirror 4. In the optical head device 341, even in a case where a tracking error is detected through the push-pull method, no DC offset is produced in the detection signal. As a result, tracking control can be performed with high accuracy. Undesirable variation in light intensity of the bundle of rays incident on the optical disc 2 due to light intensity distribution of the laser beam such as that shown in FIG. 2 is prevented. As a result, undesirable variation in light intensity of the bundle of rays detected by the fixed optical system 5 is prevented. Thereby, it is possible to perform information recording and reproducing on the optical disc 2 with high accuracy.

It is possible to prevent the optical-axis deviation due to tracking error, by causing the movable mirror 322 to move integrally with the objective lens 3. However, it can be considered that rotation resonance occurs about a rotation axis in the focusing direction of the movable member 351. Occurrence of the rotation resonance may result in occurrence of a jitter error. A case will now be considered in which the movable member 351 turns about the position G of the center of gravity and causes rotation resonance, thus turning by an angle "Θ" about the rotation axis in the focusing direction. In this case, the movable mirror 322 also turns by the same angle "Θ" in the same direction. As shown in FIG. 55, the bundle of rays incident on the objective lens 3 as a result of being emitted from the fixed optical system 5 and reflected by the movable mirror 322 and fixed mirror 4 is inclined by the angle "2Θ" from the original optical-axis direction in the tracking direction. As a result, the position of image forming on the optical disc 2 by the objective lens 3 having the focal length "f" shifts by "2fΘ" (where "Θ" is in radians) in the tracking direction. The tracking control cannot be properly performed and a tracking error occurs in the read result obtained from reading of the bundle of rays reflected by the optical disc 2 in the fixed optical system 5.

However, in the jitter direction, the movable mirror 322, objective lens 3 and the position G of the center of gravity of the movable member 351 are arranged in the given order, and the distance in the jitter direction between the position G of the center of gravity of the movable member 351 and the principal point 334 of the objective lens 3 is the same as twice the focal length "f" of the objective lens 3. Thereby, the occurrence of the tracking error due to the rotation resonance of the movable member 351 can be prevented. That is, the rotation resonance of the movable member 351 occurs about the position G of the center of gravity of the movable member 351 as the rotation center. In the case where the movable member 351 turns by the angle "Θ" counterclockwise in FIG. 52 as shown in FIG. 55 due to the rotation resonance, the objective lens 3 shifts by "2fΘ" (where e is radians) leftward in FIG. 56 in the tracking direction. FIG. 56 shows the objective lens 3 and the optical disc 2 viewed in the jitter direction from the side of the lens supporting member 343.

The bundle of rays incident on the objective lens 3 is inclined by "2Θ" rightward in FIG. 56 in the tracking direction and the position at which the image is formed on the optical disc 2 through the objective lens 3 shifts by "2fΘ" rightward with respect to the objective lens 3 as shown in FIG. 56. The objective lens 3 itself shifts by "2fΘ" leftward simultaneously. The leftward shift of the objective lens 3 cancels out the rightward shift of the image forming position on the optical disc 2. As a result, shift of the image forming position on the optical disc 2 does not occur.

Thus, the objective lens 3 and the movable mirror 322 are integrally moved and occurrence of optical-axis deviation due to tracking control is prevented. There is a possibility that the objective lens 3 and the movable mirror 322 integrally perform rotation resonance. However, by positioning the objective lens 3 so as to be apart from the position G of the center of gravity of the movable member 333 by a distance in the jitter direction that is twice the focal length "f" of the objective lens 3, a shift of the image forming position on the optical disc 2, due to a shift of the angle of the bundle of rays, can be canceled out by a common shift of position of the objective lens 3. Thus, shift of the image forming position on the optical disc 2 can be prevented.

In the optical head device 341, the central position of elastic support, the central position of control driving and the position G of the center of gravity of the movable member 351 are precisely at the same position. Thereby, rotation resonance is not likely to occur even when stress applied in the control driving and/or reaction forces of the elastic support are applied to the movable member 351. The originally separate counter weight 350 is positioned and the position G of the center of gravity can be easily and precisely adjusted. It is possible to modify a conventional optical head by adding the movable mirror 322 and counterweight 350 so as to produce the optical head device 341.

The method of providing such a counter weight to the lens holder so as to adjust the position G of the center of gravity of the movable member can also be applied to the twenty-first embodiment and a twenty-third embodiment of the present invention which will now be described.

The twenty-third embodiment of the present invention will now be described. For an optical head device 361 in the twenty-third embodiment, the same terms and reference numerals are given to components identical to those in the optical head device 18 in the second embodiment with reference to FIGS. 11, 12 and 13. The arrangement of each of the components/parts and effects/advantages of and possible variation examples of the optical head device 361 in the twenty-third embodiment are approximately identical to those of the optical head device 18 in the second embodiment. Therefore, duplicate descriptions and figures will be omitted.

In the optical head device 361, the lens holder 22 having the objective lens 3, movable mirrors 19, 20 fitted thereto is elastically and movably supported through the leaf springs 21 and torsion bars 23 as in the description of the second embodiment. Thus, a movable member 367 is formed. A distance "L" along the focusing direction between a position G of the center of the gravity of the movable member 367 and the principal point 334 of the objective lens 3 is the same as twice the focal length "f" of the objective lens 3.

In the optical head device 361, it is possible to prevent optical-axis deviation due to tracking error, by causing the movable mirrors 19, 20 to move integrally with the objective lens 3. It can be considered that rotation resonance may occur about a rotation axis in the tracking direction of the movable member 367. Occurrence of rotation resonance may result in occurrence of a jitter error. A case will now be considered in which the movable member 367 turns about the position G of the center of gravity about the rotation axis in the tracking direction and causes rotation resonance turning about an angle "Θ". In this case, the movable mirrors 19, 20 also turn by the same angle "Θ" in the same direction. As shown in FIG. 57, the bundle of rays incident on the objective lens 3 as a result of being emitted from the fixed optical system 5 and reflected by the movable mirrors 19, 20 and fixed mirror 4 is inclined by the angle "2Θ" from the original optical-axis direction in the jitter direction. As a result, a position of image forming on the optical disc 2 by the objective lens 3 having the focal length "f" shifts by "2fΘ" ("Θ" is in radians) in the jitter direction. Thus, the jitter error occurs in the read result obtained from reading the bundle of rays reflected by the optical disc 2 in the fixed optical system 5.

In the optical head device 361, the distance "L" in the focusing direction between the position G of the center of gravity of the movable member 367 and the principal point 334 of the objective lens 3 is the same as twice the focal length "f" of the objective lens 3. Thus, L=2f. Accordingly, the jitter error due to rotation resonance of the movable member 367 can be prevented. That is, the rotation resonance of the movable member 367 occurs about the position G of the center of gravity of the movable member 367 as the rotation center. In the case where the movable member 333 turns by the angle "Θ" counterclockwise in FIG. 57 due to the rotation resonance, the objective lens 3 shifts by "LΘ" (Θ is in radians) leftward as shown in FIG. 58 in the jitter direction. In this case, the bundle of rays incident on the objective lens 3 is inclined by "2Θ" rightward in the jitter direction and the position at which the image is formed on the optical disc 2 through the objective lens 3 shifts by "2f" rightward with respect to the objective lens 3. However, the objective lens 3 itself shifts by "LΘ" leftward simultaneously. Because L=2f and thus LΘ=2fΘ, the leftward shift of the objective lens 3 cancels out the rightward shift of the image forming position on the optical disc 2. As a result, shift of the image forming position on the optical disc 2 does not occur.

Thus, the objective lens 3 and the movable mirrors 19, 20 are integrally moved and occurrence of optical-axis deviation due to the tracking control is prevented. There is a possibility that the objective lens 3 and the movable mirrors 19, 20 integrally perform rotation resonance. However, by positioning the objective lens 3 apart from the position G of the center of gravity of the movable member 367 by a distance twice the focal length "f" of the objective lens 3, a shift of the image forming position on the optical disc 2 due to a shift of the angle of the bundle of rays can be canceled out by a shift of the position of the objective lens 3 itself. Thus, shift of the image forming position on the optical disc 2 can be prevented.

Further, the present invention is not limited to the above described embodiments, and variations and modifications may be made without departing from the scope of the present invention.

What is claimed is:

1. An optical head device, movably supporting an objective lens which faces an optical disc to be movable in a tracking direction, causing light emitted from a fixed optical system to be converged through said objective lens and to be incident on said optical disc, causing the light reflected by said optical disc to be incident on said fixed optical system via said objective lens, and controlling a position of said objective lens in the tracking direction using a tracking error detected by said fixed optical system;

said optical head device comprising:

movable deflection means for deflecting a bundle of light rays incident thereon in the tracking direction from said fixed optical system in a direction perpendicular to a focusing direction and also to the tracking direction;

fixed deflection means for deflecting the bundle of rays incident thereon from said movable deflection means in the focusing direction and for causing the bundle of rays to be incident on said optical disc via said objective lens; and a co-moving mechanism for moving said movable deflection means integrally with said objective lens.

2. An optical head device, movably supporting an objective lens which faces an optical disc rotatably and thereby to be movable approximately in a tracking direction, causing light emitted from a fixed optical system to be converged through said objective lens and to be incident on said optical disc, causing the light reflected by said optical disc to be incident on said fixed optical system via said objective lens, and controlling a position of said objective lens in the tracking direction using a tracking error detected by said fixed optical system;

said optical head device comprising:

movable deflection means for deflecting a bundle of light rays incident thereon an even number of times from said fixed optical system;

fixed deflection means for deflecting the bundle of rays incident thereon from said movable deflection means in a focusing direction and for causing the bundle of rays to be incident on said optical disc via said objective lens; and a co-moving mechanism for moving said movable deflection means integrally with said objective lens.

3. An optical head device, movably supporting an objective lens which faces an optical disc rotatably and thereby to be movable approximately in a tracking direction, causing light emitted from a fixed optical system to be converged through said objective lens and to be incident on said optical disc, causing the light reflected by said optical disc to be incident on said fixed optical system via said objective lens, and controlling a position of said objective lens in the tracking direction using a tracking error detected by said fixed optical system;

said optical head device comprising:

first movable deflection means for deflecting a bundle of light rays incident thereon in a direction perpendicular to a focusing direction and also to the tracking direction from said fixed optical system in the tracking direction;

second movable deflection means for deflecting the bundle of rays incident thereon from said first deflection means in the direction perpendicular to the focusing direction and the tracking direction;

fixed deflection means for deflecting the bundle of rays incident thereon from said second movable deflection means in the focusing direction and for causing the bundle of rays to be incident on said optical disc via said objective lens; and a co-moving mechanism for moving said first movable deflection means and said second deflection means integrally with said objective lens.

4. An optical head device, movably supporting an objective lens which faces an optical disc rotatably and thereby to be movable approximately in a tracking direction, causing light emitted from a fixed optical system to be converged through said objective lens and to be incident on said optical disc, causing the light reflected by said optical disc to be incident on said fixed optical system via said objective lens, and controlling a position of said objective lens in the tracking direction using a tracking error detected by said fixed optical system;

said optical head device comprising:

first movable deflection means for deflecting a bundle of light rays incident thereon in a direction perpendicular to a focusing direction and also to the tracking direction from said fixed optical system in the tracking direction;

second movable deflection means for deflecting the bundle of rays incident thereon from said first deflection means in the direction perpendicular to the focusing direction and the tracking direction;

first fixed deflection means for deflecting the bundle of rays incident thereon from said second movable deflection means in the direction perpendicular to the focusing direction and also to the tracking direction;

second fixed deflection means for deflecting the bundle f rays incident thereon from said first fixed deflection means in the focusing direction and for causing the bundle of rays to be incident on said optical disc via said objective lens; and a co-moving mechanism for moving said first movable deflection means and said second deflection means integrally with said objective lens.

5. An optical head device, movably supporting an objective lens which faces an optical disc rotatably and thereby to be movable approximately in a tracking direction, causing light emitted from a fixed optical system to be converged through said objective lens and to be incident on said optical disc, causing the light reflected by said optical disc to be incident on said fixed optical system via said objective lens, and controlling a position of said objective lens in the tracking direction using a tracking error detected by said fixed optical system;

said optical head device comprising:

movable deflection means for causing a bundle of light rays, incident thereon in a direction perpendicular to a focusing direction and also to the tracking direction from said fixed optical system, to be transmitted successively by an even number of parallel transmission planes;

fixed deflection means for deflecting the bundle of rays incident thereon from said movable deflection means in the focusing direction and for causing the bundle of rays to be incident on said optical disc via said objective lens; and a co-moving mechanism for moving said movable deflection means integrally with said objective lens.

6. An optical head device, movably supporting an objective lens which faces an optical disc rotatably and thereby to be movable approximately in a tracking direction, causing light emitted from a fixed optical system to be converged through said objective lens and to be incident on said optical disc, causing the light reflected by said optical disc to be incident on said fixed optical system via said objective lens, and controlling a position of said objective lens in the tracking direction using a tracking error detected by said fixed optical system;

said optical head device comprising:

first movable deflection means for deflecting a bundle of light rays incident thereon in a direction perpendicular to a focusing direction and also to the tracking direction from said fixed optical system in the focusing direction;

fixed deflection means for deflecting the bundle of rays incident thereon from said first movable deflection means in the direction perpendicular to the focusing direction and also to the tracking direction;

second movable deflection means for deflecting the bundle of rays incident thereon from said fixed deflection means in the focusing direction and for causing the bundle of rays to be incident on said optical disc via said objective lens; and a co-moving mechanism for moving said first movable deflection means and said second movable deflection means integrally with said objective lens.

7. An optical head device, comprising:

a laser light source;

ray-bundle splitting means for splitting a laser light into a main bundle of rays and at least one sub-bundle of rays;

movable deflection means for deflecting said main bundle of rays and said sub-bundle of rays incident thereon in a tracking direction, in a direction perpendicular to the tracking direction and also to a focusing direction;

fixed deflection means for deflecting said main bundle of rays and said sub-bundle of rays incident thereon from said movable deflection means in the focusing direction;

an objective lens for causing said main bundle of rays incident thereon from said fixed deflection means to form an image on a track of an optical disc and also for causing said sub-bundle of rays incident thereon to form an image on a gap between tracks of said optical disc;

a plurality of light-receiving elements for individually detecting said main bundle of rays and said sub-bundle of rays reflected by said optical disc, and generating a plurality of detected results;

push-pull signal generating means for individually generating push-pull signals, according to a tracking error, from said plurality of detected results;

tracking signal generating means for obtaining a difference between the push-pull signal of said main bundle of rays and the push-pull signal of said sub-bundle of rays, and obtaining a tracking signal;

a co-moving mechanism for controlling a position of said movable deflection means and said objective lens integrally by using said tracking signal; and tilt signal generating means for adding the push-pull signals together and obtaining a tilt signal.

8. The optical head device according to claim 7, further comprising output control means for controlling output of said laser light source using said tilt signal.

9. The optical head device according to claim 7, further comprising:

focusing signal generating means for generating a focusing signal, depending on a focusing error, from the detected result of said main bundle of rays; and output control means for controlling output of said laser light source using said focusing signal and said tilt signal.

10. An optical head device, comprising:

a laser light source;

ray-bundle splitting means for splitting a laser light into a main bundle of rays and at least one sub-bundle of rays;

movable deflection means for deflecting said main bundle of rays and said sub-bundle of rays an even number of times;

fixed deflection means for deflecting said main bundle of rays and said sub-bundle of rays incident thereon from said movable deflection means in a focusing direction;

an objective lens for causing said main bundle of rays incident thereon from said fixed deflection means to form an image on a track of an optical disc and for causing said sub-bundle of rays incident thereon to from an image on a gap between tracks of said optical disc;

a plurality of light-receiving elements for individually detecting said main bundle of rays and said sub-bundle of rays reflected by said optical disc, and generating a plurality of detected results;

push-pull signal generating means for individually generating push-pull signals, according to a tracking error, from said plurality of detected results;

tracking signal generating means for obtaining a difference between the push-pull signal of said main bundle of rays and the push-pull signal of said sub-bundle of rays, and thus obtaining a tracking signal;

a co-moving mechanism for controlling a rotation angle, about a rotation axis in the focusing direction, of said movable deflection means and said objective lens integrally by using said tracking signal; and tilt signal generating means for adding the push-pull signals together and obtaining a tilt signal.

11. An optical head device, comprising:

a laser light source;

ray-bundle splitting means for splitting a laser light into a main bundle of rays and at least one sub-bundle of rays;

first movable deflection means for deflecting said main bundle of rays and said sub-bundle of rays incident thereon in a direction perpendicular to a focusing direction and also to a tracking direction, in the tracking direction;

second movable deflection means for deflecting said main bundle of rays and said sub-bundle of rays incident thereon in the direction perpendicular to the focusing direction and also to the tracking direction;

fixed deflection means for deflecting said main bundle of rays and said sub-bundle of rays incident thereon from said second movable deflection means in the focusing direction;

an objective lens for causing said main bundle of rays incident thereon from said fixed deflection means to form an image on a track of an optical disc and also for causing said sub-bundle of rays incident thereon to form an image on a gap between tracks of said optical disc;

a plurality of light-receiving elements for individually detecting said main bundle of rays and said sub-bundle of rays reflected by said optical disc, and generating a plurality of detected results;

push-pull signal generating means for individually generating push-pull signals, according to a tracking error, from said plurality of detected results;

tracking signal generating means for obtaining a difference between the push-pull signal of said main bundle of rays and the push-pull signal of said sub-bundle of rays, and thus obtaining a tracking signal;

a co-moving mechanism for controlling a rotation angle, about a rotation axis in the focusing direction, of said first movable deflection means, said second movable deflection mean sand said objective lens integrally by using said tracking signal; and tilt signal generating means for adding the of push-pull signals together and obtaining a tilt signal.

12. An optical head device, comprising:

a laser light source;

ray-bundle splitting means for splitting a laser light into a main bundle of rays and at least one sub-bundle of rays;

first movable deflection means for deflecting said main bundle of rays and said sub-bundle of rays incident thereon in a tracking direction, in a direction perpendicular to a focusing direction and also to the tracking direction, in the tracking direction;

second movable deflection means for deflecting said main bundle of rays and said sub-bundle of rays incident thereon in the tracking direction;

first fixed deflection means for deflecting said main bundle of rays and said sub-bundle of rays incident thereon from said second movable deflection means in the direction perpendicular to the focusing direction and also to the tracking direction;

second fixed deflection means for deflecting said main bundle of rays and said sub-bundle of rays incident thereon from said first fixed deflection means in the focusing direction;

an objective lens for causing said main bundle of rays incident thereon from said second fixed deflection means to form an image on a track of an optical disc and also for causing said sub-bundle of rays incident thereon to form an image on a gap between tracks of said optical disc;

a plurality of light-receiving elements for individually detecting said main bundle of rays and said sub-bundle of rays reflected by said optical disc, and generating a plurality of detected results;

push-pull signal generating means for individually generating push-pull signals, according to a tracking error, from said plurality of detected results;

tracking signal generating means for obtaining a difference between the push-pull signal of said main bundle of rays and the push-pull signal of said sub-bundle of rays, and thus obtaining a tracking signal;

a co-moving mechanism for controlling a rotation angle, about a rotation axis in the focusing direction, of said first movable deflection means, said second movable deflection means and said objective lens integrally by using said tracking signal; and tilt signal generating means for adding the of push-pull signals together and obtaining a tilt signal.

13. An optical head device, comprising:

a laser light source;

ray-bundle splitting means for splitting a laser light into a main bundle of rays and at least one sub-bundle of rays;

movable deflection means for transmitting said main bundle of rays and said sub-bundle of rays, incident thereon in a direction perpendicular to a focusing direction and also to a tracking direction, successively through an even number of parallel transmission planes;

fixed deflection means for deflecting said main bundle of rays and said sub-bundle of rays incident thereon from said movable deflection means in the focusing direction;

an objective lens for causing said main bundle of rays incident thereon from said fixed deflection means to form an image on a track of an optical disc and also for causing said sub-bundle of rays incident thereon to form an image on a gap between tracks of said optical disc;

a plurality of light-receiving elements for individually detecting said main bundle of rays and said sub-bundle of rays reflected by said optical disc and generating a plurality of detected results;

push-pull signal generating means for individually generating push-pull signals, according to a tracking error, from said plurality of detected results;

tracking signal generating means for obtaining a difference between the push-pull signal of said main bundle of rays and the push-pull signal of said sub-bundle of rays, and thus obtaining a tracking signal;

a co-moving mechanism for controlling a rotation angle, about a rotation axis in the focusing direction, of said movable deflection means and said objective lens integrally by using said tracking signal; and tilt signal generating means for adding the of push-pull signals together and obtaining a tilt signal.

14. An optical head device, comprising:

a laser light source;

ray-bundle splitting means for splitting a laser light into a main bundle of rays and at least one sub-bundle of rays;

a first movable deflection means for deflecting said main bundle of rays and said sub-bundle of rays incident thereon in a direction perpendicular to a tracking direction and also to a focusing direction, in the focusing direction;

fixed deflection means for deflecting said main bundle of rays and said sub-bundle of rays incident thereon from said first movable deflection means in the direction perpendicular to the focusing direction and also to the tracking direction;

second movable deflection means for deflecting said main bundle of rays and said sub-bundle of rays incident thereon from said fixed deflection means in the focusing direction;

an objective lens for causing said main bundle of rays incident thereon from said second movable deflection means to form an image on a track of an optical disc and also for causing said sub-bundle of rays incident thereon to form an image on a gap between tracks of said optical disc;

a plurality of light-receiving elements for individually detecting said main bundle of rays and said sub-bundle of rays reflected by said optical disc and generating a plurality of detected results;

push-pull signal generating means for individually generating push-pull signals, according to a tracking error, from said plurality of detected results;

tracking signal generating means for obtaining a difference between the push-pull signal of said main bundle of rays and the push-pull signal of said sub-bundle of rays, and thus obtaining a tracking signal;

a co-moving mechanism for controlling a rotation angle, about a rotation axis in the focusing direction, of said first movable deflection means, second movable deflection means and said objective lens integrally by using said tracking signal; and tilt signal generating means for adding the of push-pull signals together and obtaining a tilt signal.

15. An optical head device, comprising:

a lens holder having an objective lens arranged so as to face an optical disc;

means for elastically supporting said lens holder on a head base through an elastic member movable in a tracking direction and in a focusing direction;

a fixed optical system for emitting a laser light in the tracking direction;

movable deflection means secured to said lens holder for deflecting the emitted laser light in a direction perpendicular to the focusing direction and also to the tracking direction;

fixed deflection means secured to said head base for deflecting the deflected laser light in the focusing direction and causing the laser light to be incident on said objective lens;

error detecting means for individually detecting a tracking error and a focusing error from a bundle of rays reflected by said optical disc and returning to said fixed optical system; and position control means for driving and controlling a position of said lens holder with respect to said head base in the tracking direction and in the focusing direction; and wherein a movable member is formed by said lens holder having at least said objective lens and said movable deflection means secured thereto; and wherein a distance along the focusing direction between a center of gravity position of said movable member and the principal point of said objective lens is approximately the same as focal length of said objective lens.

16. The optical head device according to claim 15, wherein a central position of the elastic support, a central position of the control driving and said center of gravity position of said movable member is approximately at the same position.

17. The optical head device according claim 15, wherein said center of gravity position of said movable member is located on the optical axis of said objective lens.

18. The optical head device according to claim 15, further comprising a weight connected to said lens holder for adjusting said center of gravity position of said movable member.

19. An optical head device, comprising:

a lens holder having an objective lens arranged so as to face an optical disc fitted thereto;

means for elastically supporting said lens holder on a head base through an elastic member movably in a tracking direction and in a focusing direction;

a fixed optical system for emitting a laser light in the tracking direction;

movable deflection means secured to said lens holder for deflecting the emitted laser light in a direction perpendicular to the focusing direction and also to the tracking direction;

fixed deflection means secured to said head base for deflecting the deflected laser light in the focusing direction and causing the laser light to be incident on said objective lens;

error detecting means for individually detecting a tracking error and a focusing error from a bundle of rays reflected by said optical disc and returning to said fixed optical system;

position control means for driving and controlling a position of said lens holder with respect to said head base in the tracking direction and in the focusing direction; and wherein:

a movable member is formed by said lens holder having at least said objective lens and said movable deflection means secured thereto; and a center of gravity position of said movable member, said objective lens and said movable deflection means being arranged in the direction perpendicular to the tracking direction and also to the focusing direction; and wherein a distance along the direction perpendicular to the focusing direction and also to the tracking direction between said center of gravity position of said movable member and the principal point of said objective lens is approximately twice the focal length of said objective lens.

20. The optical head device according to claim 19, wherein a central position of the elastic support, a central position of the control driving and said center of gravity position of said movable member is approximately at the same position.

21. The optical head device according to claim 19, further comprising a weight connected to said lens holder for adjusting said center of gravity position of said movable member.

22. Optical head device, comprising:

a lens holder having an objective lens arranged so as to face an optical disc fitted thereto;

means for elastically supporting said lens holder on a head base through an elastic member movable in a tracking direction and in a focusing direction;

a fixed optical system for emitting a laser light;

movable deflection means secured to said lens holder for twice deflecting the emitted laser light in a direction perpendicular to the focusing direction and also to the tracking direction;

fixed deflection means secured to said head base for deflecting the deflected laser light in the focusing direction and causing the laser light to be incident on said objective lens;

error detecting means for individually detecting a tracking error and a focusing error from a bundle of rays reflected by said optical disc and returning to said fixed optical system; and position control means for driving and controlling a position of said lens holder with respect to said head base in the tracking direction and in the focusing direction; and wherein a movable member is formed by said lens holder having at least said objective lens and said movable deflection means fitted thereto; and wherein a distance along the focusing direction between a center of gravity position of said movable member and the principal point of said objective lens is approximately twice the focal length of said objective lens.

23. The optical head device according to claim 22, wherein a central position of the elastic support, a central position of the control driving and said center of gravity position of said movable member is approximately at the same position.

24. The optical head device according to claim 22, further comprising a weight connected to said lens holder for adjusting said center of gravity position of said movable member.

* * * * *